(12) United States Patent
Nishiura et al.

(10) Patent No.: US 10,645,233 B2
(45) Date of Patent: May 5, 2020

(54) PRINTER, DIGITAL CAMERA WITH PRINTER, AND PRINTING METHOD

(71) Applicant: FUJIFILM Corporation, Tokyo (JP)

(72) Inventors: Yoshikuni Nishiura, Tokyo (JP); Shinichi Fujimoto, Tokyo (JP); Tsuneo Sato, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/822,281

(22) Filed: Nov. 27, 2017

(65) Prior Publication Data

US 2018/0176396 A1    Jun. 21, 2018

(30) Foreign Application Priority Data

Dec. 15, 2016    (JP) ................................ 2016-243284

(51) Int. Cl.
*H04N 1/00* (2006.01)
*G06K 15/02* (2006.01)
*G06K 15/00* (2006.01)

(52) U.S. Cl.
CPC ....... *H04N 1/00161* (2013.01); *G06K 15/005* (2013.01); *G06K 15/1884* (2013.01);
(Continued)

(58) Field of Classification Search
CPC .......... H04N 1/00161; H04N 1/00172; H04N 1/00188; H04N 1/00384; H04N 1/00392;
(Continued)

(56) References Cited

U.S. PATENT DOCUMENTS 7,038,714 B1 *   5/2006   Parulski ............. H04N 1/00278
                                                  348/207.2
8,896,850 B1 *  11/2014   Buck ................... H04N 1/0044
                                                       358/1.1
(Continued)

FOREIGN PATENT DOCUMENTS

EP        0 917 359 A     5/1999
JP        H10-065948 A    3/1998
(Continued)

OTHER PUBLICATIONS

Extended European Search Report issued by the European Patent Office dated Apr. 18, 2018, which corresponds to EP17202913.4-1202 and is related to U.S. Appl. No. 15/822,281.
(Continued)

*Primary Examiner* — Twyler L Haskins
*Assistant Examiner* — Fayez Bhuiyan
(74) *Attorney, Agent, or Firm* — Studebaker & Brackett PC

(57) ABSTRACT

There are provided a printer, a digital camera with a printer, and a printing method which are capable of simply printing an image having photographic composition intended by a user. A frame layout is displayed on a monitor. Based on an operation of an operation unit, images stored in an internal memory are displayed in frames, and images to be arranged in the frames are selected. In this case, portions of the images corresponding to the frames are cut out, and the images are displayed in the frames. Based on an operation of the operation unit, the images to be arranged in the frames are adjusted by zooming and/or moving the images to be arranged in the frames within the frames. After setting of images for all the frames is completed, an image displayed on the monitor is printed according to a print instruction.

19 Claims, 33 Drawing Sheets

(52) U.S. Cl.
CPC ..... *G06K 15/1885* (2013.01); *H04N 1/00172* (2013.01); *H04N 1/00188* (2013.01); *H04N 1/00384* (2013.01); *H04N 1/00392* (2013.01); *H04N 1/00485* (2013.01); *H04N 2201/0084* (2013.01)

(58) Field of Classification Search
CPC ....... H04N 1/00485; H04N 2201/0084; G06K 15/005; G06K 15/1884; G06K 15/1885
See application file for complete search history.

(56) References Cited

U.S. PATENT DOCUMENTS

| | | | |
|---|---|---|---|
| 2002/0039141 A1* | 4/2002 | Washisu | H04N 1/0044 348/231.6 |
| 2003/0147097 A1 | 8/2003 | Kotani et al. | |
| 2003/0197894 A1 | 10/2003 | Miyamoto et al. | |
| 2005/0134939 A1 | 6/2005 | Ikeda et al. | |
| 2006/0146165 A1* | 7/2006 | Hagiwara | H04N 5/23293 348/333.01 |
| 2007/0019924 A1 | 1/2007 | Teo et al. | |
| 2009/0244096 A1 | 10/2009 | Yamaji et al. | |
| 2011/0075220 A1* | 3/2011 | Chiba | G06K 9/2081 358/2.1 |
| 2014/0085510 A1 | 3/2014 | Ichikawa | |

FOREIGN PATENT DOCUMENTS

| | | |
|---|---|---|
| JP | 2000-316131 A | 11/2000 |
| JP | 2001-324757 A | 11/2001 |
| JP | 2002-112164 A | 4/2002 |
| JP | 2002-225382 A | 8/2002 |
| JP | 2003-143513 A | 5/2003 |
| JP | 2004-268555 A | 9/2004 |
| JP | 2004-282225 A | 10/2004 |
| JP | 2005-045359 A | 2/2005 |
| JP | 2005-176216 A | 6/2005 |
| JP | 2006-033486 A | 2/2006 |
| JP | 2006-191301 A | 7/2006 |
| JP | 2007-281704 A | 10/2007 |
| JP | 2009-260957 A | 11/2009 |
| JP | 2012-020558 A | 2/2012 |
| JP | 2014-068276 A | 4/2014 |

OTHER PUBLICATIONS

An Office Action mailed by the Japanese Patent Office dated Nov. 28, 2019, which corresponds to Japanese Patent Application No. 2016-243284 and is related to U.S. Appl. No. 15/822,281.

An Office Action mailed by the Japanese Patent Office dated Feb. 6, 2020, which corresponds to Japanese Patent Application No. 2016-243284 and is related to U.S. Appl. No. 15/822,281; with English language translation.

* cited by examiner

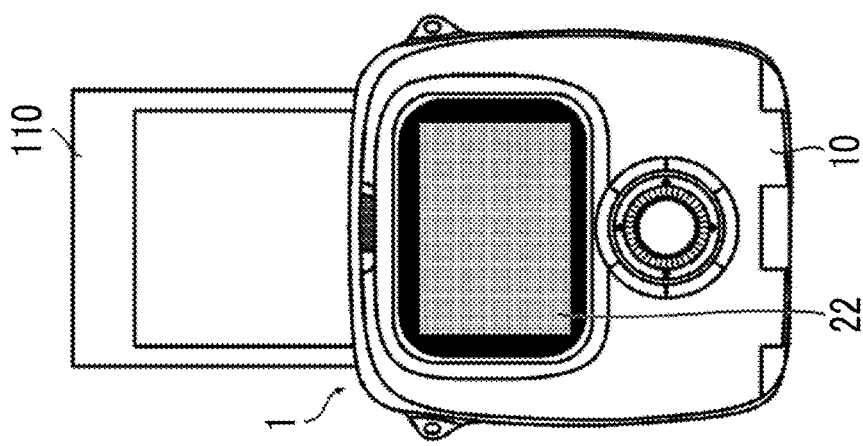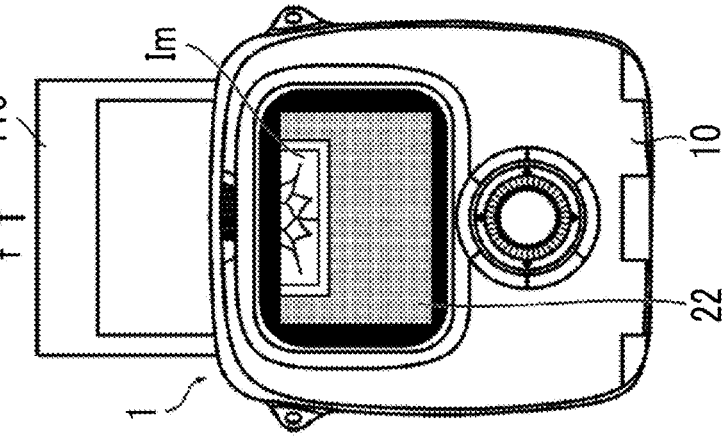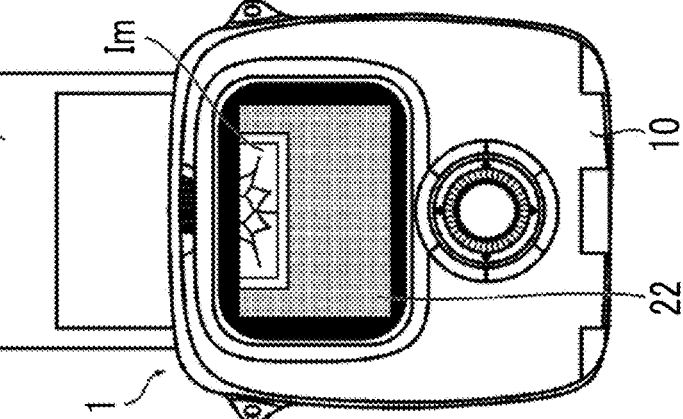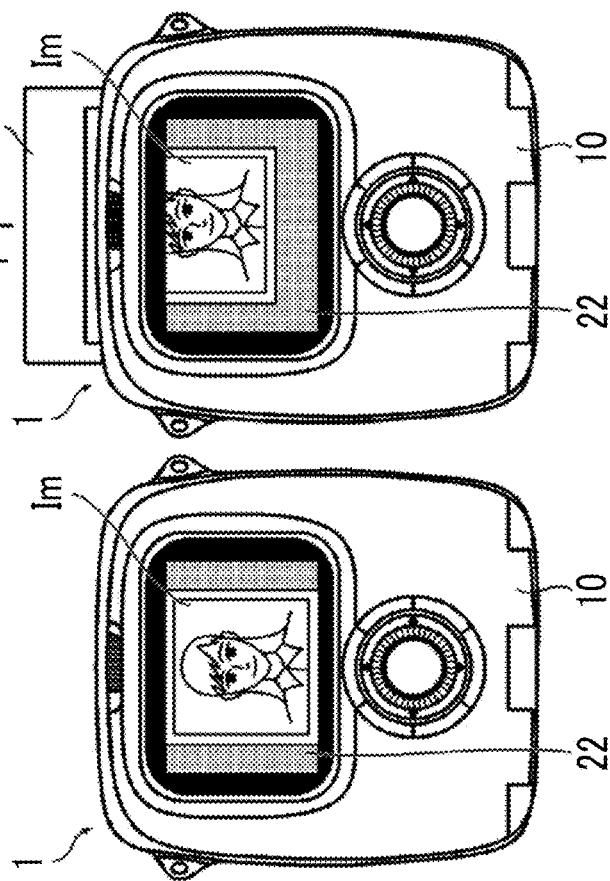

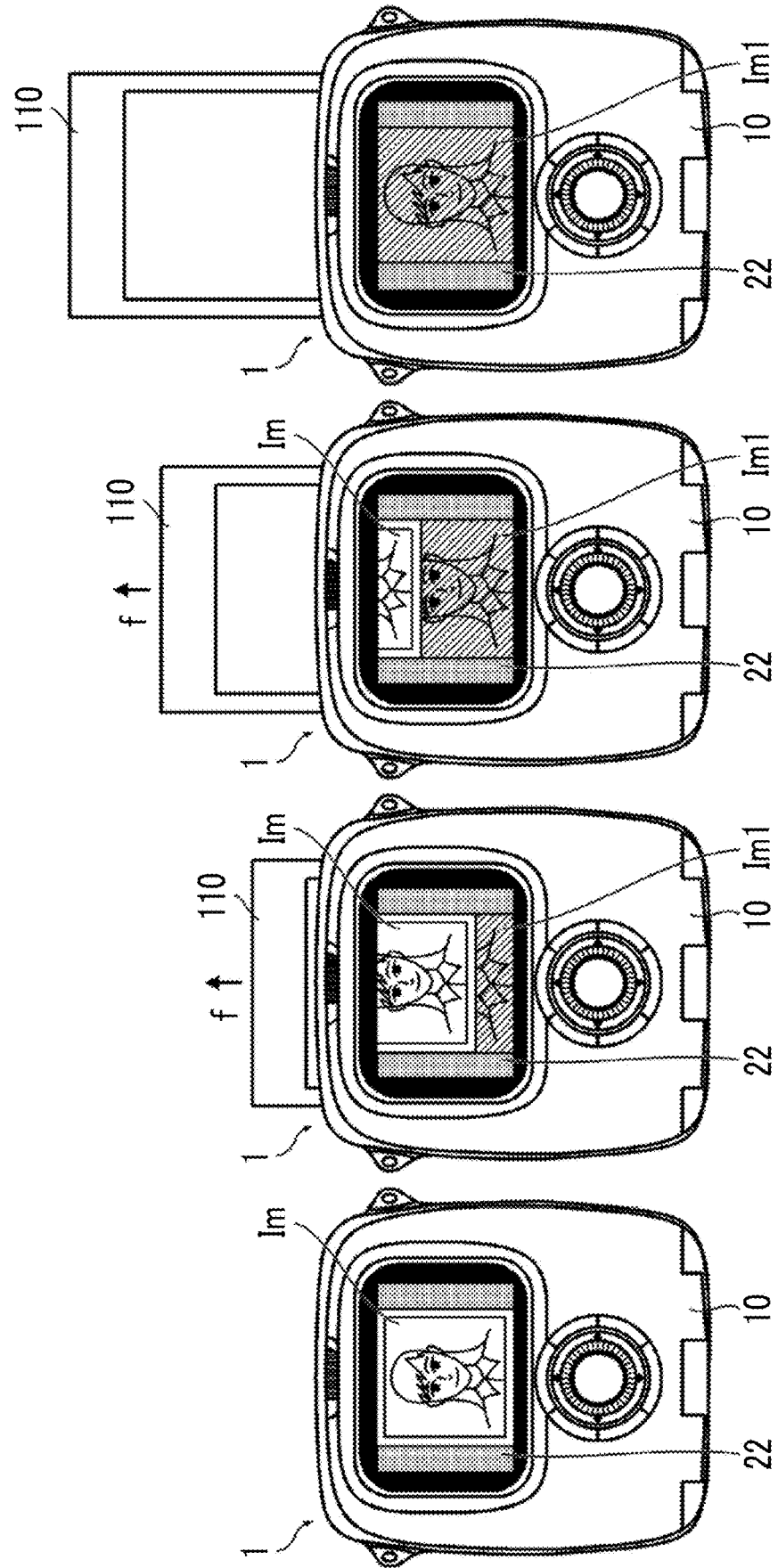

PRINTER, DIGITAL CAMERA WITH PRINTER, AND PRINTING METHOD

CROSS-REFERENCE TO RELATED APPLICATIONS

The present application claims priority under 35 U.S.C. § 119 to Japanese Patent Application No. 2016-243284, filed on Dec. 15, 2016. Each of the above application(s) is hereby expressly incorporated by reference, in its entirety, into the present application.

BACKGROUND OF THE INVENTION

1. Field of the Invention

The present invention relates to a printer, a digital camera with a printer, and a printing method, and particularly, to a printer, a digital camera with a printer, and a printing method which print an image acquired by combining a plurality of images on one medium.

2. Description of the Related Art

A digital camera which includes a printer built in a camera body and is capable of immediately printing a captured image has been known as a digital camera with a printer.

JP2002-112164A describes a method of printing a plurality of images on one medium as a method of printing an image by the digital camera with a printer.

SUMMARY OF THE INVENTION

However, since the contracted images are simply arranged and are merely printed on one medium, the printing method described in JP2002-112164A has a disadvantage that an image having photographic composition intended by a user is not able to be printed.

The present invention has been made in view of such circumstances, and it is an object of the present invention to provide a printer, a digital camera with a printer, and a printing method which are capable of simply printing an image having photographic composition intended by a user.

Means for solving the problems is as follows.

(1) There is provided a printer that splits a printable area of a medium into a plurality of frames, arranges a plurality of images in the frames, and prints an image acquired by combining the plurality of images on one medium. The printer comprises: a display unit; an operation unit; an image storage unit that stores a plurality of images; an image selection unit that displays a frame layout on the display unit, displays the images stored in the image storage unit in the frames based on an operation of the operation unit, and allows selection of the images to be arranged in the frames, the image selection unit cuts out portions of images corresponding to the frames and displays the images in the frames, and allows the user to select the images to be arranged in the frames in a case where the images are displayed in the frames; an image adjustment unit that adjusts the images to be arranged in the frames by zooming and/or moving the images to be arranged in the frames within the frames based on an operation of the operation unit; and a print instruction reception unit that receives an instruction to print an image being displayed on the display unit based on an operation of the operation unit.

According to the present aspect, it is possible to print the image acquired by combining the plurality of images on one medium by displaying the frame layout on the display unit and selecting the images to be arranged in the frames. The frame layout is the layout of the frames set by splitting the printable area of the medium. The images to be arranged in the frames are selected among the plurality of images stored in the image storage unit. The selection of the images is performed by displaying the images stored in the image storage unit in the frames. The switching of the images is performed based on the operation of the operation unit. In a case where the images are displayed in the frames, the portions of the images corresponding to the frames are cut out and the cut out images are displayed. For example, in a case where the frame layout that includes two leftward and rightward split frames is used, an image acquired by cutting out the right half of the image is displayed in the right frame, and an image acquired by cutting out the left half of the image is displayed in the left frame. The selected images are adjusted by being zoomed and/or moved within the frames if necessary. The adjustment is performed based on the operation of the operation unit. Accordingly, it is possible to generate an image having desired photographic composition. The generated image is printed according to the print instruction.

(2) In the printer according to (1), an image to be displayed in a frame in which setting of the image to be arranged is completed and an image to be displayed in a frame in which setting of the image to be arranged is being performed are displayed so as to be distinguished.

According to the present aspect, the image to be displayed in the frame in which the setting of the image to be arranged is completed and the image to be displayed in the frame in which setting of the image to be arranged is being performed are distinguishably displayed. Accordingly, it is possible to improve visibility, and it is possible to provide more favorable operability.

(3) In the printer according to 2, a difference in brightness and/or saturation is caused between two images, the image to be displayed in the frame in which the setting of the image to be arranged is completed and the image to be displayed in the frame in which setting of the image to be arranged is being performed.

According to the present aspect, a difference in brightness and/or saturation is caused between two images, the image to be displayed in the frame in which the setting of the image to be arranged is completed and the image to be displayed in the frame in which setting of the image to be arranged is being performed, and thus, these images are distinguishably displayed. Accordingly, it is possible to distinguish between the frame in which the setting of the image is completed and the frame in which the setting of the image is not completed at a first glance.

(4) In the printer according to (2) or (3), a mark indicating that the setting is completed is displayed in the frame in which the setting of the image to be arranged is completed.

According to the present aspect, the mark indicating that the setting is completed is given to the frame in which the setting of the image to be arranged is completed. Accordingly, it is possible to distinguish between the frame in which the setting of the image is completed and the frame in which the setting of the image is not completed at a first glance.

(5) In the printer according to any one of (1) to (4), the print instruction reception unit receives the instruction to print the image being displayed on the display unit based on an operation of the operation unit in a case where the setting of the images for all the frames is completed.

According to the present aspect, it is possible to print the image only in a case where the setting of the images for all the frames is completed. Accordingly, it is possible to previously prevent a print error.

(6) In the printer according to any one of (1) to (5), the image selection unit allows the selection of the images to be arranged in the frames in a previously determined order.

According to the present aspect, the images to be arranged in the frames are selected in the previously determined order. Accordingly, it is possible to automatically switch the frame in which the image is selected, and it is possible to further improve operability.

(7) The printer according to any one of (1) to (6) further comprises: a frame layout selection unit that displays a plurality of frame layouts on the display unit, and allows selection of a frame layout to be used in printing by an operation of the operation unit.

According to the present aspect, it is possible to select the frame layout. Accordingly, it is possible to simply print the image having the photographic composition intended by the user. The selection of the frame layout is performed by using the display unit and the operation unit. Specifically, the selectable frame layouts are displayed on the display unit, and the frame layout to be used in the printing is selected based on the operation of the operation unit. Accordingly, it is possible to simply select the desired frame layout.

(8) The printer according to any one of (1) to (7) further comprises: a recording control unit that records a printed image in the image storage unit.

According to the present aspect, it is possible to record the printed image in the image storage unit. Accordingly, it is possible to print the same image in the future.

(9) In the printer according to any one of (1) to (8), the operation unit includes direction keys, a rotary dial, and a confirmation button. The direction keys instruct to switch the images to be arranged and to move the images in the frames, the rotary dial instructs to zoom the image and the confirmation button confirms the images to be arranged in the frames.

According to the present aspect, the operation unit includes the direction keys, the rotary dial, and the confirmation button. The images to be arranged in the frames are switched by operating the direction keys. The images to be arranged in the frames are moved within the frames by operating the direction keys, and the images to be arranged in the frames are zoomed by operating the rotary dial. The confirmation button is operated, and thus, the images to be arranged in the frames are confirmed.

(10) In the printer according to (9), the rotary dial also functions as the direction keys, and has a ring shape, and the confirmation button is arranged in an inner circumference of the rotary dial.

According to the present aspect, the rotary dial also functions the direction keys, and a rotation operation and a direction operation are able to be performed by the rotary dial. Accordingly, it is possible to simplify the configuration. The rotary dial has a ring shape, and the confirmation button is arranged in the inner circumference thereof. Accordingly, it is possible to miniaturize the operation unit, and it is possible to provide favorable operability.

(11) In the printer according to (9) or (10), the print instruction reception unit displays a dialog for inquiring about printing on the display unit in a case where the setting of the images for all the frames is completed.

According to the present aspect, in a case where the setting of the images for all the frames is completed, the dialog for inquiring about the printing is displayed on the display unit. Accordingly, it is possible to previously prevent incorrect printing.

(12) In the printer according to (11), the print instruction reception unit displays the dialog from an edge of a screen near the operation unit in a case where the setting of the images for all the frames is completed.

According to the present aspect, the dialog for inquiring about the printing is displayed from the edge of the screen near the operation unit. Accordingly, it is possible to clarify the relationship between the operation unit and the dialog, and it is possible to provide favorable operability.

(13) The printer according to any one of (1) to (12) further comprises: an operation guide display control unit that displays an operation guide on the display unit.

According to the present aspect, the operation guide is displayed on the display unit. The operation guide is display for guiding an operation content using the operation unit. For example, the operation contents assigned to the operation members are displayed. Accordingly, it is possible to provide favorable operability.

(14) In the printer according to (13), the operation guide display control unit displays the operation guide while avoiding a frame in which an image is being selected and a frame in which an image is being adjusted.

According to the present aspect, the operation guide is displayed while avoiding the frame in which the image is being selected and the frame in which the image is being adjusted. Accordingly, it is possible to improve the visibility of the image in the frame in which the image is being selected, and it is possible to further improve operability.

(15) There is provided a digital camera with a printer comprises: an image sensor; a capturing instruction unit that transmits an instruction to capture an image; a capturing control unit that captures an image by the image sensor, and records the acquired image in the image storage unit in a case where the instruction to capture the image is received from the capturing instruction unit; and the printer according to any one of (1) to (14).

According to the present aspect, the printer according to any one of (1) to (14) is provided in the digital camera. Accordingly, it is possible to print the image acquired by combining the captured images on one medium.

(16) There is provided a printing method of arranging images in frames set by splitting a printable area of a medium into a plurality of frames and printing an image in a printer that includes a display unit, an operation unit, and an image storage unit which stores a plurality of images. The method comprises: a process of displaying a frame layout on the display unit; a process of displaying the images stored in the image storage unit in the frames and selecting the images to be arranged in the frames based on an operation of the operation unit, wherein the process of displaying the images and selecting the images includes a process of cutting out portions of the images corresponding to the frames, and displaying the images in the frames, and selecting the images to be arranged in the frames, in a case where the images are displayed in the frames; a process of adjusting the images to be arranged in the frames by zooming and/or moving the images to be arranged in the frames within the frames based on an operation of the operation unit; a process of receiving an instruction to print an image being displayed on the display unit based on an operation of the operation unit; and a process of printing the image being displayed on the display unit based on a print instruction.

According to the present aspect, it is possible to print the image acquired by combining the plurality of images on one medium by displaying the frame layout on the display unit and selecting the images to be arranged in the frames. The images to be arranged in the frames are selected among the plurality of images stored in the image storage unit. The selection of the images is performed by displaying the images stored in the image storage unit in the frames. The switching of the images is performed based on the operation of the operation unit. In a case where the images are displayed in the frames, the portions of the images corresponding to the frames are cut out and the cut out images are displayed. For example, in a case where the frame layout that includes two leftward and rightward split frames is used, an image acquired by cutting out the right half of the image is displayed in the right frame, and an image acquired by cutting out the left half of the image is displayed in the left frame. The selected images are adjusted by being zoomed and/or moved within the frames if necessary. The adjustment is performed based on the operation of the operation unit. Accordingly, it is possible to generate an image having desired photographic composition. The generated image is printed according to the print instruction.

According to the present invention, it is possible to simply print an image having photographic composition intended by a user.

BRIEF DESCRIPTION OF THE DRAWINGS

FIGS. 14A to 14D are diagrams showing the transition of the screen display of the monitor in a case where a print animation process is performed.

FIGS. 34A to 34D are diagrams showing examples of print animation in a case where an image for print checking is previously displayed.

DESCRIPTION OF THE PREFERRED EMBODIMENTS

Hereinafter, a preferred embodiment of the present invention will be described in detail with reference to the accompanying drawings.

Digital Camera with Printer

External Appearance Configuration

FIGS. 1 to 4 are a front perspective view, a rear perspective view, a front view, and a rear view showing an embodiment of a digital camera with a printer, respectively.

Figure 1:
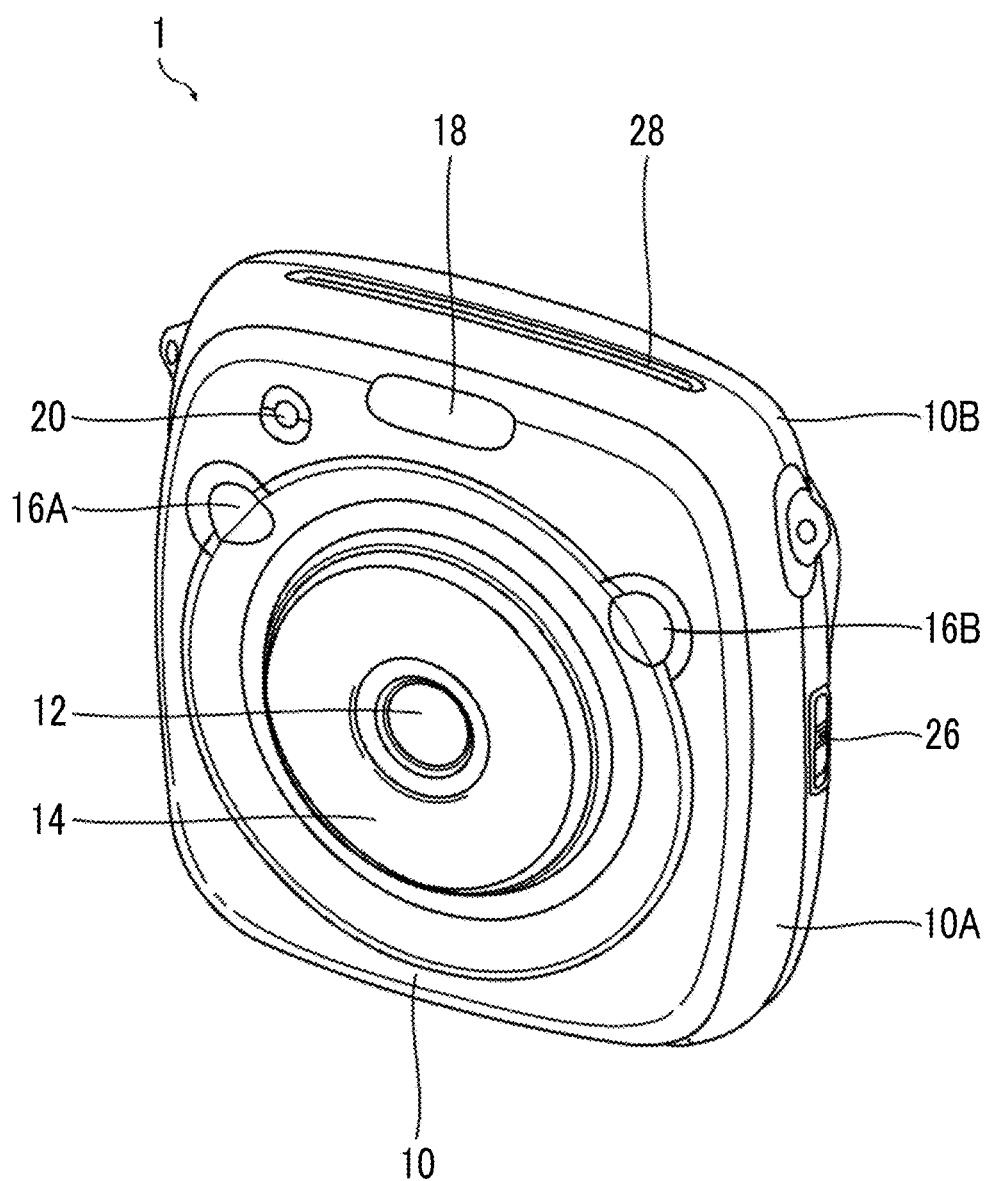
FIG. 1 is a front perspective view showing an embodiment of a digital camera with a printer.
Figure 2:
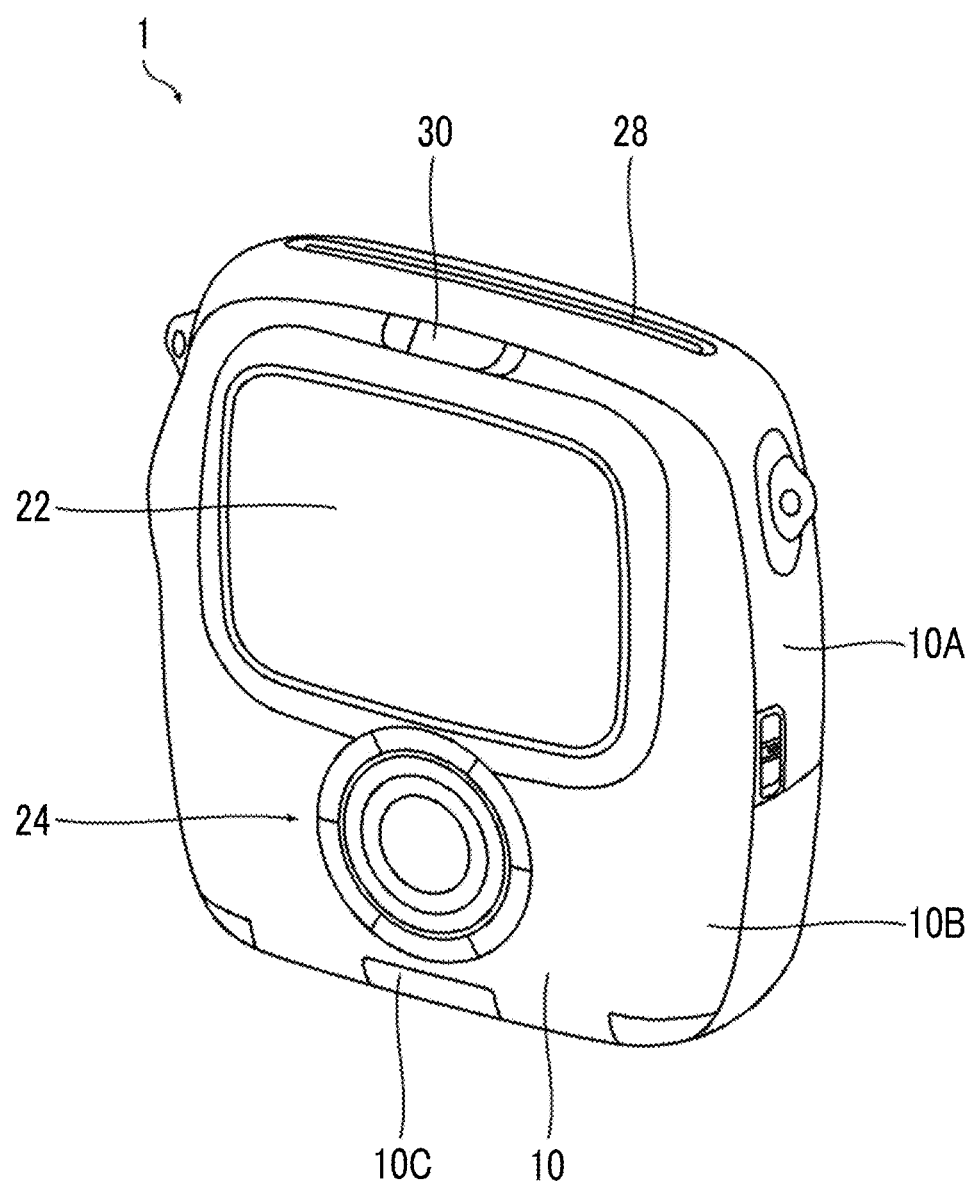
FIG. 2 is a rear perspective view showing the embodiment of the digital camera with a printer.
Figure 3:
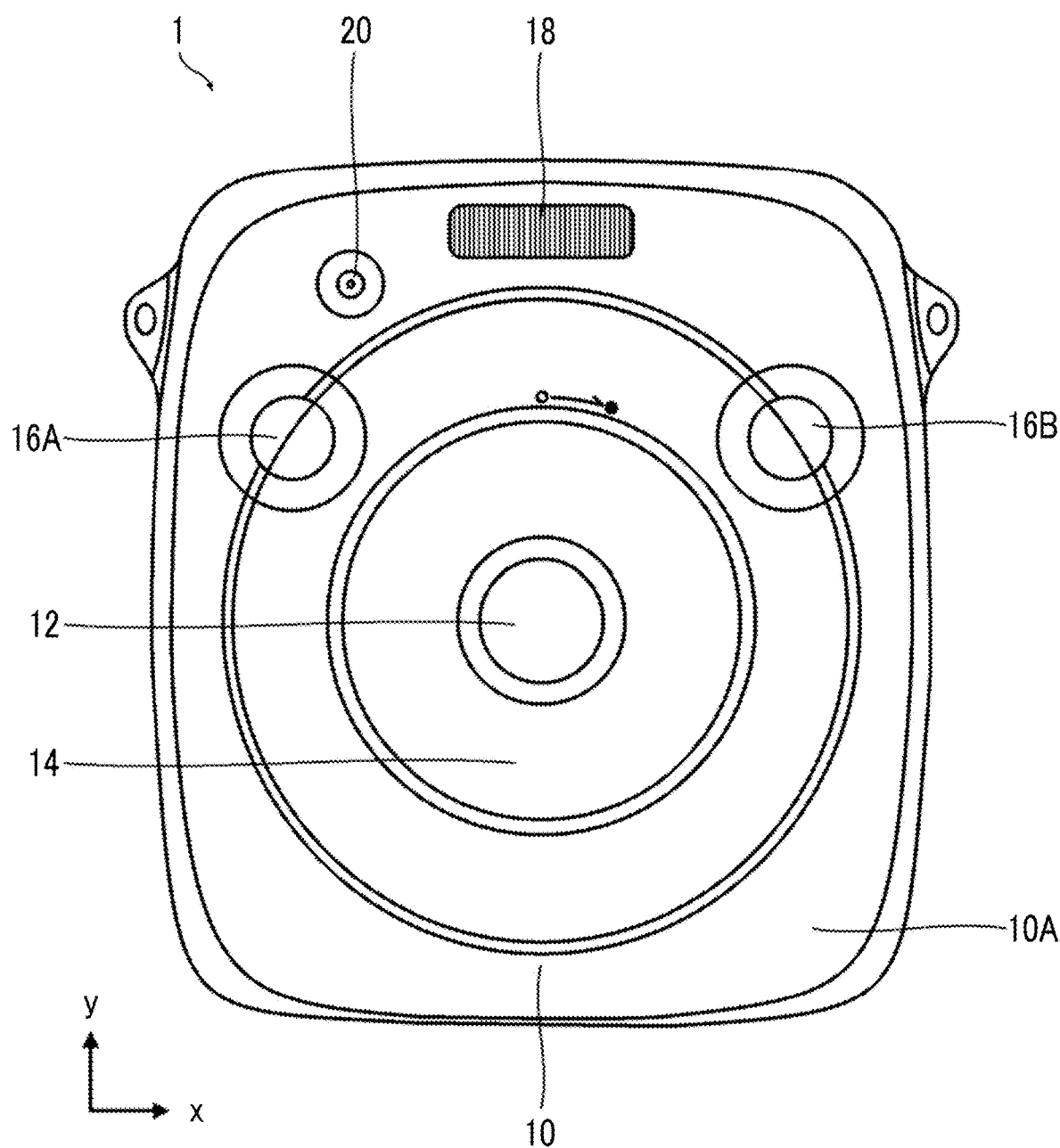
FIG. 3 is a front view showing the embodiment of the digital camera with a printer.
Figure 4:
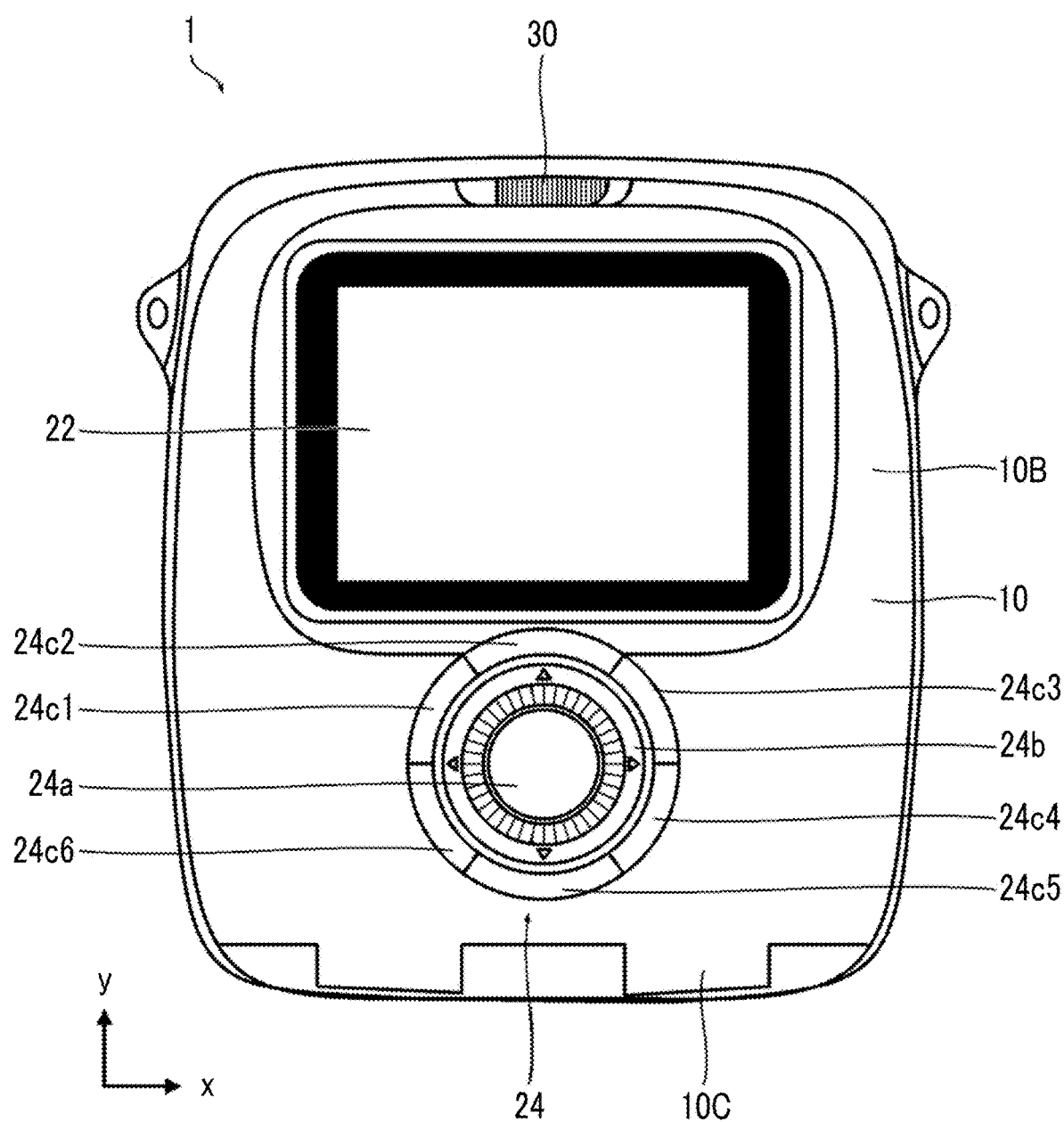
FIG. 4 is a rear view showing the embodiment of the digital camera with a printer.

A digital camera with a printer 1 shown in FIGS. 1 to 4 is a digital camera with a printer that uses an instant film as a medium for printing. In FIGS. 3 and 4, it is assumed that a direction represented by an arrow x is a leftward and rightward direction and a direction represented by an arrow y is an upward and downward direction. The leftward and rightward direction is a synonym for a horizontal direction or a width direction. The upward and downward direction is a synonym for a height direction.

The digital camera 1 with a printer includes a portable camera body 10. The camera body 10 includes an imaging lens 12, a power ring 14, a first release button 16A, a second release button 16B, a flash 18, and an auxiliary light lamp 20 which are provided in the front. The camera body 10 includes a monitor 22 and a rear operation unit 24 which are provided at the rear. The camera body 10 includes a capturing mode switching lever 26 which is provided on the right side and a print ejection port 28 which is provided at the top.

Camera Body

The camera body 10 has a rounded flat block shape as a whole. The camera body 10 has a bilaterally symmetrical shape as a whole so as to be gripped with either of the left and right hands.

The camera body 10 includes a main body 10A and a back cover 10B. The back cover 10B constitutes the rear of the camera body 10, and is provided so as to be opened and closed with respect to the main body 10A through a hinge 10C. A back cover locking mechanism that locks the back cover 10B is provided at the main body 10A. In a case where the back cover is closed, the back cover 10B is automatically locked by the back cover locking mechanism. The back cover is unlocked by a sliding type unlocking lever 30 provided at the back cover 10B. However, the unlocking lever is not able to be operated during the printing. That is, the unlocking lever is forcibly locked such that the back cover 10B is not opened during the printing.

Imaging Lens

The imaging lens 12 is arranged in a substantially central position in the front of the camera body 10. The imaging lens 12 is a unifocal lens.

Power Ring

The power ring 14 is an operation member that powers on and off the digital camera 1 with a printer. The power ring 14 has a ring shape, and is arranged on the same axis as that of the imaging lens 12. The power ring 14 is rotated around the imaging lens 12, and powers on and off the digital camera 1 with a printer. Since a movable range of the power ring 14 is restricted, the power of the digital camera 1 with a printer is powered on in a case where the power ring rotates up to one end of the movable range, and the power of the digital camera 1 with a printer is powered off in a case where the power ring rotates up to the other end of the movable range.

First Release Button and Second Release Button

The first release button 16A and the second release button 16B are operation members for transmitting an instruction to capture an image, and are examples of a capturing instruction unit. The first release button 16A and the second release button 16B are provided in the front of the camera body 10, and are arranged so as to be bilaterally symmetric with respect to each other. The first release button 16A and the second release button 16B are so-called two-stage stroke type push buttons capable of being "half push" operated and "fully push" operated. The digital camera 1 with a printer performs capturing preparation by operating the half push of the first release button 16A or the second release button 16B, and performs actual capturing by operating the fully push of the first or second button. The actual capturing is capturing for recording an image.

Flash

The flash 18 is provided in the front of the camera body 10, and is arranged substantially directly above the imaging lens 12. The flash 18 is a xenon tube.

Auxiliary Light Lamp

The auxiliary light lamp 20 is a lamp that emits auxiliary light for autofocus (AF). The auxiliary light lamp 20 emits the light in a case where capturing is performed under a dark environment, and is used as the auxiliary light for AF. The auxiliary light lamp 20 is a light emitting diode (LED), and is provided in the front of the camera body 10.

Monitor

The monitor 22 is an example of a display unit. The monitor 22 is a color liquid crystal display (LCD). The monitor 22 is provided at the rear of the camera body 10. The monitor 22 is a so-called wide monitor, and includes a horizontally long screen.

Rear Operation Unit

The rear operation unit 24 includes an OK button 24a, a command dial 24b, and six function buttons 24c1 to 24c6. The OK button 24a, the command dial 24b, and the six function buttons 24c1 to 24c6 are arranged so as to be concentric, and constitute a circular operation unit as a whole. The rear operation unit 24 is provided at the rear of the camera body 10. Both the monitor 22 and the rear operation unit 24 are arranged in the center at the rear of the camera body 10 in the width direction, and are vertically arranged. Particularly, the rear operation unit 24 is arranged in a position where the rear operation unit is able to be operated with the thumb of the hand that grasps the camera body 10, and is arranged so as to be bilaterally symmetric such that the rear operation unit is able to be operated with the substantially same feeling of operation with either the left and right hands.

OK Button

The OK button 24a is a button for transmitting an instruction to input OK for an inquiry. The OK button 24a is a circular push button, and is arranged in the center of the rear operation unit 24.

The OK button 24a also functions as a confirmation button or a menu button. The confirmation button is a button for confirming the selected item. The menu button is a button for calling a menu screen on the monitor 22.

Command Dial

The command dial 24b is a ring-shaped touch sensor, and is rotated by passing the finger across the surface thereof along the circle. The command dial 24b also functions as a cross key, and is able to be pushed in four up, down, left, and right directions. The command dial 24b is an example of a rotary dial functioning as direction keys.

The command dial 24b is arranged on the same axis as that of the OK button 24a, and the OK button 24a is arranged in an inner circumference of the command dial 24b. Accordingly, it is possible to operate the command dial 24b and the OK button 24a with the thumb of the hand that grips the camera body 10, and it is possible to provide favorable operability.

Function Buttons

The six function buttons 24c1 to 24c6 are arranged in the same circumference, and constitute one circle as a whole. The buttons have the same shape, and have a shape in which the ring is equally split into six. Each button is a push button.

The first function button 24c1 functions as a vignetting button. Hereinafter, the first function button 24c1 is referred to as the vignetting button. The vignetting button is a button for calling a function of performing a vignetting process on an image. The vignetting process is a process of reducing the brightness at an edge part of the image.

The second function button 24c2 functions as an effect button. Hereinafter, the second function button 24c2 is referred to as the effect button. The effect button is a button for calling a function of performing an effect process on an image. The effect process is a process of giving a certain effect to the image, and corresponds to, for example, a process of changing the tone of the image or blurring the image.

The third function button 24c3 functions as a brightness button. Hereinafter, the third function button 24c3 is referred to as the brightness button. The brightness button is a button for calling a function of changing the brightness of an image.

The fourth function button 24c4 functions as a print button. Hereinafter, the fourth function button 24c4 is referred to as the print button. The print button is a button for transmitting an instruction to print an image being displayed on the monitor 22.

The fifth function button 24c5 functions as a back button. Hereinafter, the fifth function button 24c5 is referred to as the back button. The back button is a button for transmitting an instruction to return the image in an immediately previous state. Since the image is returned to be in the immediately previous state, the selected item or the instructed item is canceled. Accordingly, the back button 24c5 also functions as a cancel button.

The sixth function button 24c6 functions as a playback button. Hereinafter, the sixth function button 24c6 is referred to as the playback button. The playback button is a button for transmitting an instruction to switch the digital camera with a printer to a playback mode. In a case where the playback button 24c6 is pushed in a state in which the digital camera with a printer is set in the capturing mode, the digital camera 1 with a printer is switched to the playback mode.

The switching from the playback mode to the capturing mode is performed by operating the first release button 16A or the second release button 16B. That is, in a case where the first release button 16A or the second release button 16B is pushed in a state in which the digital camera 1 with a printer is set in the playback mode, the digital camera with a printer is switched to the capturing mode.

Capturing Mode Switching Lever

The capturing mode switching lever 26 is an operation member for switching the capturing mode. The capturing mode switching lever 26 is a sliding type switch, and is provided on the right side of the camera body 10. The capturing mode switching lever 26 is operated to be slid, and the capturing mode is set to be an "auto mode" in a case where the capturing mode switching lever is set in an "auto position", and the capturing mode is set to be a "manual mode" in a case where the capturing mode switching lever is set in a "manual position". In a case where an image is captured in the auto mode, the captured image is automatically printed. Meanwhile, in a case where an image is captured in the manual mode, the image is printed according to an instruction from a user. The details thereof will be described below.

Print Ejection Port

The print ejection port 28 is an ejection port of the printed instant film. The print ejection port 28 is a slit through which the instant film is able to pass, and is provided in the center at the top of the camera body 10 in the width direction. An instant film 110 is ejected directly upwards from the print ejection port 28.

Internal Mechanical Configuration

Figure 5:
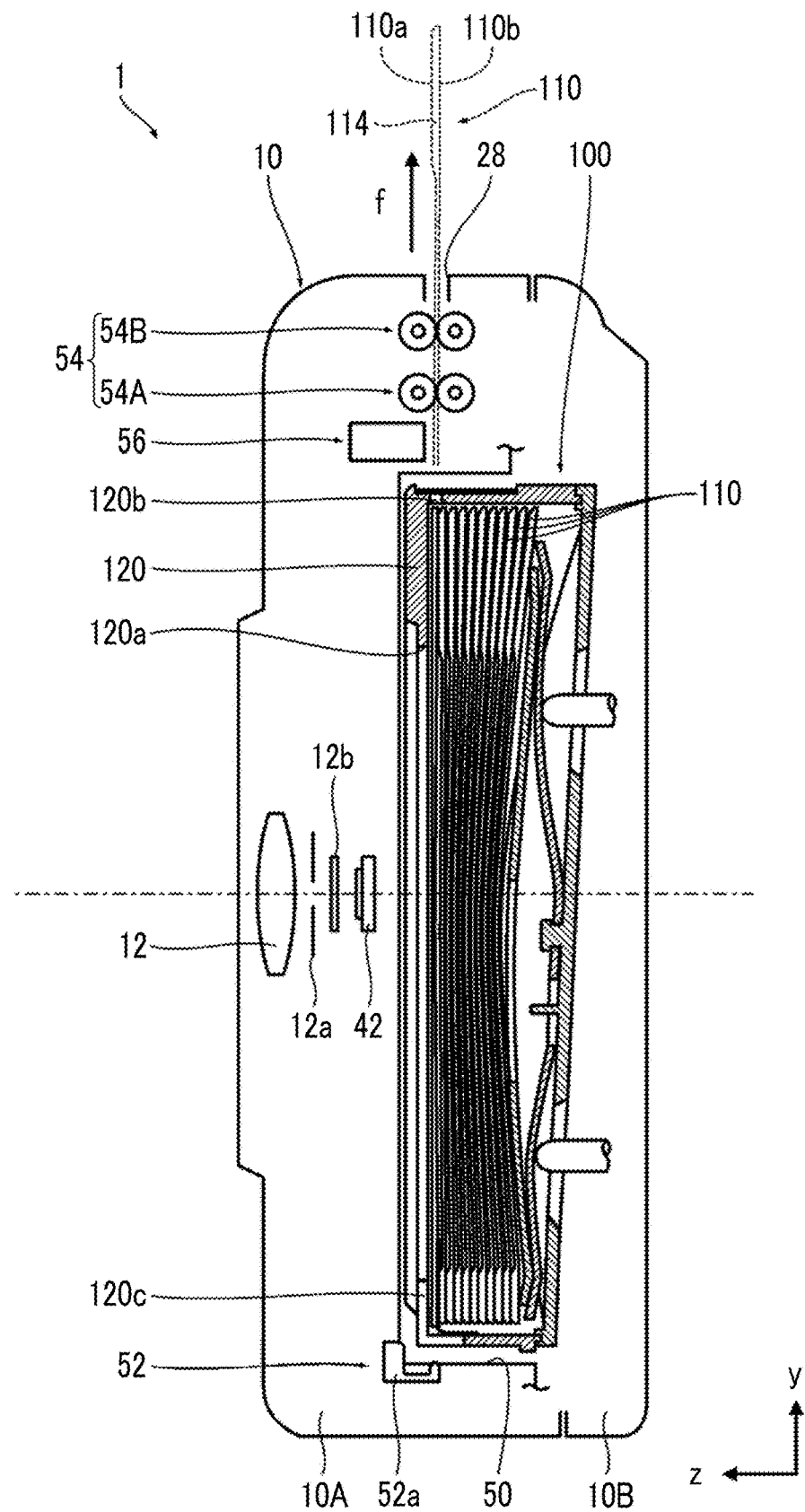
FIG. 5 is a diagram showing an internal mechanical configuration of the digital camera with a printer.

FIG. 5 is a diagram showing an internal mechanical configuration of the digital camera with a printer. FIG. 5 shows only the configuration of main units. It is assumed in FIG. 5 that a direction represented by an arrow z is a thickness direction of the digital camera 1 with a printer.

As the configuration related to the digital camera, the imaging lens 12 and an image sensor 42 are provided within the digital camera 1 with a printer. As the configuration related to the printer, an instant film pack 100, a film loading room 50, a film delivery mechanism 52, a film transport mechanism 54, and a print head 56 are provided.

Configuration Related to Digital Camera

Imaging Lens The imaging lens 12 is constituted by a plurality of lenses including a focus lens. In FIG. 5, only one lens is shown for simplicity of illustration. A focal length of the imaging lens 12 is adjusted by moving the focus lens back and forth along an optical axis.

A stop 12a and a shutter 12b are provided in the imaging lens 12. The light amount of light passing through the imaging lens 12 is adjusted by the stop 12a. The light passing through the imaging lens 12 is shielded by the shutter 12b.

Image Sensor

For example, the image sensor 42 is a two-dimensional solid image pickup element such as a charge coupled device (CCD) image sensor or a complementary metal oxide semiconductor (CMOS) image sensor. The image sensor 42 includes an image pickup area having an aspect ratio corresponding to a printable area of the instant film to be used.

Configuration Related to Printer

Instant Film Pack

The instant film pack 100 has a structure in which a plurality of instant films 110 is accommodated in a case 120.

Figure 6:
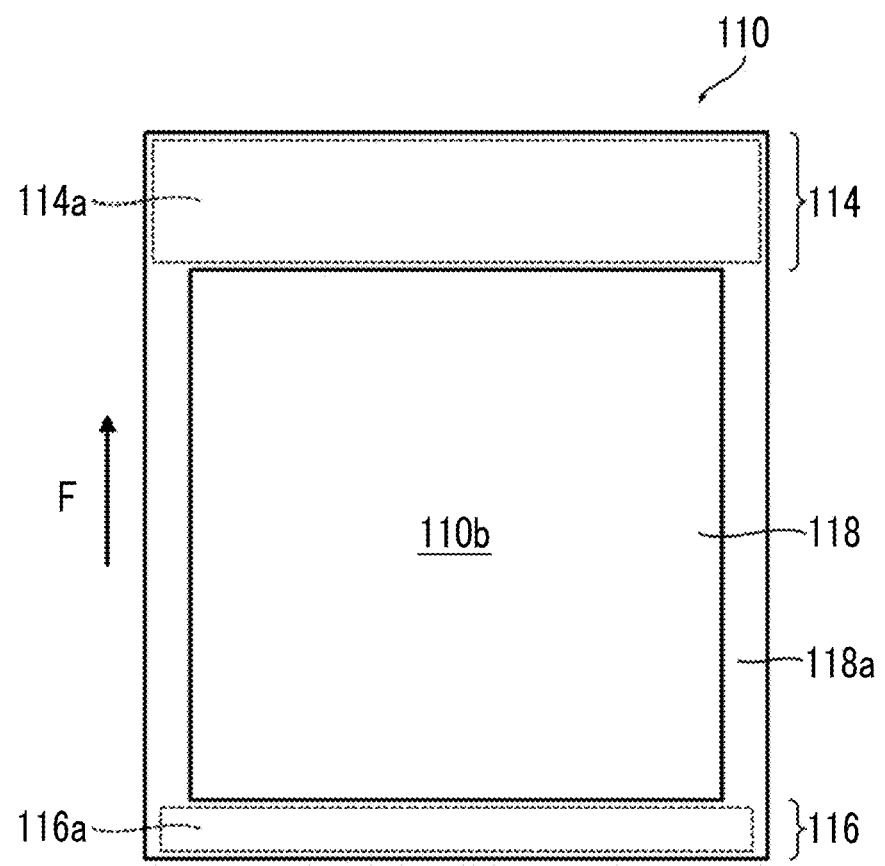
FIG. 6 is a front view of an instant film.
Figure 7:
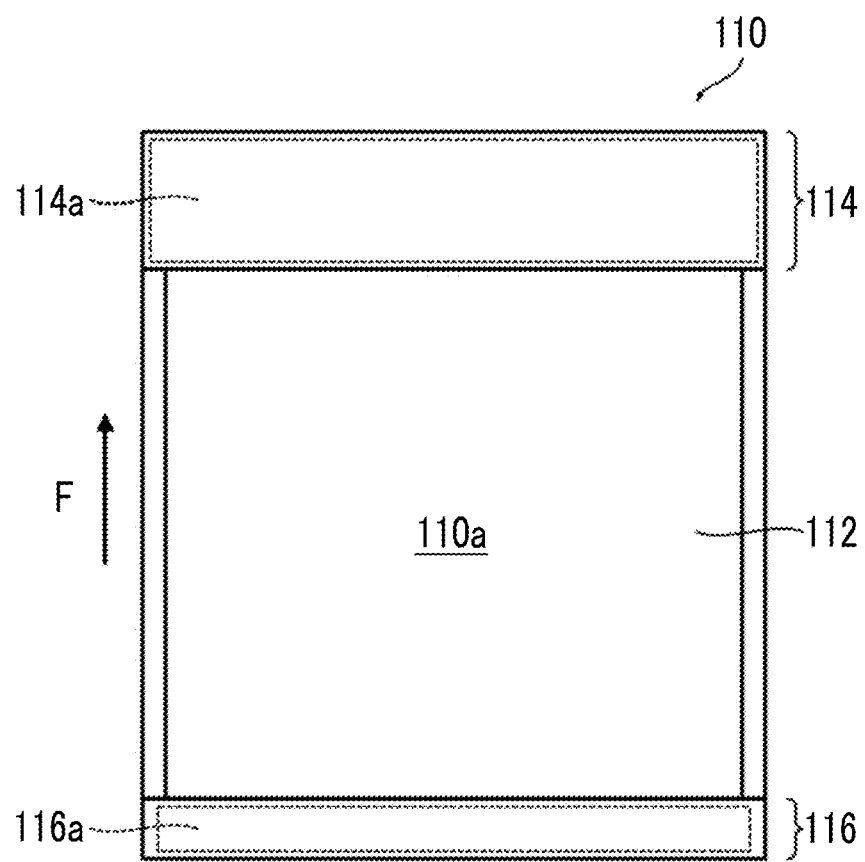
FIG. 7 is a rear view of the instant film.

FIG. 6 is a front view of the instant film. FIG. 7 is a rear view of the instant film.

In FIGS. 6 and 7, a direction represented by an arrow F is a utilization direction of the instant film 110. That is, the instant film 110 is sent toward the direction represented by the arrow F, and the instant film 110 is used. Accordingly, in a case where the instant film is loaded into the digital camera 1 with a printer, the direction represented by the arrow F is an ejection direction of the instant film 110.

The instant film 110 has a rectangular card shape. The instant film 110 includes an exposure surface 110a which is a rear surface and an observation surface 110b which is a front surface. The exposure surface 110a is a surface on which an image is recorded through exposure, and the observation surface 110b is a surface through which the recorded image is observed.

As shown in FIG. 7, an exposure part 112, a pod part 114, and a trap part 116 are provided on the exposure surface 110a of the instant film 110.

The exposure part 112 is a part in which an image is recorded through exposure. The exposure part 112 is a printable area of the instant film 110. The pod part 114 and the trap part 116 are arranged on front and rear sides with the exposure part 112 interposed therebetween. The instant film 110 of the present embodiment includes a square-shaped exposure part 112 of which an aspect ratio is 1:1.

The pod part 114 is arranged on the front side of the exposure part 112 in the utilization direction F. A development treatment liquid pod 114a that contains a development treatment liquid is provided within the pod part 114.

The trap part 116 is arranged on the rear side of the exposure part 112 in the utilization direction F. An absorbing material 116a is provided within the trap part 116.

As shown in FIG. 6, an observation part 118 is provided on the observation surface 110b of the instant film 110. The observation part 118 is a part in which the image is displayed. The image is displayed on the observation part 118 by performing a development treatment on the exposure part 112. The observation part 118 is arranged so as to correspond to the exposure part 112. A frame 118a is provided around the observation part 118. Accordingly, the image is displayed within the frame. An aspect ratio of the observation part 118 is 1:1 which is the same as that of the exposure part 112, and has a square shape.

The instant film 110 is observed in an orientation in which the trap part 116 is at the top and the pod part 114 is at the bottom. Accordingly, the image is printed in an orientation in which the trap part 116 is at the top and the pod part 114 is at the bottom.

The development treatment liquid of the pod part 114 spreads over the exposure part 112 after the exposure, and thus, the development treatment is performed on the instant film 110. The instant film 110 passes between roller pairs, and thus, the development treatment liquid of the pod part 114 is extruded from the pod part 114 and spreads over the exposure part 112. The development treatment liquid remaining after the spreading is trapped in the trap part 116.

The case 120 has a rectangular box shape. The case 120 includes an opening 120a for exposure which is provided in the front, and includes a slit-shaped ejection port 120b which is provided at the top. The instant films 110 are accommodated so as to overlap each other within the case in a state in which the exposure surface 110a faces the front of the case 120 and the pod part 114 faces the top of the case 120.

The case 120 includes a slit-shaped claw opening 120c in the bottom. A claw enters the claw opening 120c, and thus, the instant films 110 accommodated in the case 120 are sent toward the ejection port 120b one by one, and are ejected from the ejection port 120b.

Ten instant films 110 are accommodated in one instant film pack 100.

Film Loading Room

The film loading room 50 is a loading part of the instant film pack 100. The film loading room 50 is provided as a recess part capable of accommodating the instant film pack 100 in the main body 10A of the camera body 10. In a case where the back cover 10B of the camera body 10 is opened, the film loading room 50 is exposed, and the instant film pack 100 is able to be loaded.

Film Delivery Mechanism

The film delivery mechanism 52 delivers the instant films 110 from the instant film pack 100 loaded into the film loading room 50 one by one. The film delivery mechanism 52 includes a claw 52a that moves back and forth along a delivery direction of the instant film 110. The instant films 110 within the case are extracted by the claw 52a one by one, and the instant film 110 is delivered from the instant film pack 100.

Film Transport Mechanism

The film transport mechanism 54 transports the instant film 110 delivered from the instant film pack 100 by the film delivery mechanism 52 at a certain speed. The film transport mechanism 54 includes a transport roller pair 54A and a spreading roller pair 54B.

The transport roller pair 54A is rotated by being driven by a motor (not shown), and transports the instant film while clamping both sides of the instant film 110.

The spreading roller pair 54B is rotated by being driven by a motor (not shown), and transports the instant film 110 while clamping the entire instant film. The pod part 114 of the instant film 110 is pushed during the transporting, and the development treatment liquid spreads.

Print Head

The print head 56 records an image on the instant film 110 delivered from the instant film pack 100. The print head 56 is a line-type exposure head. The print head 56 irradiates the exposure surface 110a of the instant film 110 transported by the film transport mechanism 54 with print light for every line, and records the image on the instant film 110 in one pass.

Electric Configuration

Figure 8:
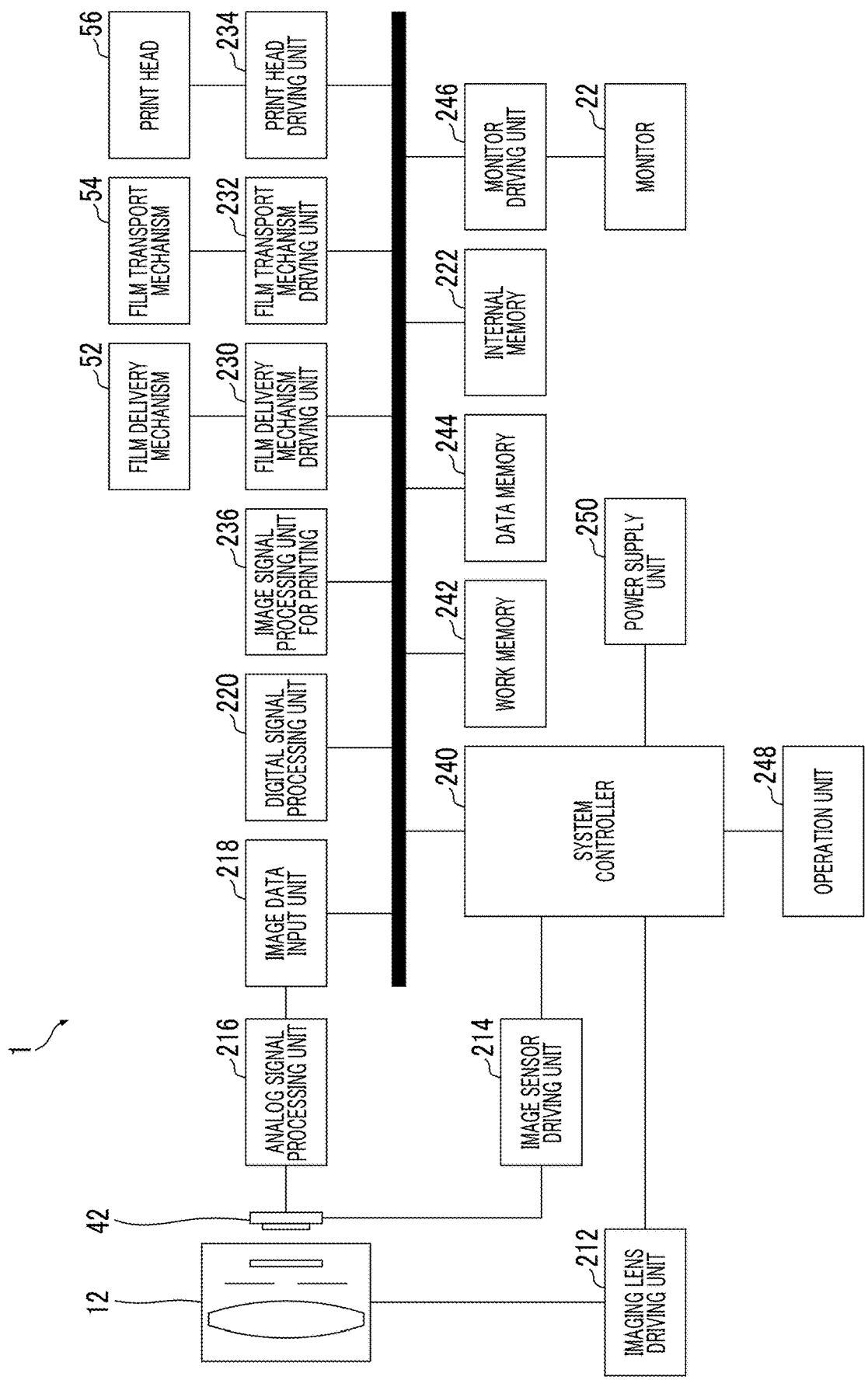
FIG. 8 is a diagram showing an electric configuration of the digital camera with a printer.

FIG. 8 is a diagram showing an electric configuration of the digital camera with a printer. FIG. 8 shows only the configuration of main units.

As the configuration related to the digital camera, the digital camera 1 with a printer includes the imaging lens 12, an imaging lens driving unit 212, the image sensor 42, an image sensor driving unit 214, an analog signal processing unit 216, an image data input unit 218, a digital signal processing unit 220, and an internal memory 222. As the configuration related to the printer, the digital camera with a printer includes the film delivery mechanism 52, a film delivery mechanism driving unit 230, the film transport mechanism 54, a film transport mechanism driving unit 232, the print head 56, a print head driving unit 234, and an image signal processing unit 236 for printing. As the configuration common to the digital camera and the printer, the digital camera with a printer includes a system controller 240, a work memory 242, a data memory 244, the monitor 22, a monitor driving unit 246, an operation unit 248, and a power supply unit 250. The system controller 240 functions as the overall control unit.

Configuration Related to Digital Camera

Imaging Lens Driving Unit

The imaging lens driving unit 212 is driving means of the imaging lens 12. The imaging lens driving unit 212 drives the focus lens, drives the stop 12a, and drives the shutter 12b. The imaging lens driving unit 212 drives the imaging lens 12 under the control of the system controller 240.

Image Sensor Driving Unit

The image sensor driving unit 214 is driving means of the image sensor 42. The image sensor driving unit 214 drives the image sensor 42 under the control of the system controller 240.

Analog Signal Processing Unit

The analog signal processing unit 216 receives a signal output from the image sensor 42, converts the received signal into a digital image signal by performing required signal processing such as correlative double sampling processing or amplification processing on the received signal, and outputs the converted digital image signal.

Image Data Input Unit

The image data input unit 218 receives the digital image signal output from the analog signal processing unit 216 under the control of the system controller 240. One received image data item is stored in the work memory 242.

Digital Signal Processing Unit

The digital signal processing unit 220 performs required signal processing such as demosaicing, white balance correction, gamma correction, or contour correction on the image data stored in the work memory 242, and generates predetermined image data including luminance data (Y data) and color difference data items (Cr and Cb data items).

The digital signal processing unit 220 processes the image data under the control of the system controller 240.

Internal Memory

The internal memory 222 is an example of an image storage unit, and stores the image acquired through the capturing. For example, the internal memory 222 is a non-volatile memory such as electrically erasable programmable read only memory (EEPROM).

Configuration Related to Printer

Film Delivery Mechanism Driving Unit

The film delivery mechanism driving unit 230 is driving means of the film delivery mechanism 52. The film delivery mechanism driving unit 230 drives the claw 52a under the control of the system controller 240.

Film Transport Mechanism Driving Unit

The film transport mechanism driving unit 232 is driving means of the film transport mechanism 54. The film transport mechanism driving unit 232 drives the transport roller pair 54A and the spreading roller pair 54B such that these roller pairs are rotated according to a command from the system controller 240.

Print Head Driving Unit

The print head driving unit 234 is driving means of the print head 56. The print head driving unit 234 drives the print head 56 under the control of the system controller 240.

Image Signal Processing Unit for Printing

The image signal processing unit 236 for printing generates image data for printing under the control of the system controller 240. The image data for printing is image data to be recorded on the instant film 110 by the print head 56. The print head 56 is driven based on the image data for printing generated by the image signal processing unit 236 for printing, and records the image on the instant film 110.

Configuration Common to Digital Camera and Printer

System Controller

The system controller 240 is the overall control unit of the digital camera 1 with a printer. The system controller 240 is a computer, and provides various functions by executing a predetermined program.

The system controller 240 executes the predetermined program, and thus, the digital camera 1 with a printer of the present embodiment functions as an image selection unit 240a, a frame layout selection unit 240b, an image adjustment unit 240c, an operation guide display control unit 240d, a print instruction reception unit 240e, a recording control unit 240f, and an capturing control unit 240g.

Figure 9:
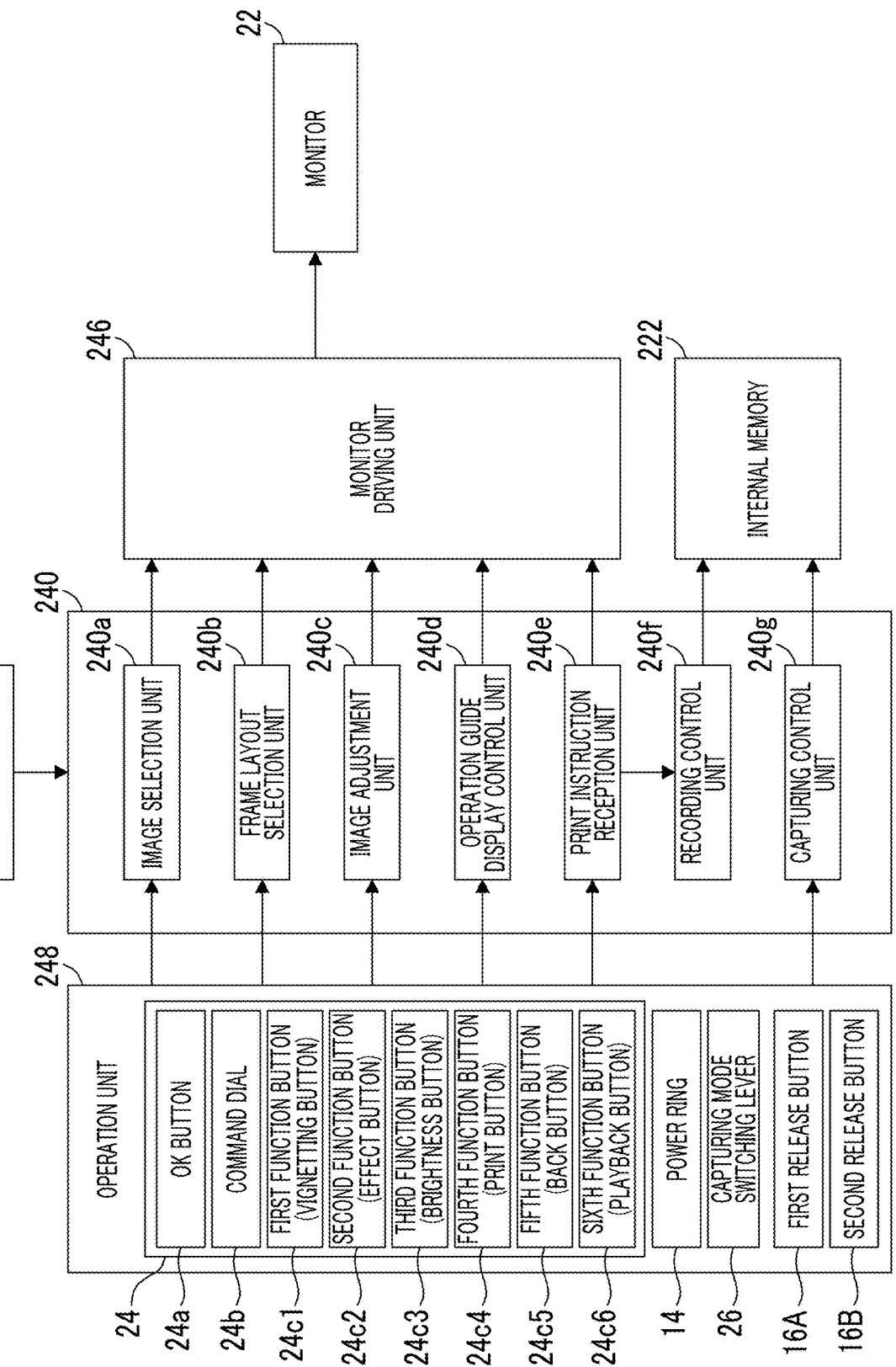
FIG. 9 is a block diagram of functions implemented by a system controller.

FIG. 9 is a block diagram of the functions implemented by the system controller.

Image Selection Unit

The image selection unit 240a performs a process of allowing the user to select the images to be arranged in the frames in a case where split print is performed.

In this case, the split print means that the printable area of the instant film 110 is split into a plurality of frames, the images are arranged in the frames, and the images are printed on one instant film 110.

The image selection unit 240a displays a frame layout on the monitor 22, and allows the user to select the images to be arranged in the frames. The images are selected based on an operation of the operation unit 248. Specifically, the image selection unit sequentially displays the images recorded in the internal memory 222 in the frames based on an operation of the operation unit 248, and allows the user to select the images to be arranged in the frames. In this case, the image selection unit 240a cuts out the portions of the images corresponding to the frames, displays the images in the frames, and allows the user to select the images to be arranged in the frames. For example, in a case where the image is displayed in the right frame in the frame layout that two leftward and rightward split frames, the right half of the image is cut out, and is displayed in the frame. In a case where the image is displayed in the left frame, the left half of the image is cut out, and is displayed in the frame.

A specific method of selecting the images and a method of displaying the images on the monitor 22 will be described below in detail.

Frame Layout Selection Unit

The frame layout selection unit 240b performs a process of allowing the user to select the frame layout to be used in printing in a case where the split print is performed. The frame layout selection unit 240b displays selectable frame layouts on the monitor 22, and allows the user to select the frame layout to be used in the printing. The frame layout is selected by using the operation unit 248.

Information items of the frame layouts are stored in the data memory 244. The frame layout selection unit 240b displays the selectable frame layouts on the monitor 22 based on the information items stored in the data memory 244. The image selection unit 240a displays the frame layout selected by the frame layout selection unit 240b on the monitor 22.

A specific method of selecting the frame layout and a method of displaying the frame layout on the monitor 22 will be described below in detail.

Image Adjustment Unit

The image adjustment unit 240c performs a process of adjusting the images to be arranged in the frames based on an operation of the operation unit 248. Specifically, the images to be arranged in the frames are zoomed by a zoom operation using the operation unit 248. The images to be arranged in the frames are moved within the frames by a movement operation using the operation unit 248.

A specific method of adjusting the images and a method of displaying the images on the monitor 22 will be described below in detail.

Operation Guide Display Control Unit

The operation guide display control unit 240d performs a process of displaying a predetermined operation guide on the monitor 22. The operation guide is display for guiding an operation content using the operation unit. Information of the operation guide to be displayed on the monitor 22 is stored in the data memory 244.

A specific display content of the operation guide and a method of displaying the operation guide on the monitor 22 will be described below in detail.

Print Instruction Reception Unit

The print instruction reception unit 240e performs a process of receiving an instruction to print the images being displayed on the monitor 22 based on an operation of the operation unit 248 in a case where the split print is performed. Specifically, in a case where the split print is performed, if the setting of the images for all the frames is completed, the print instruction reception unit displays a dialog for inquiring about the printing on the monitor 22, and receives the print instruction based on an operation of the operation unit 248. A more specific method of receiving the instruction and a method of displaying the inquiry about the printing on the monitor 22 will be described below in detail.

In a case where the split print is performed, the print instruction is able to be received only in a case where the selection of the images for all the frames is completed. Accordingly, the print instruction reception unit 240e receives the print instruction only in a case where the selection of the images for all the frames is completed.

A specific method of receiving the print instruction and a method of displaying the instruction on the monitor 22 will be described below in detail.

Recording Control Unit

The recording control unit 240f controls the recording of the images in the internal memory 222. Specifically, in a case where the capturing is performed, the captured image is recorded in the internal memory 222. In a case where the split print is performed, an image (a combined image generated by combining the plurality of images) acquired through the split print process is recorded in the internal memory 222.

Capturing Control Unit

The capturing control unit 240g controls the capturing based on an instruction of the operation unit. That is, based on a capturing instruction, the image is captured by the image sensor 42, and the acquired image is recorded in the internal memory 222.

Work Memory

The work memory 242 is a memory for working. For example, the work memory 242 is a synchronous dynamic random access memory (SDRAM).

Data Memory

The data memory 244 is a memory that stores a program for controlling and various data items required in the controlling. As stated above, the information of the frame layout, the information of the dialog, and the information of the operation guide are recorded in the data memory 244. The data memory 244 is a non-volatile memory such as EEPROM.

Monitor Driving Unit

The monitor driving unit 246 is driving means of the monitor 22. The monitor driving unit 246 drives the monitor 22 under the control of the system controller 240.

Operation Unit

The operation unit 248 includes the power ring 14, the first release button 16A, the second release button 16B, the rear operation unit 24, and the capturing mode switching lever 26. The operation unit 248 outputs a signal corresponding to an operation of each operation member to the system controller 240.

Power Supply Unit

The power supply unit 250 supplies power to the units under the control of the system controller 240. The power supply unit 250 includes a battery as a power supply and a power supply circuit.

Action

The digital camera 1 with a printer has, as the operation mode, the capturing mode, the playback mode, and a print mode.

The capturing mode is a mode in which the image is captured. As mentioned above, the digital camera 1 with a printer of the present embodiment has, as the capturing mode, the "auto mode" and the "manual mode". The "auto mode" is a mode in which the captured image is automatically printed in a case where the capturing is performed. The "manual mode" is a mode in which the captured image is not automatically printed even in a case where the capturing is performed and the image is printed only in a case where the print instruction is input by the user.

The playback mode is a mode in which the image recorded in the internal memory 222 is played. The playing image is displayed on the monitor 22. In the playback mode, the image being played may be printed by pushing the print button 24c4.

The print mode is a mode in which the image recorded in the internal memory 222 is printed. The digital camera 1 with a printer of the present embodiment has, as the print mode, "one-frame print", "all-frames print", and "split print". The "one-frame print" is a mode in which one image recorded in the internal memory 222 is selected and the one selected image is printed. The "all-frames print" is a mode in which all the images recorded in the internal memory 222 are printed. As mentioned above, the "split print" is a mode in which the printable area of the instant film 110 is split into the plurality of frames, the images are arranged in the frames, and the images are printed on one instant film 110.

Hereinafter, an operation of the digital camera 1 with a printer in each mode will be described.

Capturing Mode

The digital camera 1 with a printer is activated in the state of the capturing mode in a case where the digital camera with a printer is powered on.

As stated above, the digital camera 1 with a printer of the present embodiment has, as the capturing mode, the auto mode and the manual mode. The switching between the auto mode and the manual mode is performed by the capturing mode switching lever 26. In a case where the capturing mode switching lever 26 is set in the auto position, the digital camera with a printer is set in the auto mode, and in a case where the capturing mode switching lever is set in the manual position, the digital camera with a printer is set in the manual mode.

Auto Mode

As stated above, the auto mode is a mode in which the captured image is automatically printed.

Figure 10:
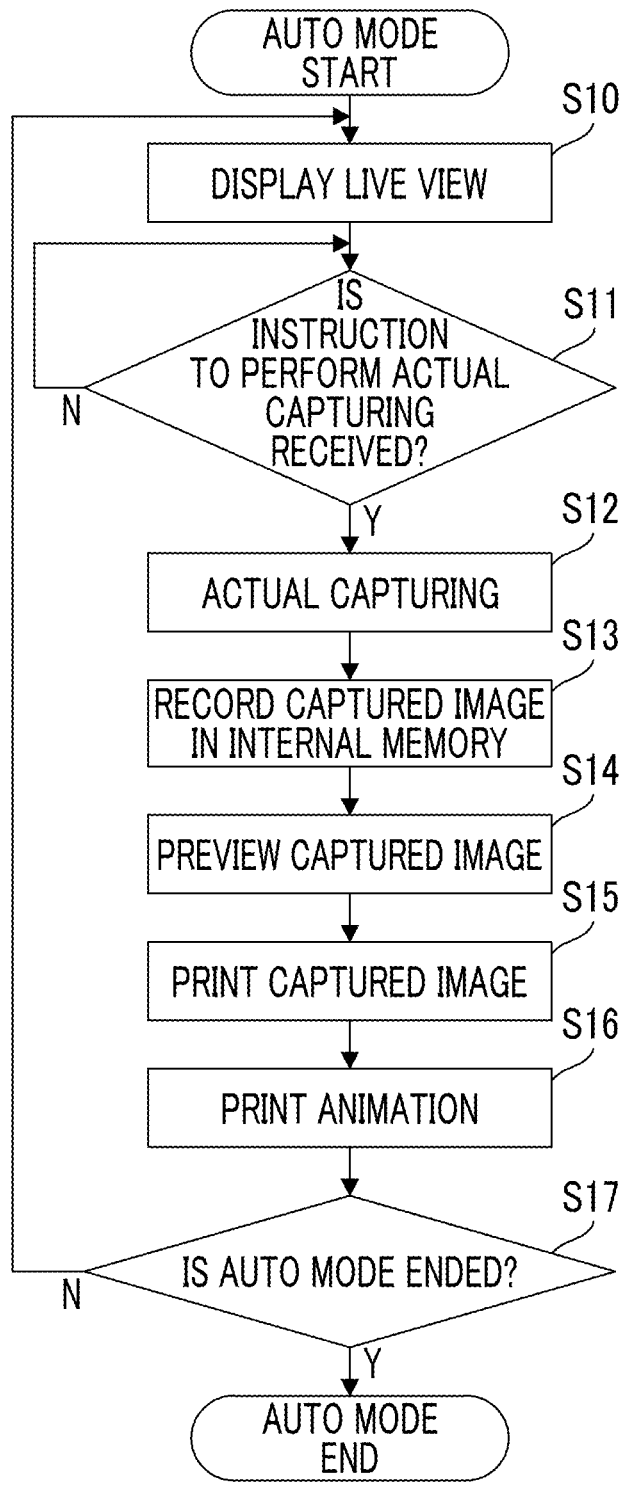
FIG. 10 is a flowchart showing a process procedure in an auto mode.

FIG. 10 is a flowchart showing a process procedure in the auto mode.

Initially, the system controller 240 displays live view on the monitor 22 (step S10). The live view means that the image caught by the image sensor 42 is displayed on the monitor 22 in real time. The live view is also referred to as through display.

Figure 11:
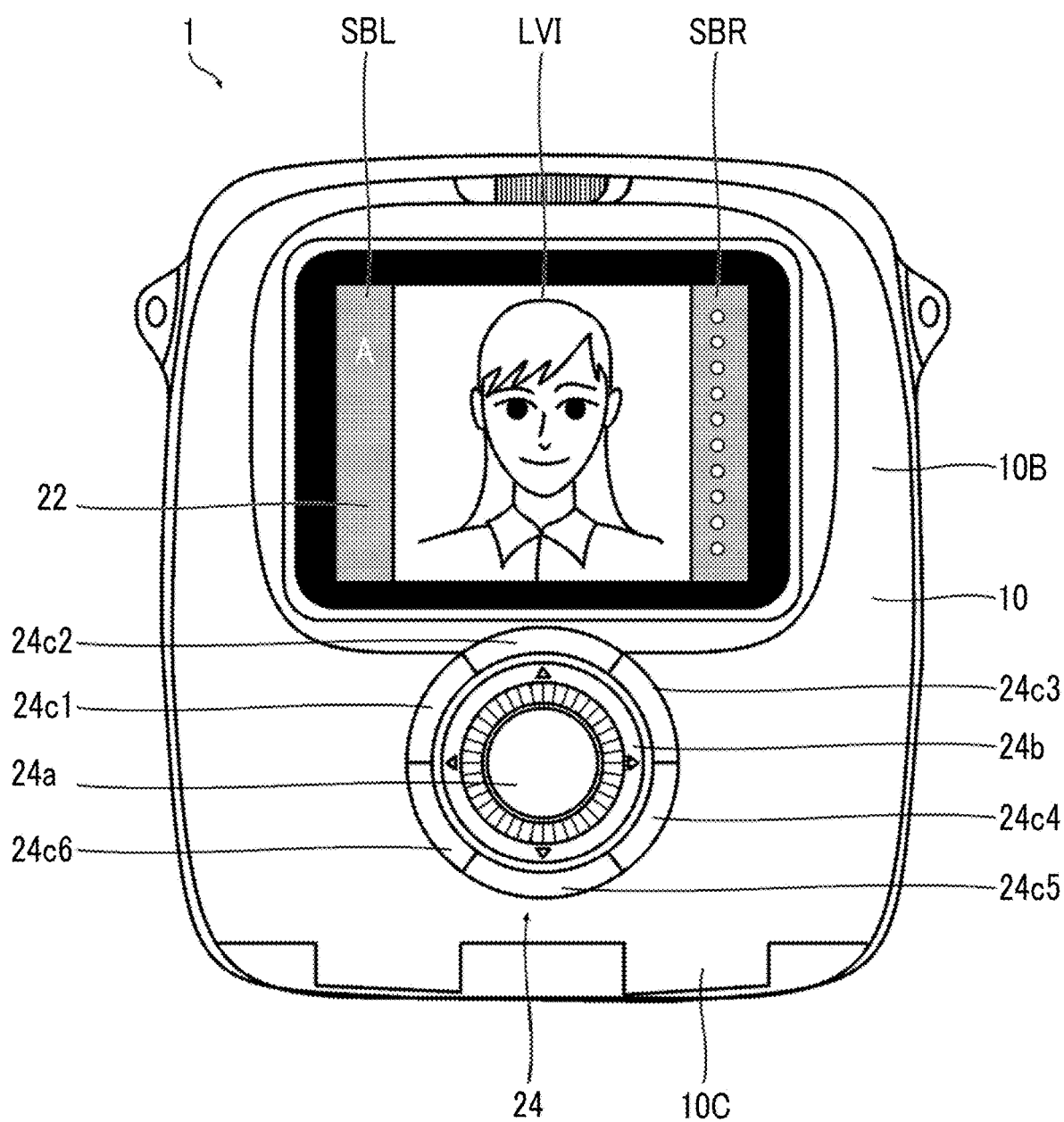
FIG. 11 is a diagram showing an example of the screen display of a monitor on which live view is being displayed.

FIG. 11 is a diagram showing an example of the screen display of the monitor on which the live view is being displayed.

As shown in FIG. 11, a live view image LVI is displayed in the center on the screen of the monitor 22, and side bars SBL and SBR are displayed on both sides thereof.

Information of the capturing mode being set is displayed on the side bar SBL on the left side of the screen. The information of the capturing mode being set is represented by one alphabet character. The information of the capturing mode being set is represented by "A" in a case where the digital camera with a printer is set in the auto mode, and is represented by "M" in a case where the digital camera with a printer is set in the manual mode. FIG. 11 shows the screen display in a case where the digital camera with a printer is set in the auto mode, and thus, a character of "A" representing the auto mode is displayed on the side bar SBL on the left side of the screen.

The number of remaining films is represented on the side bar SBR on the right side of the screen. The number of remaining films is represented by dots. Specifically, the number of dots corresponding to the number of remaining films is represented in the same straight line at certain intervals. FIG. 11 shows an example in which the number of remaining films is 10. The color of the dots is changed in a case where the number of remaining films is equal to or less a certain number. Specifically, the dots are represented in white in a case where the number of remaining films is equal to or greater than three, and are represented in red in a case where the number of remaining films is equal to or less than two. In a case where the number of remaining films is equal to zero, ten gray dots are represented blinking. In a case where the instant film pack 100 is not loaded, and ten gray dots are also represented blinking.

The user determines photographic composition while seeing the image being displayed as the live view on the monitor 22, and checks a focusing state on a subject.

The system controller 240 determines whether or not an instruction to perform the actual capturing is received based on the signal from the operation unit 248 (step S11). The process of the actual capturing is performed according to the instruction to perform the actual capturing (step S12).

The instruction to perform the actual capturing is received by operating the fully push of the first release button 16A or the second release button 16B. As the previous stage, the capturing preparation is performed by operating the half push of the first release button 16A or the second release button 16B. That is, the brightness and distance of the subject are measured, and thus, the setting of the exposure value and the focusing are performed.

The instruction to perform the actual capturing is received by operating the fully push of the first release button 16A or the second release button 16B after the half push of the first release button or the second release button is operated, and the process of the actual capturing is performed (step S12). That is, the image sensor 42 is exposed with the set exposure value, and the image for recording is received. The received image is recorded as the captured image in the internal memory 222 (step S13).

The system controller 240 previews the captured image on the monitor 22 (step S14), and performs a printing process (step S15).

Figure 12:
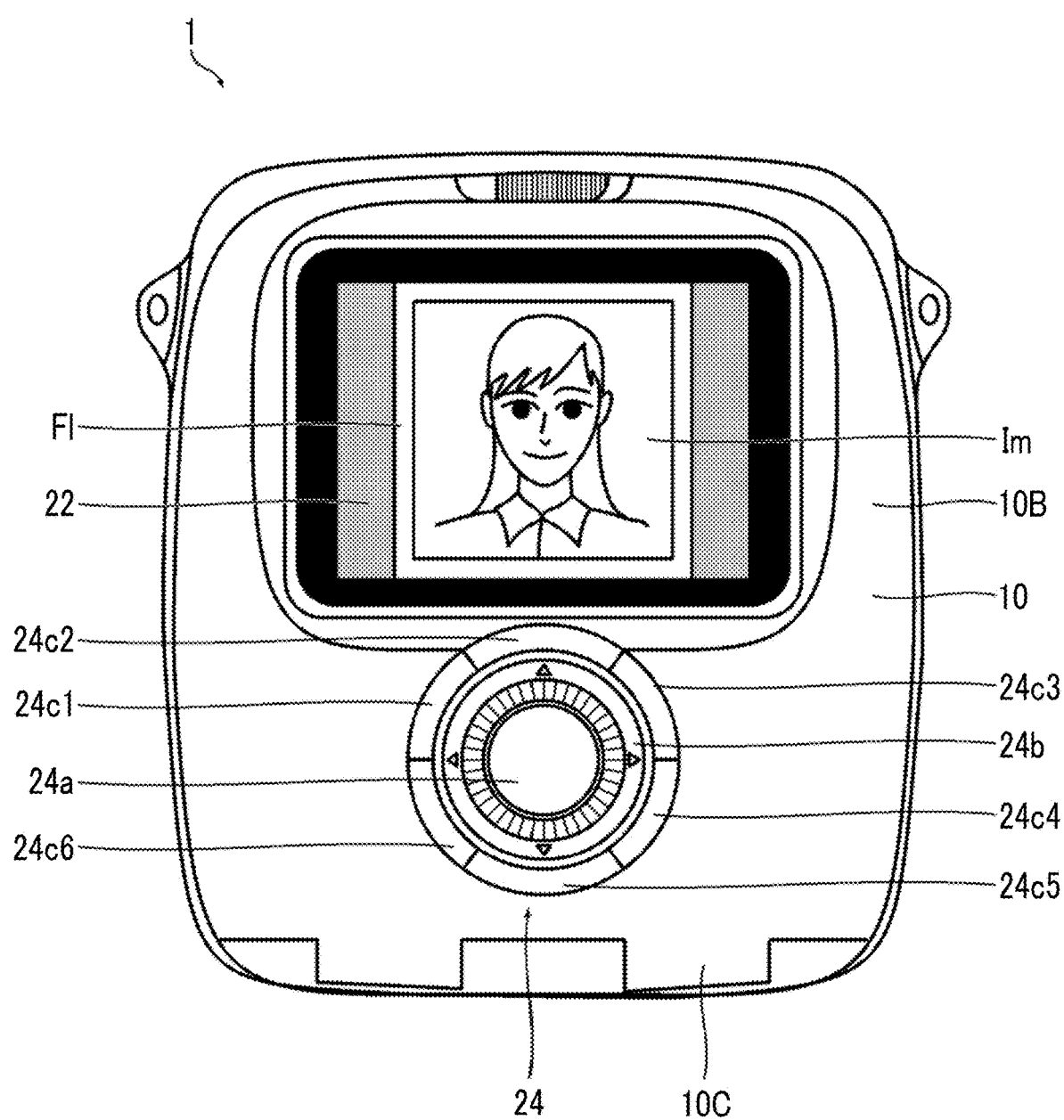
FIG. 12 is a diagram showing an example of the screen display of the monitor being previewed.

FIG. 12 is a diagram showing an example of the screen display of the monitor on which the image is being previewed.

As shown in FIG. 12, the system controller 240 displays an image Im such that the image is included in a frame F1 in a case where the image to be printed is previewed on the monitor 22. A white frame having a certain width is displayed as the frame F1.

Figure 13:
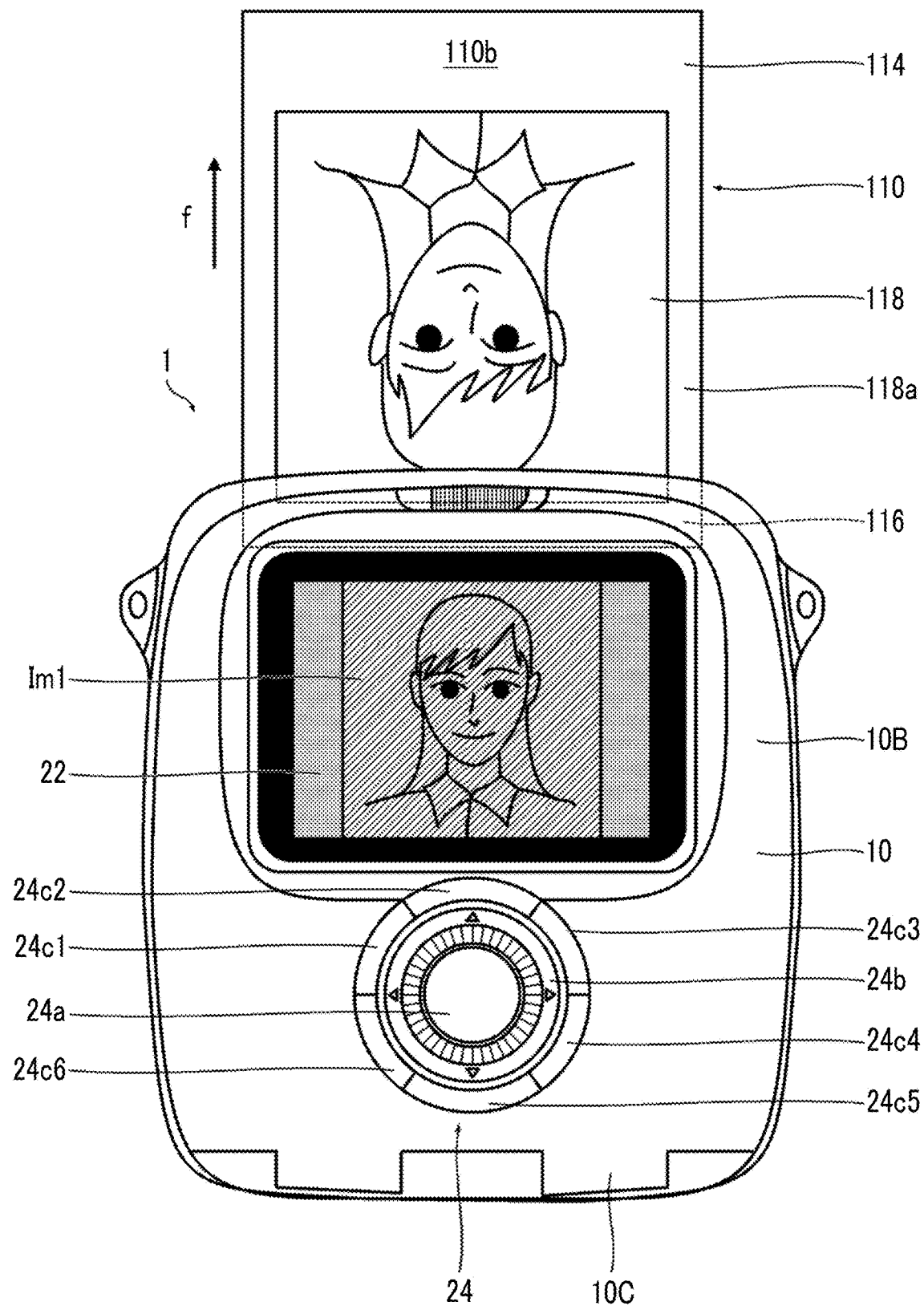
FIG. 13 is a diagram showing an ejection state of the instant film.

As stated above, the image to be printed on the instant film 110 is displayed within the frame 118a (see FIGS. 6 and 13). Similarly to the image to be printed on the instant film 110, the image Im is displayed so as to be included in the frame F1, and thus, it is possible to clarify that the image Im is printed.

The printing process is performed according to the following procedure. Initially, the image data for printing is generated by the image signal processing unit 236 for printing. Subsequently, one instant film 110 is delivered from the instant film pack 100 by the film delivery mechanism 52. The instant film 110 delivered from the instant film pack 100 is transported by the film transport mechanism 54 at a certain speed. The exposure part 112 is exposed by the print head 56 during the transporting, and the image is recorded on the exposure surface 110a. Thereafter, the exposed instant film 110 is transported between the spreading roller pair 54B, and the development treatment is performed on the instant film. The instant film is ejected from the print ejection port 28.

The instant film 110 is observed in the orientation in which the trap part 116 is at the top and the pod part 114 is at the bottom. Accordingly, the image is printed in an orientation in which the trap part 116 is at the top and the pod part 114 is at the bottom. Since the instant film 110 is ejected from the print ejection port 28 with the pod part 114 as the head, the instant film is ejected in a state in which the instant film is upside down. Accordingly, the image on the instant film is also upside down.

FIG. 13 is a diagram showing an ejection state of the instant film. FIG. 13 shows a state after the development treatment is completely ended. In FIG. 13, a direction represented by an arrow f is an ejection direction of the instant film 110.

The instant film 110 is ejected from the top of the camera body 10, and is ejected in substantially parallel with the display surface of the monitor 22.

The ejection direction f of the instant film 110 is a direction parallel to a short side of the monitor 22, and is a direction facing a position directly above the top of the camera body 10. Accordingly, the instant film 110 is ejected upwards when viewed from the monitor 22.

The instant film 110 is ejected while the observation surface 110b thereof faces the rear of the camera body 10. That is, the instant film is ejected such that the image is displayed so as to be seen at the rear of the camera body 10.

The instant film 110 is ejected with the pod part 114 as the head. That is, the instant film is ejected in a state in which the pod part 114 thereof is at the top. In this case, as stated above, the image is printed in a state in which the pod part 114 is at the bottom. Accordingly, the instant film 110 is ejected from the camera body 10 in an orientation opposite to the orientation in which the instant film is actually observed. That is, the instant film is ejected in a state in which the image faces the bottom.

The system controller 240 performs a print animation process in line with the printing process. (step S16).

The print animation process is a process of removing the image previewed as the image to be printed on the monitor 22 from the screen of the monitor 22 by predetermined animation display. Specifically, the image previewed as the image to be printed on the monitor 22 is moved along the ejection direction f of the instant film 110, and is removed from the screen.

FIGS. 14A to 14D are diagrams showing the transition of the screen display of the monitor in a case where the print animation process is performed. In FIGS. 14A to 14D, the screen display is changed with time in the order of FIGS. 14A, 14B, 14C, and 14D. FIG. 14A shows the screen display in a case where the printing is started, FIGS. 14B and 14C show the screen display in a case where the printing is being performed (the instant film is being ejected), and FIG. 14D shows the screen display in a case where the printing is ended (the ejection is completed).

As shown in FIGS. 14A to 14D, the image Im is moved to the upward direction which is the ejection direction f of the instant film 110, and is removed from the screen of the monitor 22.

The movement of the image Im is in line with the ejection of the instant film 110, and the removal of the image Im is also completed simultaneously with the completion of the ejection of the instant film 110.

As stated above, the image Im to be printed is removed by being moved along the ejection direction of the instant film 110. Thus, it is possible to recognize that the image Im is to be printed at a first glance, and it is possible to recognize the ejection direction of the print. Accordingly, it is possible to improve operability.

In a case where the image is completely removed from the screen, an image for print checking is displayed on the monitor 22. FIG. 13 shows a state in which the image for print checking is displayed. As shown in FIG. 13, an image Im1 for print checking is the same as the removed image, and is an image of which brightness is different from that of the removed image. Specifically, the image for checking the print is an image acquired by lowering the brightness of the removed image to a certain level. As stated above, the image for print checking is displayed on the monitor 22 after the image is removed. Thus, it is possible to check the printed image again, and it is possible to further improve operability. The image of which the brightness is different from that of the removed image is displayed, and thus, it is possible to easily recognize that the printing is completed.

The image for print checking is continuously displayed for a certain time. Thereafter, the system controller 240 determines whether or not the auto mode is ended (step S17). That is, based on the signal from the operation unit 248, the system controller determines whether or not the digital camera with a printer is powered off or whether or not the mode thereof is switched. In a case where it is determined that the auto mode is ended, the process in the auto mode is ended. In a case where it is determined that the auto mode is not ended, the process is returned to step S10. In this case, the display of the monitor 22 is switched to the live view.

As stated above, in a case where the image is captured in the auto mode, the captured image is automatically printed.

Manual Mode

As mentioned above, the manual mode is a mode in which the captured image is not automatically printed even in a case where the capturing is performed and the image is printed only in a case where the print instruction is input by the user.

Figure 15:
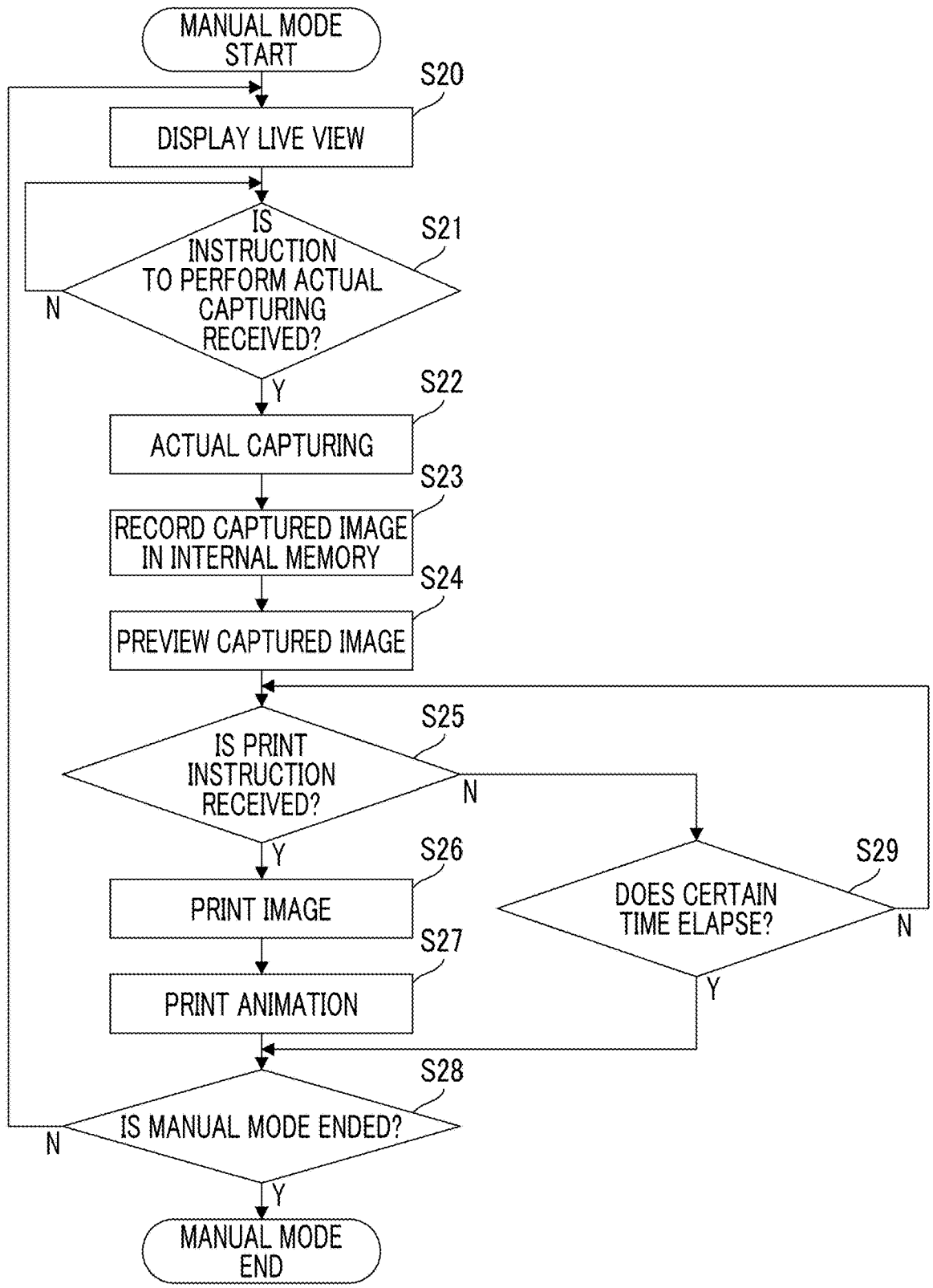
FIG. 15 is a flowchart showing a process procedure in a manual mode.

FIG. 15 is a flowchart showing a process procedure in the manual mode.

Initially, the system controller 240 displays the live view on the monitor 22 (step S20). That is, the image caught by the image sensor 42 is displayed on the monitor 22 in real time. Since the digital camera with a printer is set in the manual mode, a character of "M" representing the manual mode is displayed on the side bar SBL on the left side of the screen.

The system controller 240 determines whether or not the instruction to perform the actual capturing is received based on the signal from the operation unit 248 (step S21). The process of the actual capturing is performed according to the instruction to perform the actual capturing (step S22), and the captured image is recorded in the internal memory 222 (step s23).

Thereafter, the system controller 240 previews the captured image on the monitor 22 (step S24). The system controller determines whether or not the print instruction is received (step S25).

The print instruction is received by pushing the print button 24c4. In a case where the print button 24c4 is pushed, the system controller 240 displays the dialog for inquiring about the printing on the monitor 22.

Figure 16:
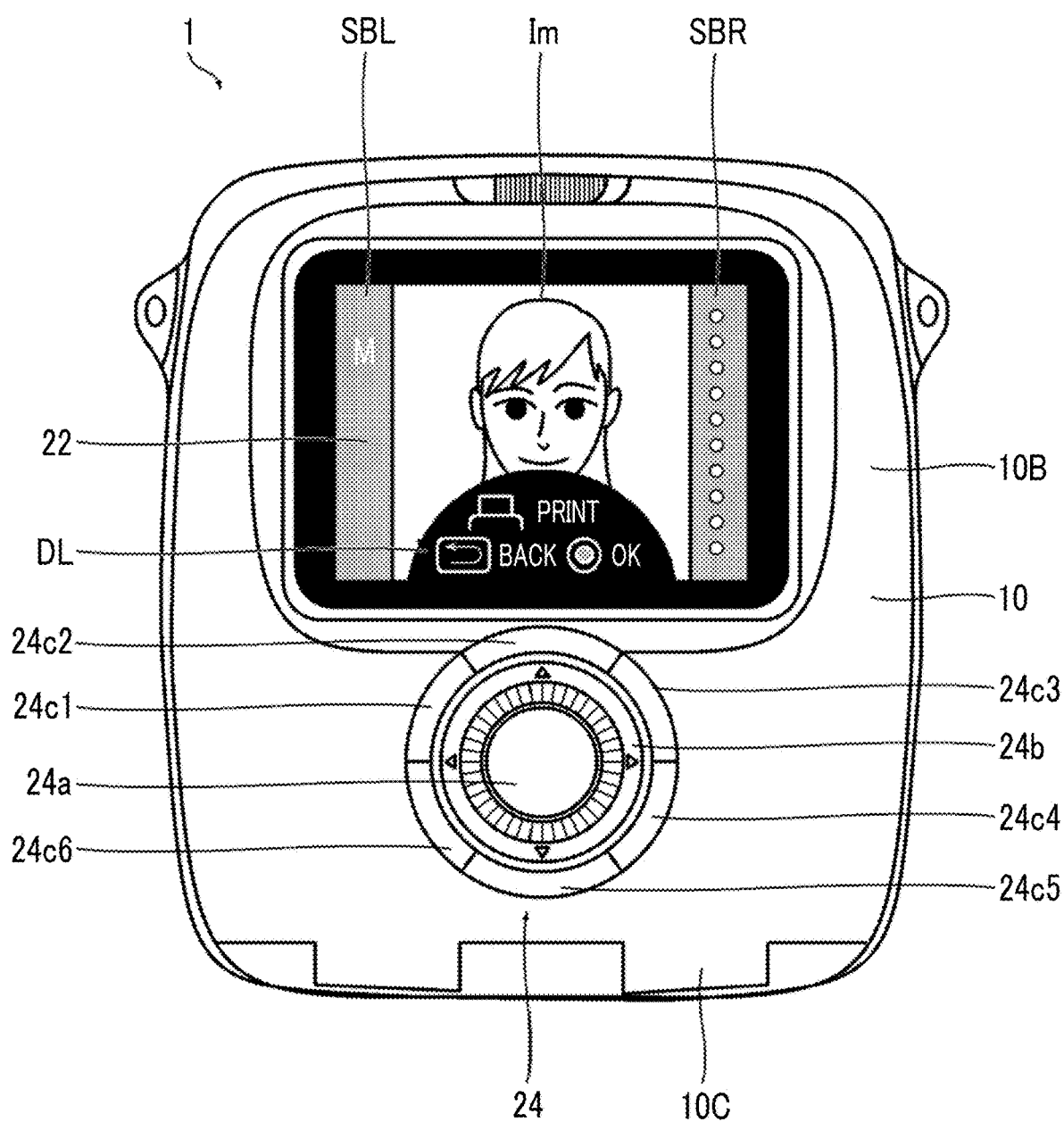
FIG. 16 is a diagram showing an example of the screen display of the monitor on which a dialog is displayed.

FIG. 16 is a diagram showing an example of the screen display of the monitor on which the dialog is displayed.

As shown in FIG. 16, a dialog DL is represented by a geometric semicircular shape, and is displayed so as to protrude from a lower edge of the screen. A geometric shape representing the printing and characters of "PRINT", a geometric shape representing the back button and characters of "BACK", and a geometric shape representing the OK button and characters of "OK" are displayed in the dialog DL. The dialog DL is displayed so as to be overlapped on the image being displayed which is a printing target image. The dialog DL is displayed, and thus, it is possible to recognize that the print instruction is to be confirmed in a case where the user pushes the OK button 24a and the print instruction is canceled in a case where the user pushes the back button 24c5. In the digital camera 1 with a printer of the present embodiment, since the rear operation unit 24 has the circular shape, the dialog DL is the geometric semicircular shape which is a part of the circle, and thus, it is possible to clarify the relationship between the display of the dialog DL and the rear operation unit 24. The dialog DL is displayed so as to protrude directly upwards from the lower edge which is an edge closest to the rear operation unit 24, and thus, it is possible to further clarify the relationship between the display of the dialog DL and the rear operation unit 24.

In a case where the image being previewed is desired to be printed, the user pushes the print button 24c4, and subsequently pushes the OK button 24a according to the display of the dialog DL. Accordingly, the print instruction is confirmed.

After the print instruction is received, in a case where the user rethinks and cancels the print instruction, the user pushes the back button 24c5. Accordingly, the print instruction is canceled. In a case where the print instruction is canceled, the display of the monitor 22 is returned to the state before the instruction is received. That is, the dialog DL is removed, only the captured image is displayed on the monitor 22.

In a case where the print instruction is confirmed, the system controller 240 performs the printing process (step S26). The print animation process is performed in line with the printing process (step S27). That is, the image being previewed is moved along the ejection direction f of the instant film 110, and is removed from the screen. In this case, the system controller 240 initially displays the image being displayed on the monitor 22 so as to be included in the frame (see FIG. 14A). Thereafter, the image included in the frame is moved along the ejection direction f of the instant film 110, and is removed from the screen (see FIGS. 14B to 14D). Accordingly, it is possible to recognize that the image Im is to be printed while seeing the display of the monitor 22 at a first glance, and it is possible to recognize the ejection direction of the print. After the image is removed, the image for print checking is displayed on the monitor 22 (see FIG. 13). Accordingly, it is possible to check the printed image again.

The image for print checking is continuously displayed for a certain time. Thereafter, the system controller 240 determines whether or not the manual mode is ended (step S28). That is, based on the signal from the operation unit 248, the system controller determines whether or not the digital camera with a printer is powered off or whether or not the mode thereof is switched. In a case where it is determined that the manual mode is ended, the process in the manual mode is ended. In a case where the manual mode is not ended, the process is returned to step S20. In this case, the display of the monitor 22 is switched to the live view.

In step S25, in a case where it is determined that the print instruction for the image being previewed is not received, the system controller 240 determines whether or not a certain time elapses after the preview of the image is started (step S29). In a case where it is determined that the certain time elapses, the system controller determines whether or not the manual mode is ended (step S28). That is, in a case where the print instruction is not received within the certain time, the preview is ended, and the subsequent process is performed. In this case, the captured image is not printed.

The preview may be forcibly ended by the operation of the first release button 16A or the second release button 16B. In this case, in a case where the first release button 16A or the second release button 16B is half push-operated or fully push-operated during the previewing, the preview is forcibly ended.

As stated above, in a case where the image is captured in the manual mode, the captured image is displayed on the monitor 22, and the printing process is performed after the print instruction is waited. Accordingly, it is possible to print only an image desired to be printed in the manual mode.

Playback Mode

The digital camera 1 with a printer may play the image recorded in the internal memory 222 by setting the digital camera with a printer in the playback mode. It is possible to print the image being played by pushing the print button 24c4.

The switching from the capturing mode to the playback mode is performed by the playback button 24c6. In a case where the playback button 24c6 is pushed in a state in which the digital camera 1 with a printer is set in the capturing mode, the operation mode is switched to the playback mode.

Figure 17:
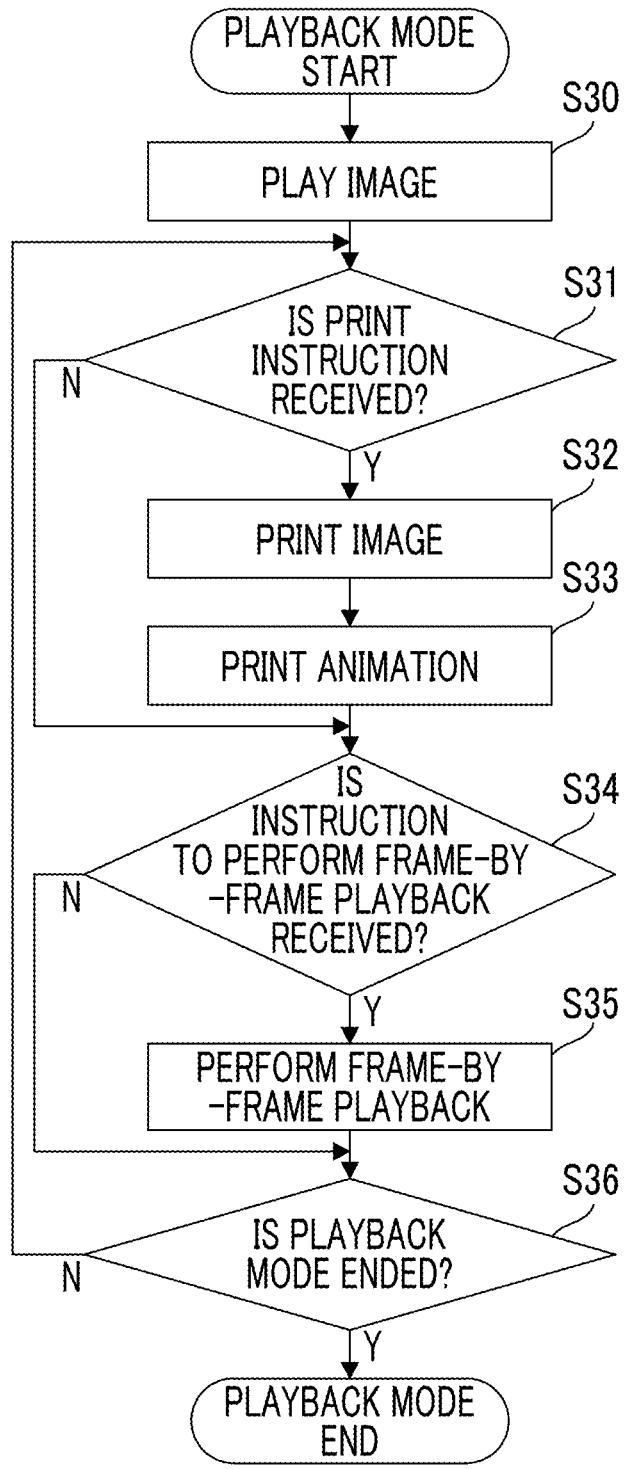
FIG. 17 is a flowchart showing a process procedure in a playback mode.

FIG. 17 is a flowchart showing a process procedure of the playback mode.

In a case where the digital camera with a printer is set in the playback mode, the system controller 240 reads out one image recorded in the internal memory 222, and displays the readout image on the monitor 22 (step S30). The readout image is an image recorded last in the internal memory 222, that is, an image captured last.

Figure 18:
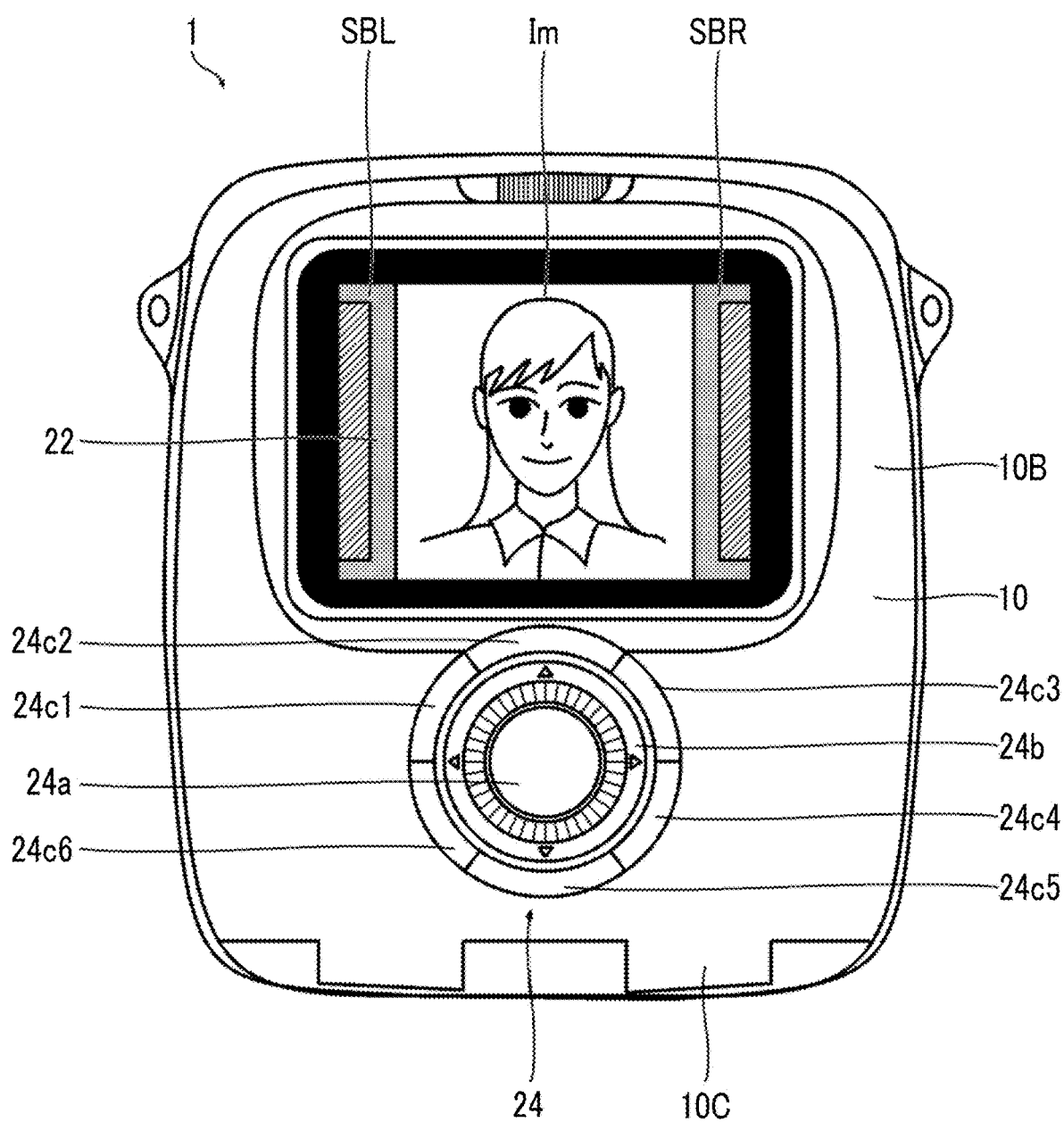
FIG. 18 is a diagram showing an example of the screen display of the monitor in a case where the digital camera with a printer is set in the playback mode.

FIG. 18 is a diagram showing an example of the screen display of the monitor in a case where the digital camera with a printer is set in the playback mode.

As shown in FIG. 18, the readout image Im is displayed in the center on the screen of the monitor 22, and the side bars SBL and SBR are displayed on both sides. In a case where a frame is sent in a forward direction, the brightness of a part (right end portion) of an image to be played next is lowered, and is displayed on the side bar SBL on the left side of the screen. In a case where frame-by-frame playback is performed in a reverse direction, the brightness of a part (left end portion) of an image to be played next is lowered, and is displayed on the side bar SBR on the right side of the screen.

The images are sequentially played one by one through the frame-by-frame playback. The playback is performed in order of frame numbers. The frame numbers are numbers given to the images recorded in the internal memory 222, and are given in the order that the images are sequentially captured. In a case where the frame-by-frame playback of the images is performed in the forward direction, the images are played in ascending order of frame numbers, and in a case where the frame-by-frame playback of the images is performed in the reverse direction, the images are played in descending order of frame numbers.

In a case where the images are played, the system controller 240 determines whether or not the print instruction is received based on the signal from the operation unit 248 (step S31).

The print instruction is received by pushing the print button 24c4. In a case where the print button 24c4 is pushed, the system controller 240 displays the dialog for inquiring about the printing on the monitor 22.

Figure 19:
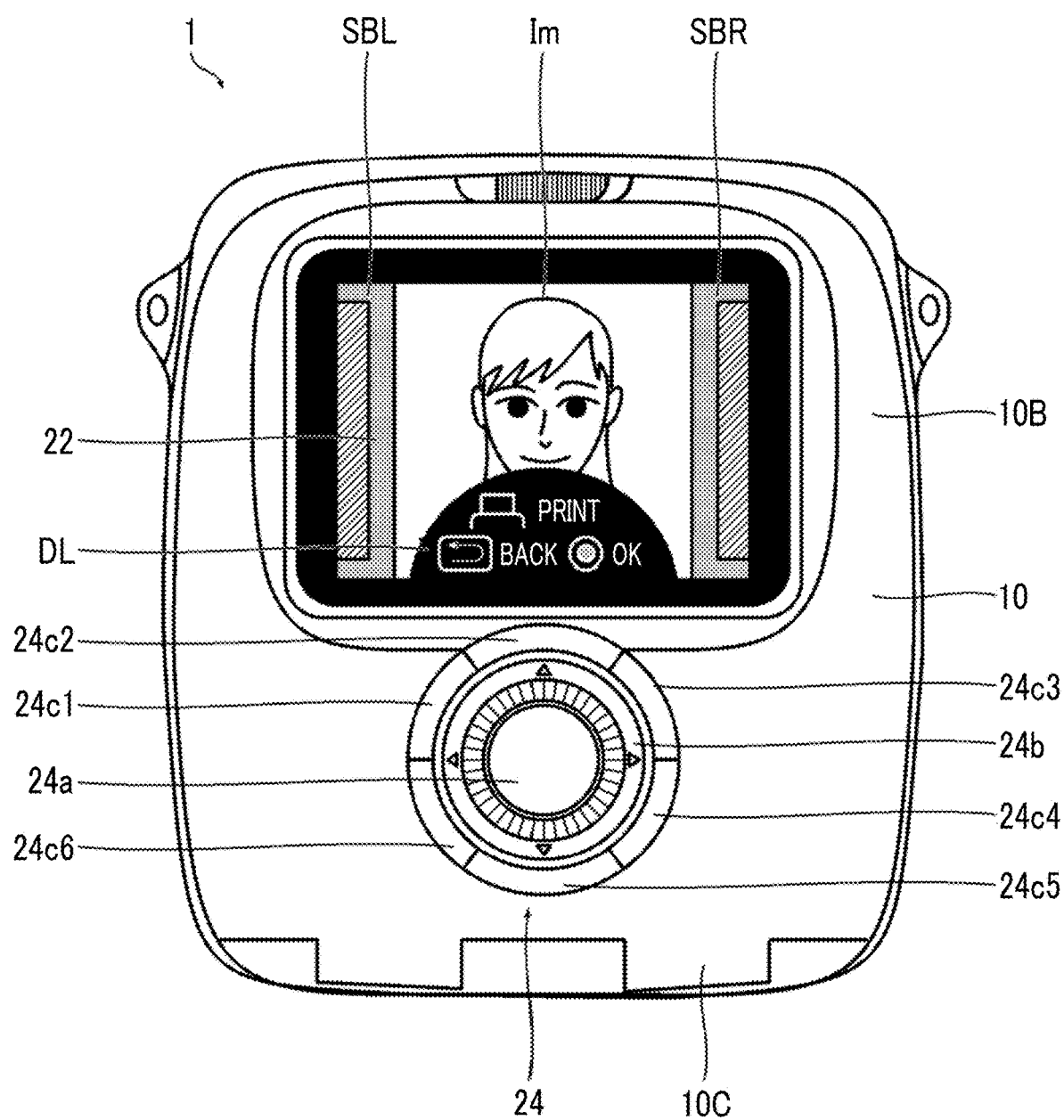
FIG. 19 is a diagram showing an example of the screen display of the monitor on which the dialog is displayed.

FIG. 19 is a diagram showing an example of the screen display of the monitor on which the dialog is being displayed.

As shown in FIG. 19, a dialog DL is represented by a geometric semicircular shape, and is displayed so as to protrude from a lower edge of the screen. A geometric shape representing the printing and characters of "PRINT", a geometric shape representing the back button and characters of "BACK", and a geometric shape representing the OK button and characters of "OK" are displayed in the dialog DL. The dialog DL is displayed so as to be overlapped on the image being displayed which is a printing target image.

The dialog DL is displayed, and thus, it is possible to recognize that the print instruction is to be confirmed in a case where the user pushes the OK button 24a and the print instruction is canceled in a case where the user pushes the back button 24c5.

The user pushes the OK button 24a in a case where the print instruction is confirmed. Accordingly, the print instruction is confirmed.

In a case where the print instruction is confirmed, the system controller 240 performs the printing process (step S32). The printing process is performed in line with the print animation process (step S33). That is, the image Im being displayed is moved along the ejection direction f of the instant film 110, and is removed from the screen.

In this case, the system controller 240 initially displays the image being displayed on the monitor 22 so as to be included in the frame (see FIG. 14A). Thereafter, the image included in the frame is moved along the ejection direction f of the instant film 110, and is removed from the screen (see FIGS. 14B to 14D). Accordingly, it is possible to recognize that the image Im is to be printed while seeing the display of the monitor 22 at a first glance, and it is possible to recognize the ejection direction of the print.

After the image is removed, the image for print checking of which the brightness is lowered is displayed on the monitor 22 (see FIG. 13). Accordingly, it is possible to check the printed image again. The image for print checking is continuously displayed for a certain time, and the printed image is displayed on the monitor 22 in a case where the certain time elapses. That is, the image is displayed with original brightness.

Thereafter, the system controller 240 determines whether or not an instruction to perform the frame-by-frame playback is received based on the signal from the operation unit 248 (step S34).

An operation of the frame-by-frame playback is performed by the command dial 24b. In a case where the command dial 24b is pushed in the right direction, an instruction to perform the frame-by-frame playback in the forward direction is received. In a case where the command dial 24b is pushed in the leftward direction, an instruction to perform the frame-by-frame playback in the reverse direction is received. The frame-by-frame playback of the images is performed one by one. That is, whenever the command dial 24b is pushed once in the right direction, the frame-by-frame playback of the images is performed in the forward direction one by one. Whenever the command dial 24b is pushed once in the leftward direction, the frame-by-frame playback of the images is performed in the reverse direction one by one.

In a case where it is determined that the instruction to perform the frame-by-frame playback is received, the system controller 240 performs the frame-by-frame playback in the instructed direction (step S35). That is, in a case where the instruction to perform the frame-by-frame playback in the forward direction is received, the frame-by-frame playback is performed in the forward direction, and in a case where the instruction to perform the frame-by-frame playback in the reverse direction is received, the frame-by-frame playback is performed in the reverse direction.

Thereafter, the system controller 240 determines whether or not the playback mode is ended (step S36). That is, based on the signal from the operation unit 248, the system controller determines whether or not the digital camera with a printer is powered off or whether or not the mode thereof is switched. In a case where it is determined that the playback mode is ended, the process in the playback mode is ended.

As mentioned above, the digital camera with a printer is set in the playback mode, and thus, it is possible to play the image recorded in the internal memory 222 on the monitor 22. It is possible to print the image being displayed on the monitor 22.

Print Mode

As stated above, the digital camera 1 with a printer of the present embodiment has, as the print mode, the one-frame print, the all-frames print, and the split print. The switching between the modes is performed on the menu screen. In a case where the OK button 24a is pushed in a state in which the digital camera with a printer is set in the playback mode, a menu screen for playing is displayed on the monitor 22. Items of "print" and "split print" among selection items to be displayed on the menu screen for playing are prepared. In this case, in a case where the item of "print" is selected by operating the operation unit 248, and the items of "one-frame print" and "all-frames print" are displayed as selectable items. In a case where the item of "one-frame print" is selected by operating the operation unit 248, the digital camera with a printer is set in the print mode of the one-frame print, and in a case where the item of "all-frames print" is selected, the digital camera with a printer is set in the print mode of the all-frames print. In a case where the item of "split print" is selected on the menu screen for playing, the digital camera with a printer is set in the print mode of the split print.

One-Frame Print

The print mode of the one-frame print is a mode in which one image recorded in the internal memory 222 is selected and the one selected image is printed.

Figure 20:
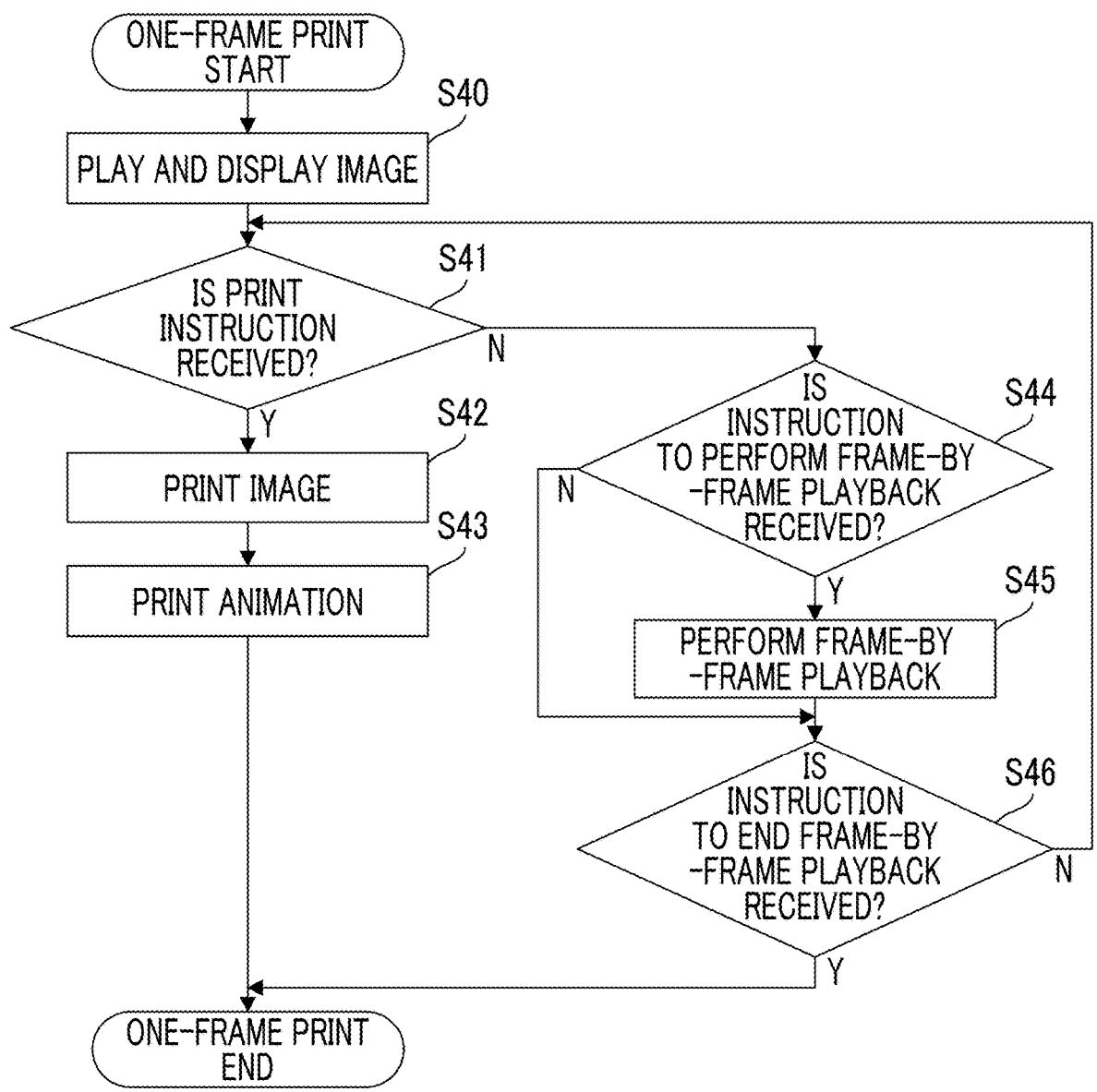
FIG. 20 is a flowchart showing a process procedure in one-frame print.

FIG. 20 is a flowchart showing a process procedure of the one-frame print.

In a case where the digital camera with a printer is set in the print mode of the one-frame print, the system controller 240 plays and displays the printing target image on the monitor 22 (step S40). The image is an image played and displayed on the monitor 22 immediately before the digital camera with a printer is switched to the print mode of the one-frame print. That is, the image being played in the playback mode is played and displayed as the printing target image on the monitor 22. The system controller 240 displays the printing target image together with the dialog for inquiring the printing on the monitor 22 (see FIG. 19).

The user checks the display of the monitor 22, and determines whether or not to print the image. In a case where it is determined to print the image, the user pushes the OK button 24a. Accordingly, the print instruction is received. The system controller 240 determines whether or not the print instruction is received based on the signal from the operation unit 248 (step S41).

In a case where it is determined that the print instruction is received, the system controller 240 performs the printing process (step S42). The printing process is performed in line with the print animation process (step S43). That is, the image Im being displayed is moved along the ejection direction f of the instant film 110, and is removed from the screen.

In this case, the system controller 240 initially displays the image being displayed on the monitor 22 so as to be included in the frame (see FIG. 14A). Thereafter, the image included in the frame is moved along the ejection direction f of the instant film 110, and is removed from the screen (see FIGS. 14B to 14D). Accordingly, it is possible to recognize that the image Im is to be printed while seeing the display of the monitor 22 at a first glance, and it is possible to recognize the ejection direction of the print.

After the image is removed, the image for print checking of which the brightness is lowered is displayed on the monitor (see FIG. 13). Accordingly, it is possible to check the printed image again. The image for print checking is continuously displayed for a certain time, and the printed image is displayed on the monitor 22 in a case where the certain time elapses. That is, the image is displayed with original brightness. In a case where the printed image is displayed on the monitor 22, the mode of the one-frame print is ended, and the digital camera with a printer is switched to the playback mode.

In a case where it is determined that the print instruction is received in step S41, the system controller 240 determines whether or not the instruction to perform the frame-by-frame playback is received based on the signal from the operation unit 248 (step S44).

An operation of the frame-by-frame playback is performed by the command dial 24b. In a case where the command dial 24b is pushed in the right direction, an instruction to perform the frame-by-frame playback in the forward direction is received. In a case where the command dial 24b is pushed in the leftward direction, an instruction to perform the frame-by-frame playback in the reverse direction is received. The frame-by-frame playback of the images is performed one by one. That is, whenever the command dial 24b is pushed in the right direction once, the frame-by-frame playback of the images is performed in the forward direction one by one. Whenever the command dial 24b is pushed once in the leftward direction, the frame-by-frame playback of the images is performed in the reverse direction one by one.

In a case where the instruction to perform the frame-by-frame playback is received, the system controller 240 performs the frame-by-frame playback in the instruction direction (step S45). That is, in a case where the instruction to perform the frame-by-frame playback in the forward direction is received, the frame-by-frame playback is performed in the forward direction, and in a case where the instruction to perform the frame-by-frame playback in the reverse direction is received, the frame-by-frame playback is performed in the reverse direction.

In a case where it is determined that the instruction to perform the frame-by-frame playback is not received, the system controller 240 determines whether or not an instruction to end the one-frame print is received (step S46). That is, the system controller determines whether or not the back button 24c5 is pushed based on the signal from the operation unit 248.

In a case where it is determined that the instruction to end the one-frame print is not received, the system controller 240 returns to step S41, and determines whether or not the print instruction for the image being displayed is received.

In a case where it is determined that the instruction to end the one-frame print is received, the system controller 240 ends the mode of the one-frame print, and switches the operation mode of the digital camera 1 with a printer to the playback mode.

As stated above, the digital camera with a printer is set in the print mode of the one-frame print, and thus, it is possible to select the image recorded in the internal memory 222 corresponding to one frame and print the selected image.

All-Frames Print

The all-frames print is a mode in which all the images recorded in the internal memory 222 are printed.

The digital camera with a printer is set in the mode of the all-frames print, and in a case where the print instruction is received, the images recorded in the internal memory 222 are sequentially printed and output. In this case, the print animation process is performed in line with the ejection of the instant film 110. That is, the images being sequentially printed are displayed on the monitor 22, and are removed from the monitor 22 in line with the ejection.

In a case where the printing of all the images is ended, the operation mode of the digital camera 1 with a printer is switched to the playback mode.

Split Print

The split print is a mode in which the printable area of the instant film 110 is split into the plurality of frames, the images are arranged in the frames, and the images are printed on one instant film 110. Hereinafter, the method of printing the images in a case where the digital camera with a printer is set in the print mode of the split print will be described.

Figure 21:
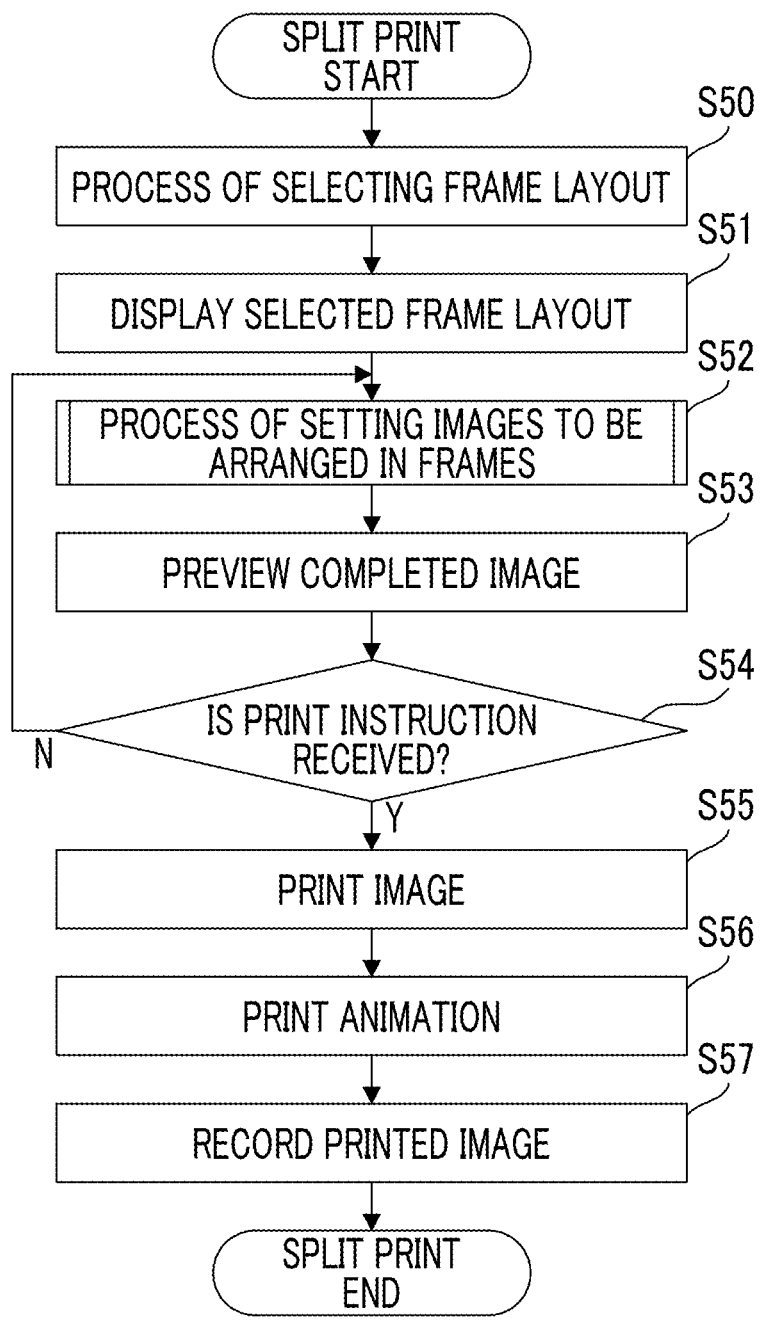
FIG. 21 is a flowchart showing a process procedure in split print.

FIG. 21 is a flowchart showing a process procedure of the split print.

In a case where the digital camera with a printer is set in the mode of the split print, the system controller 240 performs a process of selecting the frame layout (step S50). The process of selecting the frame layout is a process of selecting the frame layout to be used in the printing. The frame layout is the layout of the frames set by splitting the printable area of the instant film 110. The frame layout to be used in the printing is selected among the previously prepared frame layouts.

Figure 22A:
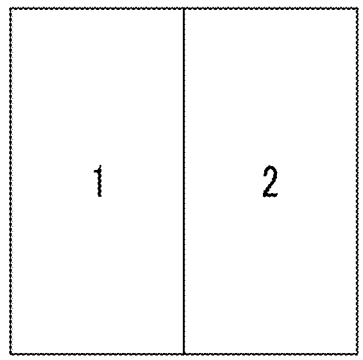
FIGS. 22A to 22C are diagrams showing examples of a frame layout.
Figure 22B:
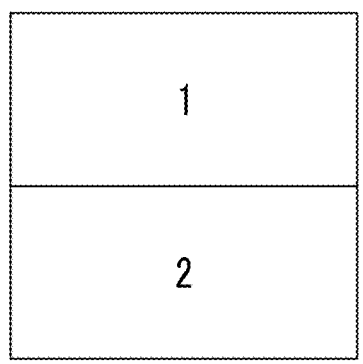
Figure 22C:
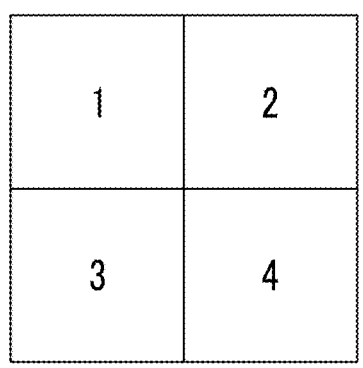

FIGS. 22A to 22C are diagrams showing examples of the frame layout.

As shown in FIGS. 22A to 22C, in the digital camera 1 with a printer of the present embodiment, three frame layouts are prepared as the frame layout capable of being selected by the user. All three frame layouts are set by splitting a square area. The square area corresponds to the printable area of the instant film 110.

The frame layout shown in FIG. 22A is a frame layout acquired by equally splitting the square area into two frames in a vertical direction. Hereinafter, the frame layout acquired by equally splitting the square area into two frames in the vertical direction is referred to as a two-split vertical frame.

The frame layout shown in FIG. 22B is a frame layout acquired by equally splitting the square area into two frames in a horizontal direction. Hereinafter, the frame layout acquired by equally splitting the square area into two frames in the horizontal direction is referred to as a two-split horizontal frame.

The frame layout shown in FIG. 22C is a frame layout acquired by equally splitting the square area into four frames in a grid shape. Hereinafter, the frame layout acquired by equally splitting the square area into four frames is referred to as a four-split frame.

In these diagrams, the numbers displayed within the split frames are the frame numbers. In the two-split vertical frame shown in FIG. 22A, the left frame in the diagram is a first frame, and the right frame is a second frame. In the two-split horizontal frame shown in FIG. 22B, the upper frame in the diagram is a first frame, and a lower frame is a second frame. In the four-split frame shown in FIG. 22C, the upper left frame in the diagram is a first frame, the upper right frame is a second frame, the lower left frame is a third frame, and the lower right frame is a fourth frame. The images are selected in the order of frame numbers in a case where the images to be arranged in the frames are selected.

The system controller 240 displays the selectable frame layouts on the monitor 22, and allows the user to select the frame layout to be used in the printing.

Figure 23:
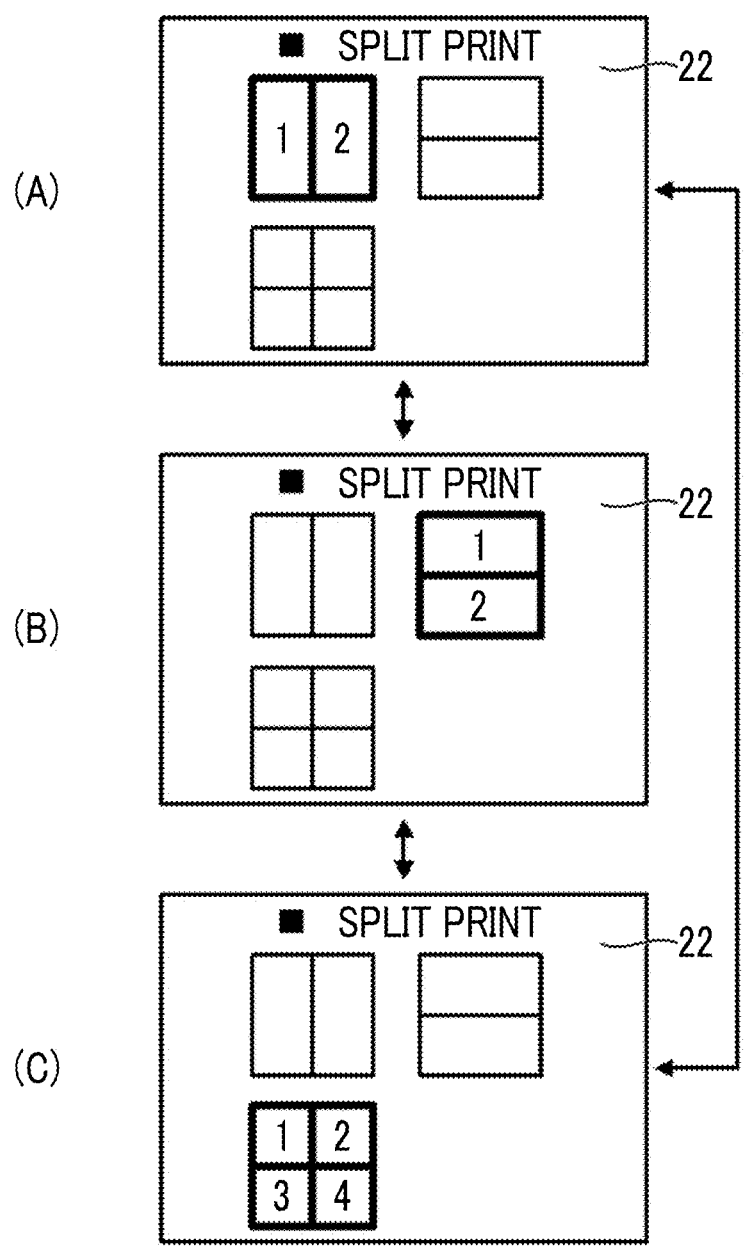
FIG. 23 is a diagram showing examples of screen display on which the frame layout is selected.

FIG. 23 is a diagram showing examples of screen display on which the frame layout is selected.

As shown in FIG. 23, a list of frames having the same split forms as those of the selectable frame layouts is displayed on the monitor 22. The user selects one of diagrams of the frames, and selects the frame layout to be used in the printing.

(A) part of FIG. 23 shows a case where the two-split vertical frame is selected, (B) part of FIG. 23 is a case where the two-split horizontal frame is selected, and (C) part of FIG. 23 is a case where the four-split frame is selected. As shown in FIG. 23, a line of the diagram of the frame of the selected frame layout is displayed so as to be thicker than that of the frame of another frame layout. The frame numbers are displayed in the diagram of the frame of the selected frame layout.

As the frame layout, the two-split vertical frame is selected as the default. Accordingly, a display state of (a) part of FIG. 23 is an initial state.

The switching of the frame layout to be selected is performed by the command dial 24*b*. In a case where the command dial 24*b* is rotated in a clockwise direction, the frame layout to be selected is switched in the order of the two-split vertical frame, the two-split horizontal frame, and the four-split frame. In a case where the command dial 24*b* is rotated in a counterclockwise direction, the frame layout to be selected is switched in the reverse order thereof. The switching of the frame layout to be selected is also performed in a case where the command dial 24*b* is pushed in the leftward and rightward directions. In a case where the command dial 24*b* is pushed in the right direction, whenever the command dial is pushed, the frame layout to be selected is switched in the order of the two-split vertical frame, the two-split horizontal frame, and the four-split frame. In a case where the command dial is pushed in the leftward direction, whenever the command dial is pushed, the frame layout to be selected is switched in the reverse order thereof.

The frame layout selected by the operation of the command dial 24*b* is confirmed by pushing the OK button 24*a*.

In a case where the selection of the frame layout is completed, the system controller 240 displays the selected frame layout on the monitor 22 (step S51).

Figure 24A:
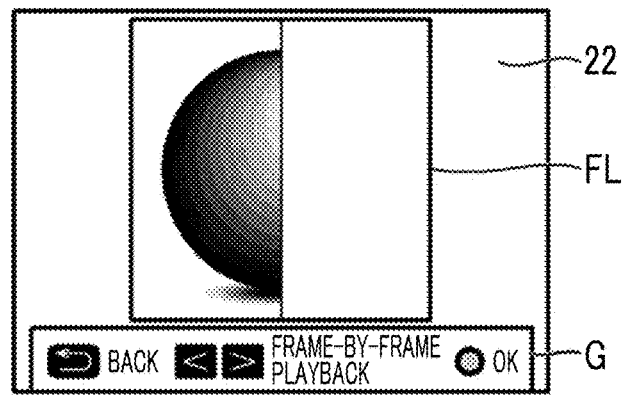
FIGS. 24A to 24C are diagrams showing examples of the display of the monitor after the frame layout is selected.
Figure 24B:
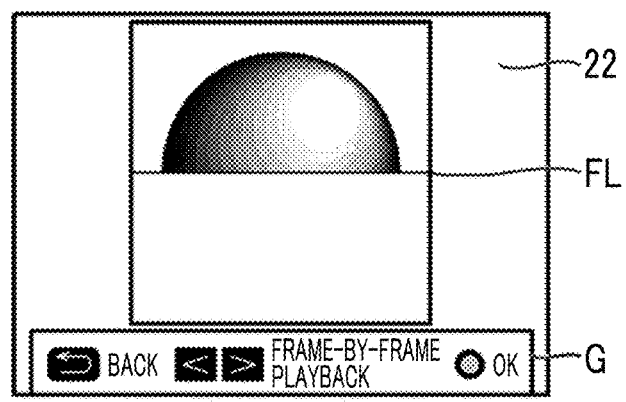
Figure 24C:
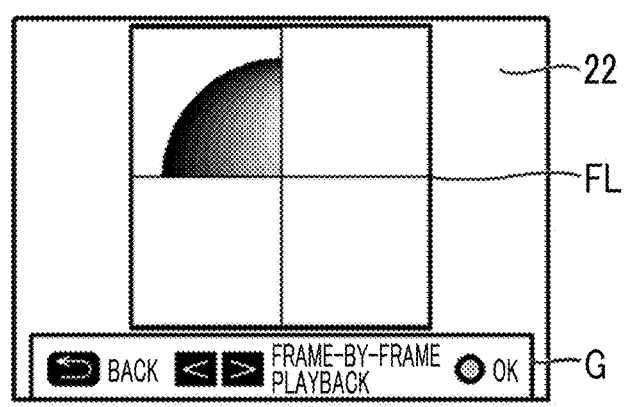

FIGS. 24A to 24C are diagrams showing examples of the display of the monitor after the frame layout is selected. FIG. 24A shows an example of the display of the monitor in a case where the two-split vertical frame is selected, FIG. 24B shows an example of the display of the monitor in a case where the two-split horizontal frame is selected, and FIG. 24C shows an example of the display of the monitor in a case where the four-split frame is selected.

As shown in FIGS. 24A to 24C, a frame layout FL is displayed by line drawing. Specifically, an outer frame line that defines an outline and split lines that split an area inside the outer frame line into a plurality of frames are displayed.

As shown in FIGS. 24A to 24C, an image is displayed in the first frame immediately before a timing of moment when the frame layout FL is displayed. The details thereof will be described below.

An operation guide G together with the frame layout FL is displayed on the monitor 22. The operation guide G is display for guiding the operation content of the operation unit 248. In FIGS. 24A to 24C, the examples in which the image is returned to the immediately previous state in a case where the back button 24*c*5 is pushed, it is possible to perform the frame-by-frame playback by pushing the command dial 24*b* in the leftward and rightward directions, and the selection is confirmed in a case where the OK button 24*a* is pushed are shown.

The operation guide G has a strip display area, and information for guiding the operation content of the operation unit 248 is displayed within the display area. The operation guide G is displayed along the lower edge of the screen, and the frame layout FL is displayed on the operation guide.

In a case where the frame layout FL is displayed on the monitor 22, the system controller 240 subsequently performs a process of setting the images to be arranged in the frames (step S52). This process is a process of selecting the images to be arranged in the frames among the images stored in the internal memory 222 and setting the images to be arranged in the frames.

Figure 25:
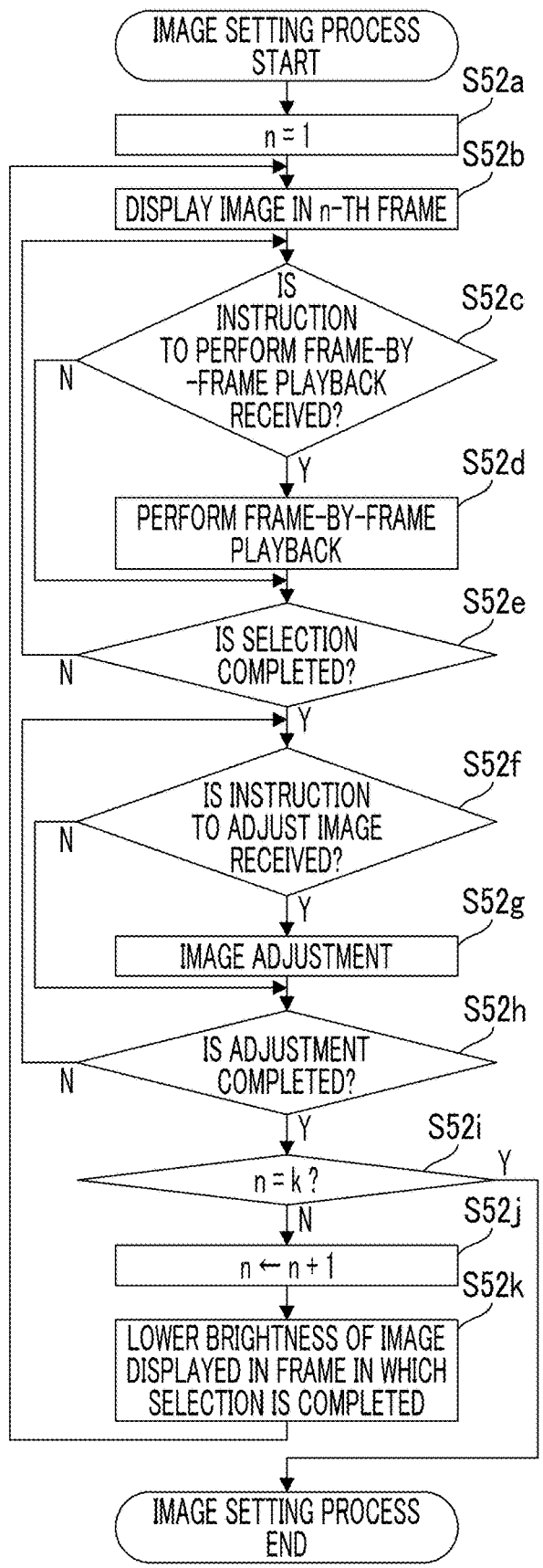
FIG. 25 is a flowchart showing a procedure of a process of setting images to be arranged in the frames.

FIG. 25 is a flowchart showing a procedure of the process of setting the images to be arranged in the frames.

Figure 26:
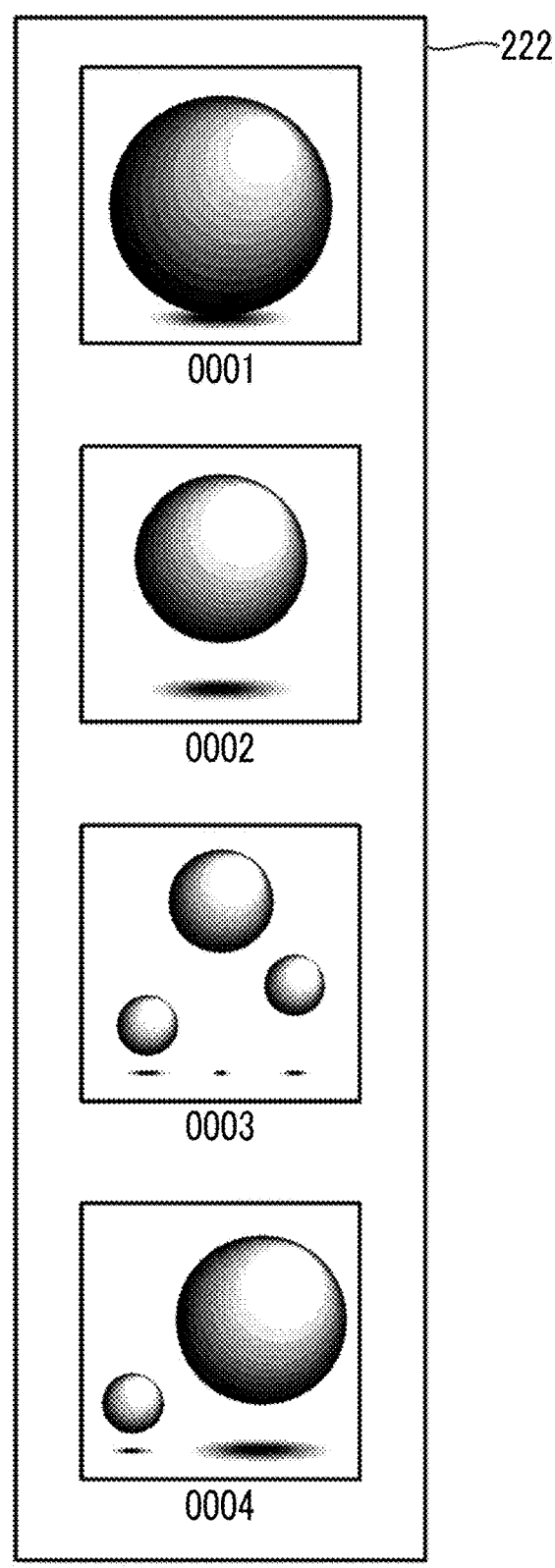
FIG. 26 is a diagram showing examples of four images stored in an internal memory.
Figure 27A:
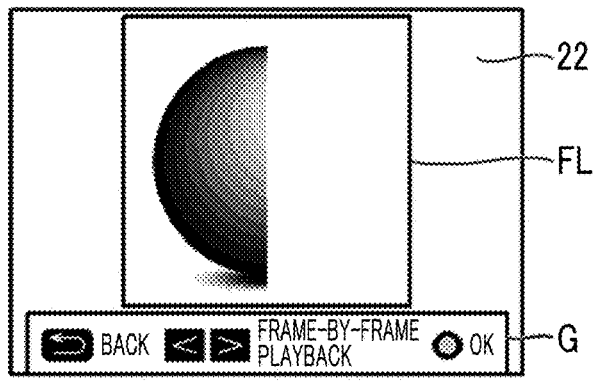
FIGS. 27A to 27D are diagrams showing the transition of the display of the monitor in a case where the frame-by-frame playback is performed in a forward direction.
Figure 27B:
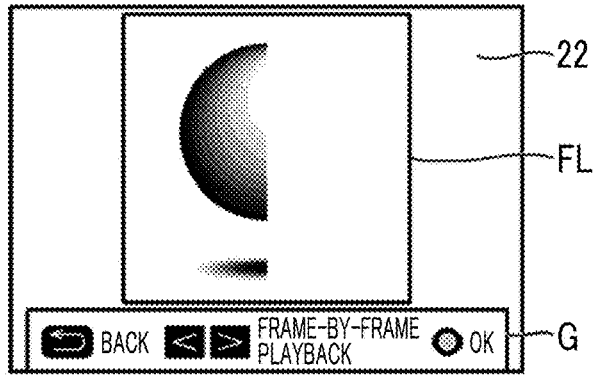
Figure 27C:
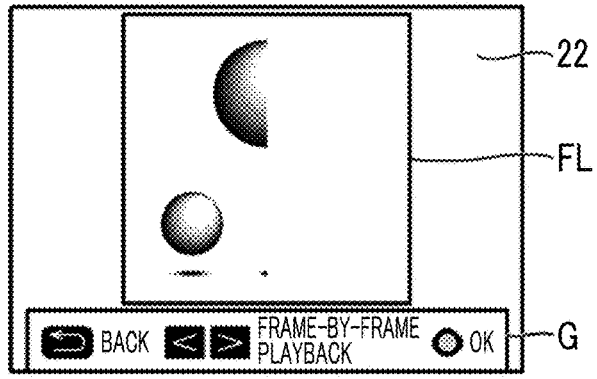
Figure 27D:
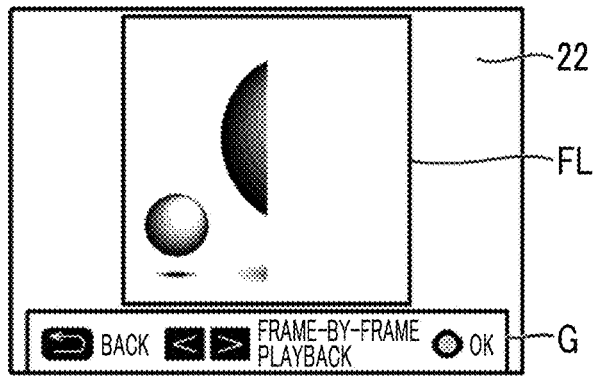

In this case, an example in which the two-split vertical frame is selected as the frame layout to be used in the printing will be described. An example in which four images are stored in the internal memory 222 will be described. FIG. 26 is a diagram showing examples of four images stored in the internal memory. In FIG. 26, the numbers given under the images are frame numbers.

Initially, the system controller 240 sets n=1 (step S52a), and displays the image in an n-th frame (step S52b). That is, the image is displayed in the first frame. This process is performed simultaneously with the display of the frame layout FL. Accordingly, in a case where the frame layout FL is displayed, the image is simultaneously displayed in the first frame (see FIG. 24A).

The image to be displayed in the first frame is an image played and displayed on the monitor 22 immediately before the digital camera with a printer is switched to the split print mode.

In this case, it is assumed that the image played and displayed on the monitor 22 immediately before the digital camera with a printer is switched to the split print mode is an image having a frame number 0001. In this case, the image having the frame number 0001 is displayed in the first frame. In this case, as shown in FIG. 24A, the left half image of the image having the frame number 0001 is displayed in the first frame. That is, in a case where the image is displayed in the first frame, the system controller 240 cuts out a portion of an image corresponding to the first frame from the original image, and displays the cut image in the first frame.

After the image is cut out and the cut out image is displayed in the first frame, the system controller 240 determines whether or not the instruction to perform the frame-by-frame playback is received based on the signal from the operation unit 248 (step S52c).

In this case, the operation of the frame-by-frame playback is performed by the command dial 24b. In a case where the command dial 24b is pushed in the right direction, the frame-by-frame playback of the image is performed in the forward direction, and in a case where the command dial is pushed in the leftward direction, the frame-by-frame playback of the image is performed in the reverse direction.

In a case where it is determined that the instruction to perform the frame-by-frame playback is received, the system controller 240 performs the frame-by-frame playback of the image according to the instruction (step S52d). That is, in a case where the instruction to perform the frame-by-frame playback in the forward direction is received, an image having the next frame number is displayed in the first frame, and in a case where the frame-by-frame playback in the reverse direction is received, an image having the previous frame number is displayed in the first frame. In this case, the system controller 240 cuts out a portion of an image of a portion corresponding to the first frame from the original frame, and displays the cut image in the first frame.

FIGS. 27A to 27D are diagrams showing the transition of the display of the monitor in a case where the frame-by-frame playback is performed in the forward direction.

As shown in FIGS. 27A to 27D, the frame-by-frame playback is performed in the forward direction, and thus, the images stored in the internal memory 222 are sequentially displayed in the first frame in the order of frame numbers. The images are switched in the order of FIGS. 27A, 27B, 27C, and 27D whenever the frame-by-frame playback is performed.

Thereafter, the system controller 240 determines whether or not the selection of the image is completed (step S52e). In this case, the selection of the image is completed by pushing the OK button 24a. Accordingly, the user performs the frame-by-frame playback of the image by the operation of the command dial 24b, pushes the OK button 24a in a state in which a desired image is displayed in the frame, and completes a selection process. Based on the signal from the operation unit 248, the system controller 240 determines whether or not the OK button 24a is pushed, and determines whether or not the selection of the image is completed.

In a case where the selection of the image is completed, the system controller 240 subsequently determines whether or not an instruction to adjust the image is received based on the signal from the operation unit 248 (step S52f). The image adjustment is a process for zooming or moving the selected image within the frame and adjusting the image. The image is zoomed by rotating the command dial 24b and is moved by pushing the command dial 24b. Specifically, in a case where the command dial 24b is rotated in the clockwise direction, the image is zoomed in a direction in which the images expands, and in a case where the command dial is rotated in the counterclockwise direction, the image is zoomed in a direction in which the image contracts. The image is moved in the upward direction in a case where the command dial 24b is pushed in the upward direction, is moved in the downward direction in a case where the command dial is pushed in the downward direction, is moved in the right direction in a case where the command dial is pushed in the right direction, and is moved in the leftward direction in a case where the command dial is pushed in the leftward direction.

In a case where it is determined that an instruction to adjust the image is received, the system controller 240 adjusts the image according to the instruction (step S52g). That is, in a case where an instruction to zoom the image is received, the image is zoomed to expand or contract according to the instruction, and in a case where an instruction to move the image is received, the image is moved in the instruction direction.

Figure 28A:
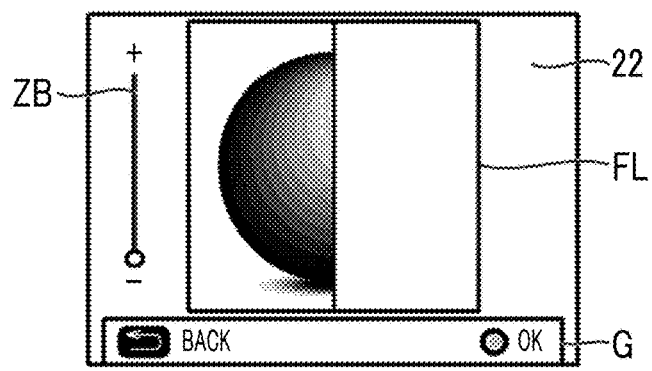
FIGS. 28A and 28B are diagrams showing a change in the screen display in a case where the image is zoomed.
Figure 28B:
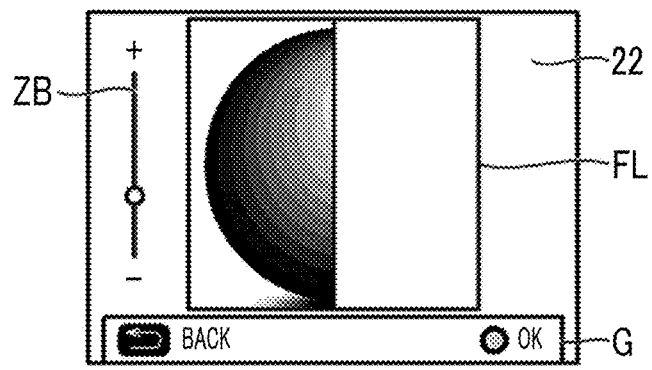

FIGS. 28A and 28B are diagrams showing a change in the screen display in a case where the image is zoomed. FIG. 28A shows a state in which the original image is displayed, and FIG. 28B shows the screen display in a case where the image is zoomed in the expanding direction.

Figure 29A:
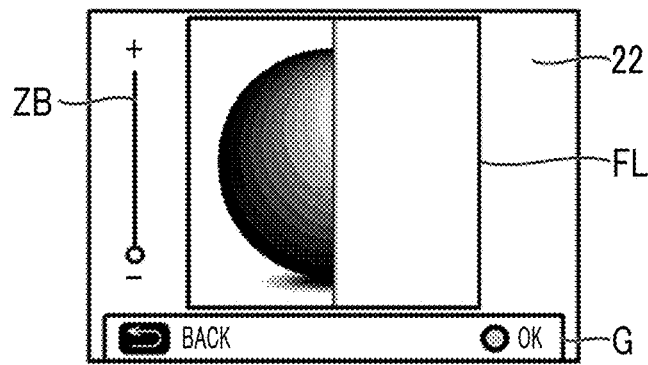
FIGS. 29A and 29B are diagrams showing a change in the screen display in a case where the image is moved.
Figure 29B:
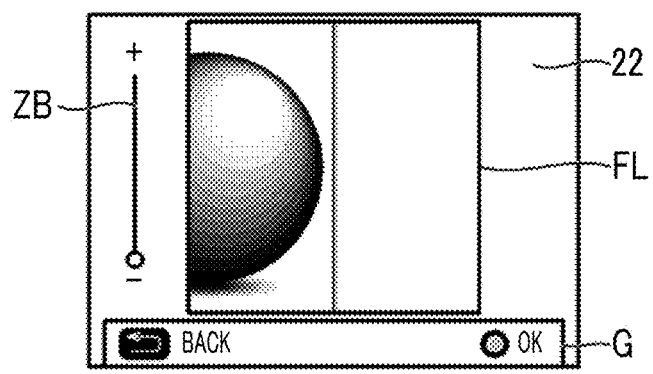

FIGS. 29A and 29B are diagrams showing a change in the screen display in a case where the image is moved. FIG. 29A shows a state in which the original image is displayed, and FIG. 29B shows the screen display in a case where the image is moved in the leftward direction.

As shown in FIGS. 28A to 29B, a zoom bar ZB is displayed on an image adjustment screen. The zoom bar ZB represents a zoom state of the image by a bar. The zoom bar ZB is displayed in a white area on the screen.

Thereafter, the system controller 240 determines whether or not the adjustment of the image is completed (step S52h). In this case, the adjustment of the image is completed by pushing the OK button 24*a*. Accordingly, the user adjusts the image by the operation of the command dial 24*b*, and completes an adjustment process by pushing the OK button 24*a* in a stage in which the desired image is adjusted. Based on the signal from the operation unit 248, the system controller 240 determines whether or not the OK button 24*a* is pushed, and determines whether or not the adjustment of the image is completed.

In a case where the adjustment of the image is completed, the system controller 240 determines whether or not n=k (step S52*i*). In this case, k is the number of split frames in the selected frame layout. That is, in this case, the system controller determines whether or not the setting of the images for all the frames is completed. Since k is the number of split frames, k=2 in a case where the two-split vertical frame and the two-split horizontal frame are used, and k=4 in a case where the four-split frame is used.

In a case where it is determined that n is not equal to k, the system controller 240 sets n←n+1, that is, adds 1 to a current n value (step S52*j*). The system controller 240 lowers the brightness of the image being displayed in the frame in which the setting of the image is completed (step S52*k*), and starts a process of selecting the image of the next frame. That is, the process is returned to step S52*b*, and the image is displayed in the next frame. Then, the process of selecting the image for the frame is performed.

In this case, an image having a frame number next to a frame number of the image selected in the immediately previous frame is displayed as the image to be displayed in the next frame. Accordingly, for example, in a case where the image having the frame number 0001 is selected in the immediately previous frame, an image having a frame number 0002 is displayed in the next frame. In this case, a portion of an image corresponding to the frame to be arranged is cut out, and the cut image is displayed.

Figure 30A:
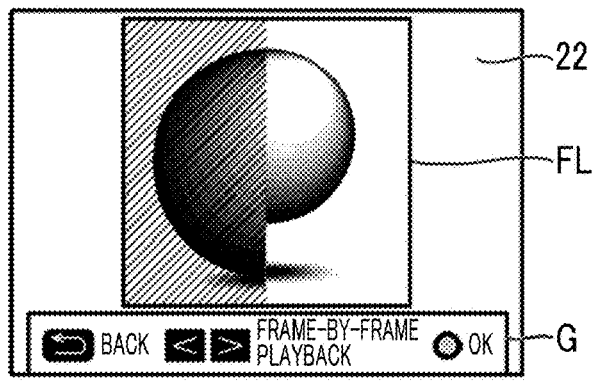
FIGS. 30A to 30D are diagrams showing examples of the screen display of the monitor in a case where the image in a second frame is selected in a two-split vertical frame.
Figure 30B:
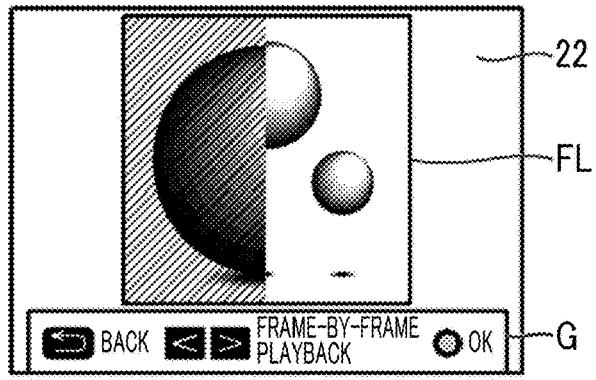
Figure 30C:
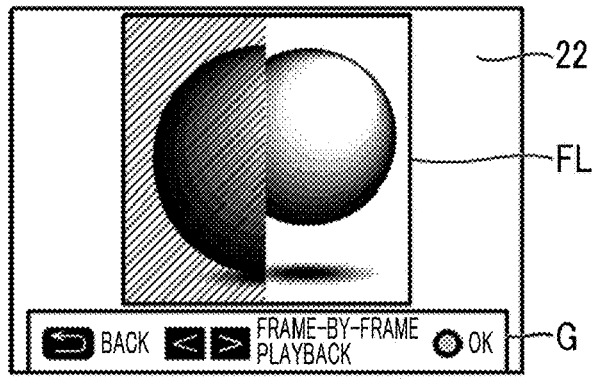
Figure 30D:
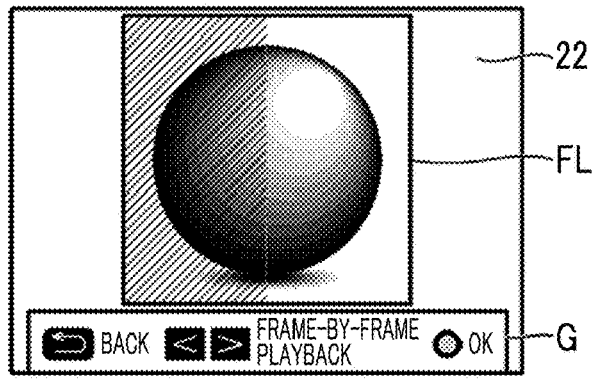

FIGS. 30A to 30D are diagrams showing examples of the screen display of the monitor in a case where the image of the second frame is selected in the two-split vertical frame. FIG. 30A shows an example of the screen display immediately after the selection of the image for the second frame is started. FIGS. 30B to 30D show examples of the screen display in a case where the frame-by-frame playback is performed in the forward direction.

As shown in FIGS. 30A to 30D, a portion of an image corresponding to the second frame is cut out from the original image, and the cut image is displayed in the second frame.

As shown in FIGS. 30A to 30D, the brightness of the image to be displayed in the first frame in which the setting of the image is completed is lowered to a certain level, and the image is displayed. As stated above, a difference in brightness is caused between the image to be displayed in the frame in which the setting of the image to be arranged is completed and the image to be displayed in the frame in which setting of the image to be arranged is being performed, and these images are displayed. Thus, it is possible to distinguish between the frame in which the setting of the image is completed at a first glance and the frame in which the setting of the image is not completed. Accordingly, it is possible to improve visibility, and it is possible to provide more favorable operability.

As shown in FIGS. 30A to 30D, the frame-by-frame playback of the images is performed by operating the command dial 24*b*, and thus, the images to be displayed in the second frame are sequentially switched.

The images to be arranged in the second frame are selected (steps S52*b* to S52*e*), and in a case where the adjustment of the selected images is completed (steps S52*f* to S52*h*), the setting of the images for all the frames is completed.

In a case where it is determined that n=k in step S52*i*, the system controller 240 determines that the setting of the images for all the frames is completed. Accordingly, the process of setting the images to be arranged in the frames is completed.

As shown in FIG. 21, in a case where the process of setting the images to be arranged in the frames is completed, the system controller 240 previews the completed images on the monitor 22 (step S53).

Figure 31:
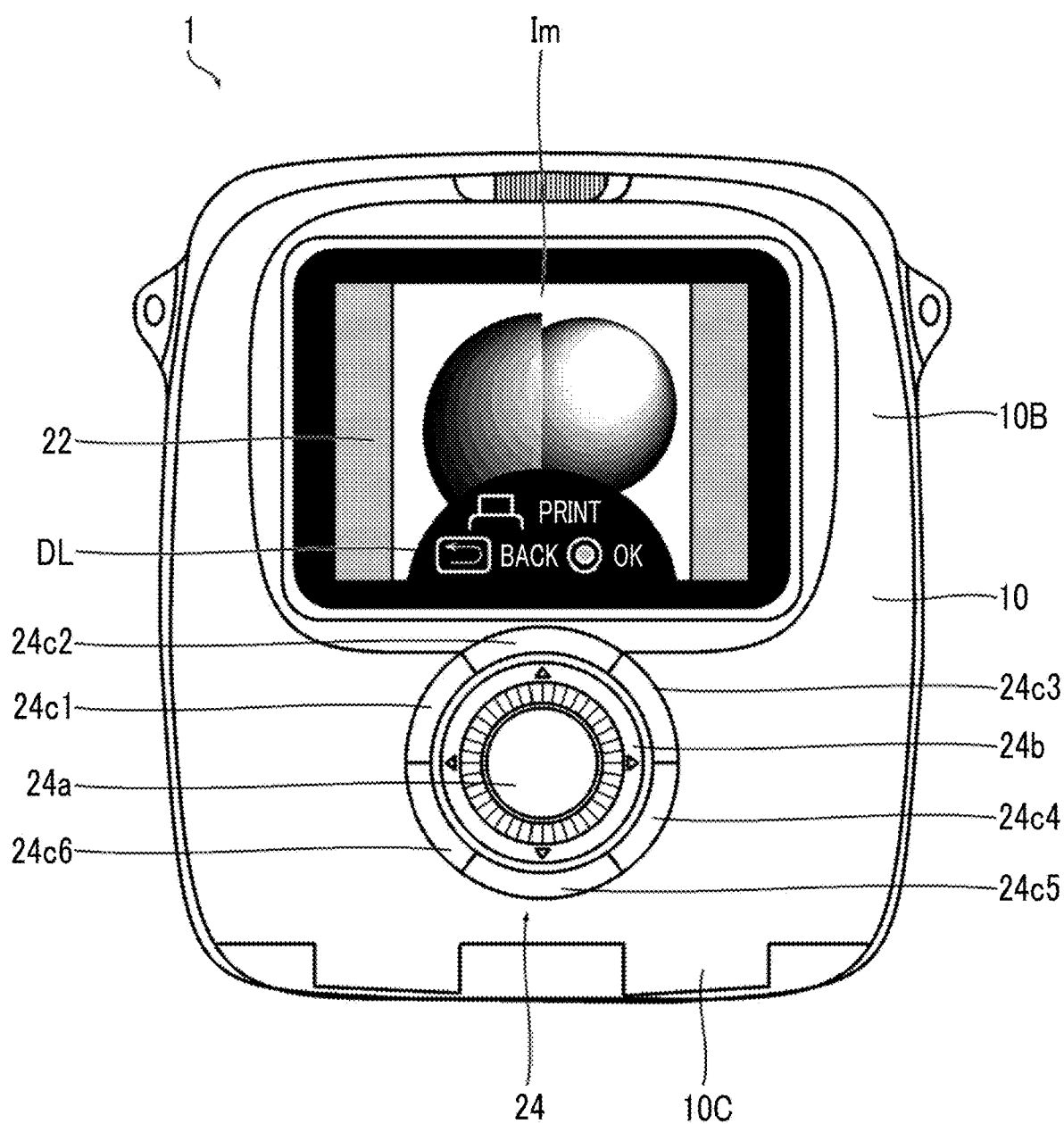
FIG. 31 is a diagram showing an example of the screen display of the monitor on which the completed image is previewed.

FIG. 31 is a diagram showing an example of the screen display of the monitor on which the completed images are previewed.

As shown in FIG. 31, the generated image Im is displayed in the center on the screen of the monitor 22. The dialog DL for inquiring about the printing is simultaneously displayed on the monitor 22. The dialog DL is displayed from the lower edge of the screen.

In a case where the image being previewed is desired to be printed, the user pushes the OK button 24*a* according to the display of the dialog DL. Accordingly, the print instruction is received.

In a case where the print instruction is received, the system controller 240 performs the printing process (step S55). The print animation process is performed in line with the printing process (step S56). That is, the image being previewed is moved along the ejection direction f of the instant film 110, and is removed from the screen. In this case, the system controller 240 initially displays the image being displayed on the monitor 22 so as to be included in the frame (see FIG. 14A). Thereafter, the image included in the frame is moved along the ejection direction f of the instant film 110, and is removed from the screen (see FIGS. 14B to 14D). Accordingly, it is possible to recognize that the image Im is to be printed while seeing the display of the monitor 22 at a first glance, and it is possible to recognize the ejection direction of the print. After the image is removed, the image for print checking is displayed on the monitor 22 (see FIG. 13). Accordingly, it is possible to check the printed image again.

Thereafter, the system controller 240 records the printed image in the internal memory 222 (step S57), and ends the process of the split print.

In a case where the process of the split print is ended, the system controller 240 switches the operation mode of the digital camera 1 with a printer to the playback mode. In this case, the image displayed on the monitor 22 immediately before the print mode of the split print is switched is displayed on the monitor 22.

As stated above, the digital camera with a printer is set in the print mode of the split print. Thus, it is possible to generate an image by combining the plurality of images, and it is possible to print the generated image on one instant film 110. Since the frame layout is selected and the images to be arranged in the frames are selected, it is possible to simply generate the image. Since it is possible to adjust the images in the frames, it is possible to the image with desired photographic composition. Since all the operations for selecting and adjusting the images can be performed by the rear operation unit 24, it is possible to generate the image with favorable operability. Particularly, in the digital camera 1 with a printer of the present embodiment, since it is possible to operate the rear operation unit 24 with only the thumb, it is possible to generate the image with favorable operability.

Modification Example

Modification Example of Split Print Frame Layout

Although it has been described in the aforementioned embodiment that two frame layouts including the two-split vertical frame, the two-split horizontal frame, and the four-split frame are presented as the selectable frame layouts, the frame layouts are not limited thereto. Various forms such as a frame layout acquired by equally splitting the square area into three frames in a horizontal direction, a frame layout acquired by equally splitting the square area into four frames in a vertical direction, and a frame layout acquired by equally splitting the square area into eight frames in a grid shape may be used.

The frame layout may be manually set by the user. In this case, for example, the split form such as the vertical split form, the horizontal split form, or the grid-shaped split form and the number of split frames may be selected by the user, and a desired frame layout may be manually selected by the user.

Although it has been described in the aforementioned embodiment that a list of selectable frame layouts is displayed and a desired frame layout is selected by the user in a case where the frame layout is selected, the method of selecting the frame layout is not limited thereto. The selectable frame layouts may be displayed on the monitor 22 one by one based on an operation of the operation unit, and a desired frame layout may be selected by the user.

Order of Frames in which Image is Selected

Although it has been described in the aforementioned embodiment that the order of frames in which the image is selected is previously determined, the frame in which the image is selected may be arbitrarily selected by the user. In this case, for example, the frame may be selected by pushing or rotating the command dial 24b, and the process of selecting the image in the selected frame may be subsequently performed.

As in the aforementioned embodiment, it is possible to automatically switch the frame in which the image is selected by previously determining the order of frames in which the image is selected, and it is possible to efficiently generate the image.

Display Form of Image to be Displayed in Frame in which Setting of Image to be Arranged is Completed Although it has been described in the aforementioned embodiment that it is possible to distinguish between the image to be displayed in the frame in which setting of the image to be arranged is being performed and the image to be displayed in the frame in which the setting of the image to be arranged is completed by lowering the brightness of the image to be displayed in the frame in which the setting of the image to be arranged is completed, the display form capable of distinguishing these images is not limited thereto. In addition, the images may be distinguishably displayed by causing a saturation difference between the image to be displayed in the frame in which the setting of the image to be arranged is completed and the image to be arranged in the frame in which setting of the image to be arranged is being performed. The images may be distinguishably displayed by causing a difference in brightness and a difference in saturation between the image to be displayed in the frame in which the setting of the image to be arranged is completed and the image to be arranged in the frame in which setting of the image to be arranged is being performed.

A mark indicating that the setting of the image to be arranged is completed may be displayed in the frame in which the setting of the image to be arranged is completed, and these frames may be distinguished.

Figure 32:
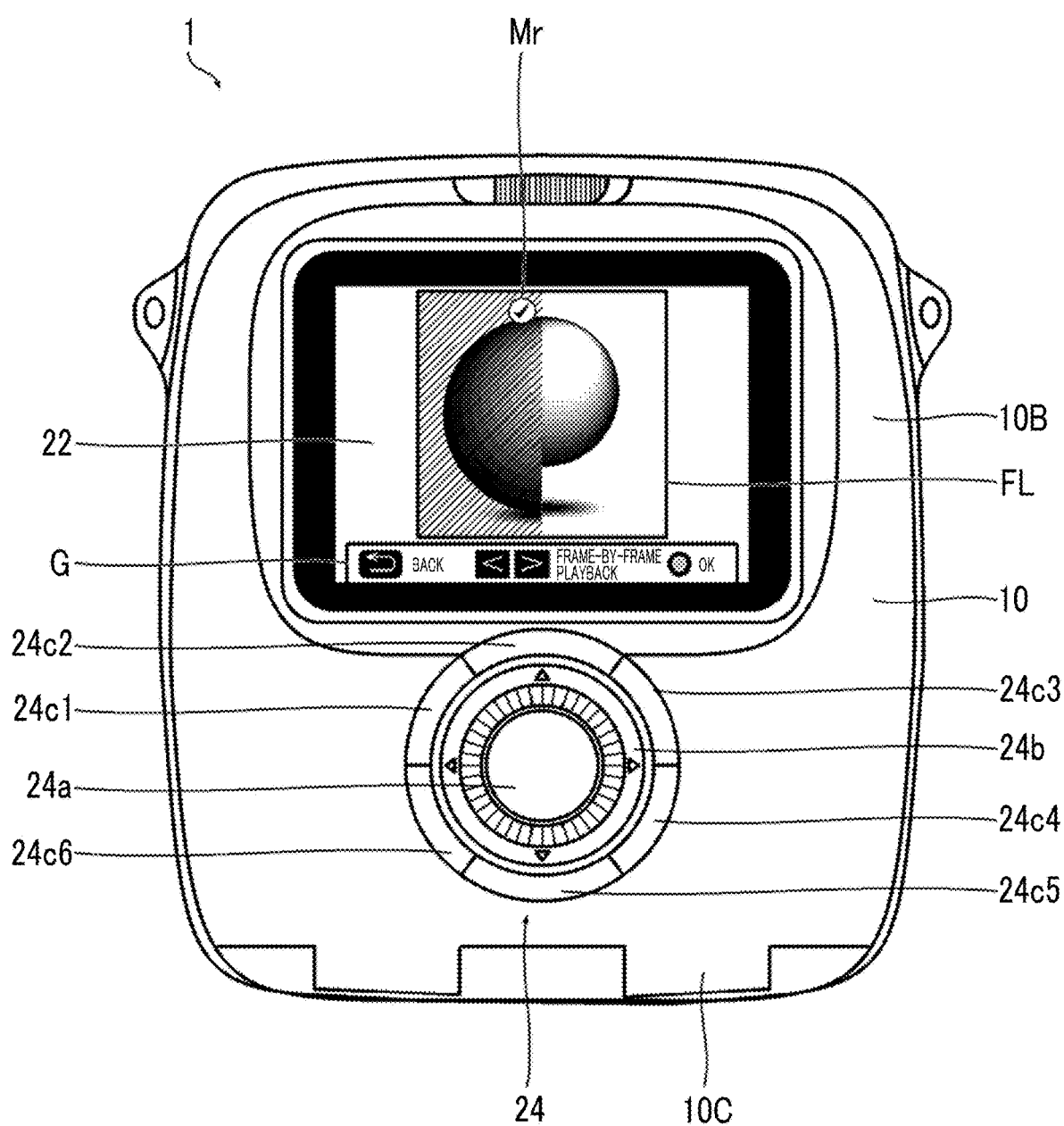
FIG. 32 is a diagram showing an example of the screen display of the monitor in a case where a mark indicating that setting is completed is displayed and a frame in which the setting of an image is completed and a frame in which an image is being set is distinguished.

FIG. 32 is a diagram showing an example of the screen display of the monitor in a case where the mark indicating that the setting of the image to be arranged is completed is displayed and the frame in which the setting of the image is completed and the frame in which the image is being set is distinguished.

As shown in FIG. 32, a mark Mr indicating that the setting thereof is completed is displayed in the frame in which the setting of the image to be arranged is completed. The mark Mr is a so-called check mark, and is displayed in a predetermined position within the frame. In the example shown in FIG. 32, the mark is displayed in an upper right corner of the frame. The user visually perceives the mark Mr, and thus, the user can recognize that this frame is the frame in which the setting of the image is completed at a first glance.

Although it has been described in the example shown in FIG. 32 that the brightness of the image is changed, it is not necessary to change the brightness of the image in a case where the mark Mr is displayed.

Display of Operation Guide

Although it has been described in the aforementioned embodiment that the operation guide is constantly displayed in a case where the process of setting the images to be arranged in the frames is performed, the display of the operation guide may be arbitrarily turned on or off by the user. In a case where the display of the operation guide is turned off, it is preferable that the frame layout is maximized and is displayed on the screen.

Figure 33A:
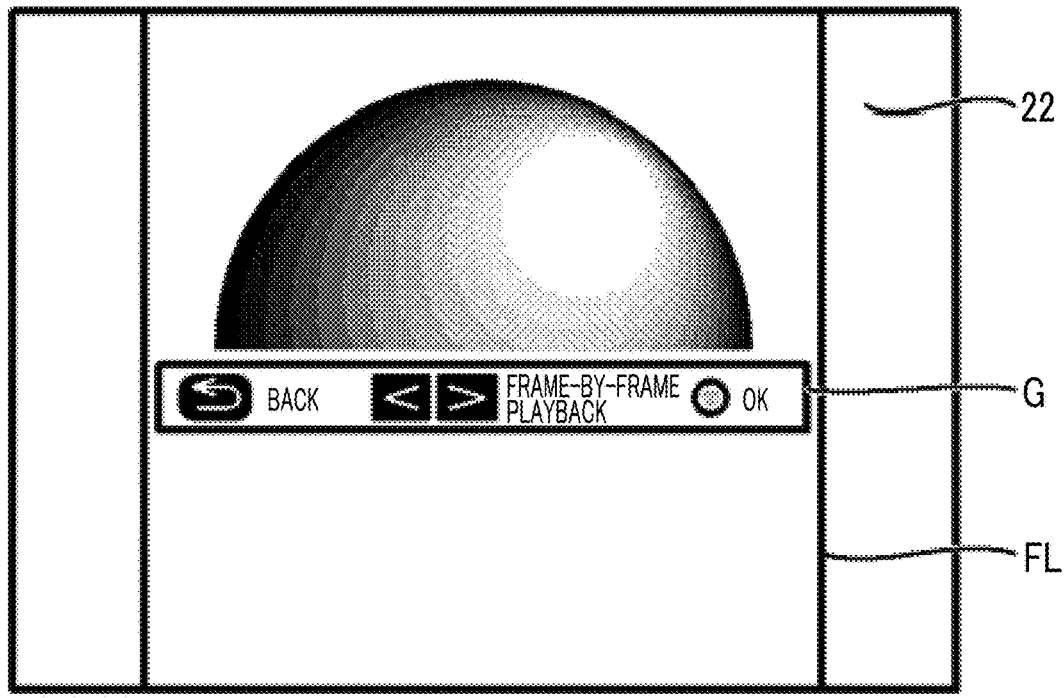
FIGS. 33A and 33B are diagrams showing another examples of the display of an operation guide.
Figure 33B:
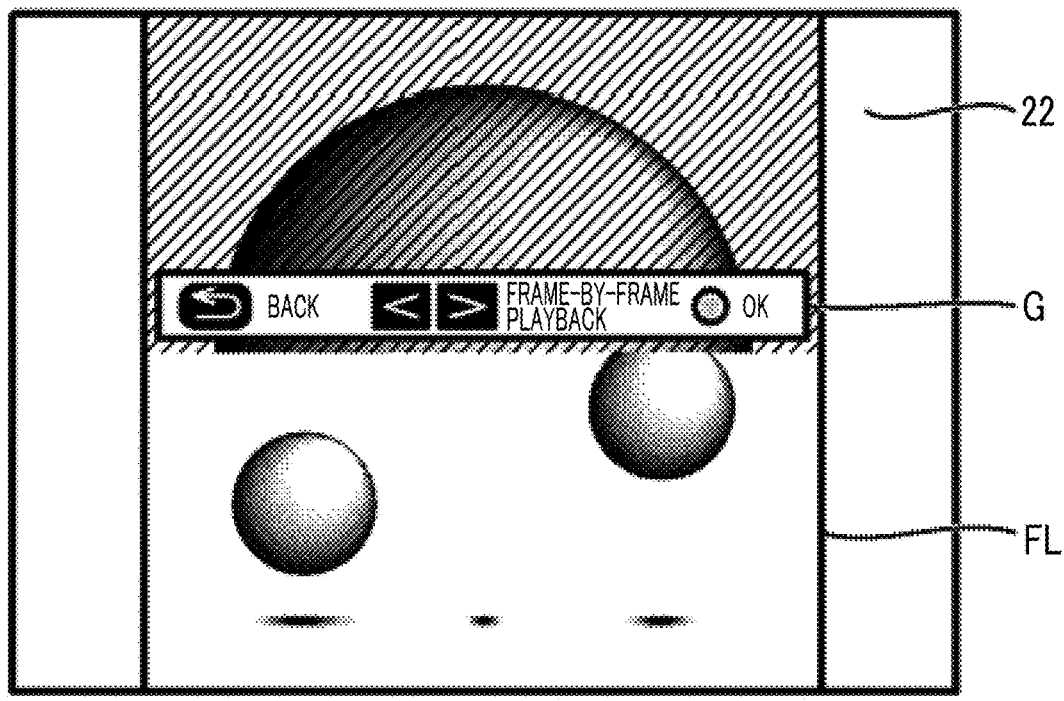

FIGS. 33A and 33B are diagrams showing another examples of the screen data items of the operation guide.

As shown in FIGS. 33A and 33B, the operation guide G may be displayed near the frame in which the image is being set. As stated above, the operation guide is displayed near the frame in which the image is being set. Thus, it is possible to clarify the frame in which the image is being set, and it is possible to provide favorable operability.

FIG. 33A shows an example of the screen display of the monitor on which the image to be arranged in the first frame on the upper side of the screen is being set in the two-split horizontal frame. FIG. 33B shows an example of the screen display of the monitor on which the image to be arranged in the second frame on the lower side of the screen is being set in the two-split horizontal frame.

As shown in FIGS. 33A and 33B, the operation guide G is displayed near the frame on which the image is being set while avoiding the frame on which the image is being set so as not to be overlapped with the image being set.

Specifically, as shown in FIG. 33A, in a case where the frame in which the image is being set is the frame (first frame) on the upper side of the screen, the operation guide G is displayed near the frame on the upper side of the screen while avoiding the frame on the upper side of the screen so as not to be overlapped with the image being displayed on the frame on the upper side of the screen. More specifically, the operation guide G is displayed in a position near the boundary between the frame on the upper side of the screen and the frame on the lower side of the screen so as to not be overlapped with the image being displayed in the frame on the upper side of the screen.

As shown in FIG. 33B, in a case where the frame in which the image is being set is the frame (second frame) on the lower side of the screen, the operation guide G is displayed near the frame on the lower side of the screen while avoiding the frame on the lower side of the screen so as not to be overlapped with the image being displayed on the frame on the lower side of the screen. More specifically, the operation guide G is displayed in a position near the boundary between the frame on the upper side of the screen and the frame on the lower side of the screen so as not to be overlapped with the image being displayed on the frame on the lower side of the screen.

As mentioned above, the operation guide G is displayed while being appropriately moved, and thus, it is possible to secure favorable visibility even in a case where a monitor having a small screen is used.

It has been described that FIGS. 33A and 33B are the example of the two-split vertical frame. Similarly, in the four-split frame, the display position of the operation guide is changed between a case where images of frames (a first frame and a second frame) on the upper side of the screen are set and a case where images of frames (a third frame and a fourth frame) on the lower side of the screen are set, and thus, it is possible to secure favorable visibility in the frame in which the image is being set.

Adjustment of Image within Frame

Although it has been described in the aforementioned embodiment that the adjustable items are only the zoom and movement of the image within the frame, the items capable of being adjusted are not limited thereto. In addition, for example, the brightness, saturation, sharpness, and tone of the image may be adjusted. In this case, it is preferable that these items are able to be adjusted by the operation of the rear operation unit 24.

Printing of Image

As in the aforementioned embodiment, in a case where the split print is performed, it is preferable that the image is printed only in a case where the setting of the images for all the frames is completed. In this case, it is preferable that the print instruction is received only in a case where the setting of the images for all the frames is completed.

Although it has been described in the aforementioned embodiment that in a case where the setting of the images for all the frames is completed, the dialog for inquiring about the printing is automatically displayed, the dialog for inquiring about the printing may be displayed according to the print instruction. In this case, for example, in a case where the setting of the images for all the frames is completed, the generated images may be previewed on the monitor 22. In a case where the print button 24c4 is pushed during the previewing, the dialog for inquiring about the printing may be displayed on the monitor 22.

Display of Number of Remaining Films

In a case where the digital camera with a printer is set in the print mode, the number of remaining films may be displayed on the monitor 22 (see FIG. 11). It is preferable that the number of remaining films is displayed in a white area of the screen such as the side bar.

Operation Unit

Although it has been described in the aforementioned embodiment that the selection of the image and the adjustment of the image are performed by the operation of the command dial 24b and the OK button 24a, the operation form is not limited thereto.

However, as in the aforementioned embodiment, the selection of the image and the adjustment of the image are performed by the operation of the command dial 24b and the OK button 24a constituting one operation unit (rear operation unit 24), and thus, it is possible to provide favorable operability.

Although it has been described in the aforementioned embodiment that the command dial 24b also functions as the rotary dial and the direction keys, the rotary dial and the direction keys may be provided as separate operation members. In this case, it is preferable that these operation members have a ring shape and are arranged so as to be concentric.

[Modification Example of Display of Image for Print Checking]

Although it has been described in the aforementioned embodiment that the image for print checking is displayed on the monitor 22 after the printed image is completely removed from the screen, the image for checking the print may be previously displayed on the monitor 22.

FIGS. 34A to 34D are diagrams showing examples of the print animation in a case where the image for print checking is previously displayed. In these diagrams, the screen display is changed with time in the order of FIGS. 34A, 34B, 34C, and 34D. FIG. 34A shows the screen display in a case where the printing is started, FIGS. 34B and 34C show the screen display in a case where the printing is being performed (the instant film is being ejected), and FIG. 34D shows the screen display in a case where the printing is ended (the ejection is completed).

As shown in FIGS. 34A to 34D, the image Im1 for print checking is displayed so as to be overlapped under the image Im to be removed from the screen. The image Im1 for print checking is displayed so as to be fixed in a position in which the image Im to be removed from the screen is displayed. The image Im to be removed from the screen is moved so as to slide on the image Im1 for print checking, and is removed from the screen. Thus, the image Im1 for print checking is gradually displayed on the screen of the monitor 22.

As stated above, the image Im1 for print checking is previously displayed on the monitor 22. Accordingly, the screen display is smoothly switched, and thus, it is possible to perform the display without the feeling of incompatibility.

Although it has been described in the aforementioned embodiment that the image of which the brightness is lowered is displayed as the image for print checking, the image to be displayed as the image for checking the print is not limited thereto. In addition, for example, an image of which saturation is lowered and an image of which brightness and saturation are lowered may be displayed as the image for print checking.

Print Animation

Method of Displaying Frame

Although it has been described in the aforementioned embodiment that in a case where the image is printed, the image being displayed on the monitor 22 is displayed so as to be included in the frame, the image is moved along the ejection direction, and the image is removed from the screen. In a case where the image to be printed is displayed so as to be included in the frame, the display may be displayed in the form of animation. For example, the image being displayed on the monitor 22 gradually contracts, and the frame gradually appears around the image.

Display Direction of Image

In the digital camera 1 with a printer of the present embodiment, the orientation of the image to be displayed on the monitor 22 and the orientation of the image on the instant film to be ejected from the print ejection port 28 are different. In a case where the orientation of the image on the monitor and the orientation of the image on the instant film are different in this manner, after the orientation of the image on the monitor and the orientation of the image on the instant film match each other, the image on the monitor may be removed from the screen.

Ejection Direction of Instant Film

Although it has been described in the aforementioned embodiment that the instant film 110 is ejected upwards from the top of the camera body 10, the ejection direction of the instant film 110 is not limited thereto. In addition, for example, the instant film may be ejected downwards from the bottom of the camera body 10, the instant film may be ejected rightwards from the right side thereof, or the instant film may be ejected leftwards from the left side thereof. In a case where the printed image is removed from the monitor 22, the image is moved along the ejection direction of the instant film 110, and is removed.

Movement of Image

In a case where the image to be printed is removed from the screen, it is preferable that the image is moved in synchronization with an ejection speed of the instant film and is removed from the screen. Accordingly, it is possible to recognize an ejection state of the instant film 110 from the display of the monitor 22 at a first glance.

Image to be Printed

Although it has been described in the aforementioned embodiment that one image is printed on one instant film, a plurality of images may be printed on one instant film (so-called split print). In this case, one screen is split into a plurality of areas, and one image is generated by fitting the images into the areas.

The image may be processed, and the processed image may be printed. For example, in the manual mode, the previewed captured image may be processed, and the processed image may be printed. In this case, the processed image is printed, and is recorded in the internal memory 222. In the playback mode, the image being played may be processed, and the processed image may be printed.

Method of Acquiring Image to be Printed

Although it has been described in the aforementioned embodiment that the captured image is printed, an image acquired from an external device may be printed. In this case, the digital camera with a printer includes a communication unit communicating with the external device.

Modification Example of Storage Unit

Although it has been described in the aforementioned embodiment that the captured image is recorded in the internal memory 222, the image may be recorded in a detachable storage device such as a memory card. In this case, a card slot is provided in the camera body 10.

Application to Printer

Although it has been described in the aforementioned embodiment that the present invention is applied to the digital camera with a printer, the application of the present invention is not limited thereto. The present invention may be applied to a printer.

Printing Method

Although it has been described in the aforementioned embodiment that the instant film is used as a medium and the image is printed using the exposure head, the medium to be used and the printing method are not limited thereto. In addition, for example, thermal paper may be used as the medium, and the image may be printed using a thermal head. The image may be printed on the medium by using an ink ribbon and a thermal head, or the image may be printed by using an inkjet head.

OTHER MODIFICATION EXAMPLES

The amount of remaining battery may be monitored, and in a case where the amount of remaining battery is equal to or less than a certain amount, the reception of the print may be stopped. Accordingly, it is possible to prevent the battery from being flat during the printing.

EXPLANATION OF REFERENCES

1: digital camera with printer
10: camera body
10A: main body
10B: back cover
10C: hinge
12: imaging lens
12a: stop
12b: shutter
14: power ring
16A: first release button
16B: second release button
18: flash
20: auxiliary light lamp
22: monitor
24: rear operation unit
24a: OK button
24b: command dial
24c1: first function button (vignetting button)
24c2: second function button (effect button)
24c3: third function button (brightness button)
24c4: fourth function button (print button)
24c5: fifth function button (back button)
24c6: sixth function button (playback button)
26: capturing mode switching lever
28: print ejection port
30: unlocking lever
42: image sensor
50: film loading room
52: film delivery mechanism
52a: claw
54: film transport mechanism
54A: transport roller pair
54B: spreading roller pair
56: print head
100: instant film pack
110: instant film
110a: exposure surface
110b: observation surface
112: exposure part
114: pod part
114a: development treatment liquid pod
116: trap part
116a: absorbing material
118: observation part
118a: frame
120: case
120a: opening
120b: ejection port
120c: claw opening
212: Imaging lens driving unit
214: image sensor driving unit
216: analog signal processing unit
218: image data input unit
220: digital signal processing unit
222: internal memory
230: film delivery mechanism driving unit
232: film transport mechanism driving unit
234: print head driving unit
236: image signal processing unit for printing
240: system controller
240a: image selection unit
240b: frame layout selection unit 240c: image adjustment unit
240d: operation guide display control unit
240e: print instruction reception unit
240f: recording control unit
240g: capturing control unit
242: work memory
244: data memory
246: monitor driving unit
248: operation unit 250: power supply unit
DL: dialog
F: utilization direction of instant film
f: ejection direction of instant film
FL: frame layout
F1: frame
G: operation guide
Im: image
Im1: image for print checking
LVI: live view image
Mr: mark indicating that setting is completed
SBL: side bar
SBR: side bar
ZB: zoom bar
S10 to S17: process procedure in auto mode
S20 to S29: process procedure in manual mode
S30 to S36: process procedure in playback mode
S40 to S46: process procedure in one-frame print
S50 to S57: process procedure in split print
S52a to S52k: procedure of process of setting images to be arranged in frames

What is claimed is:

1. A digital camera with a printer comprising:
an image sensor;
a display unit;
an operation unit;
an image storage unit that stores a plurality of images;
a controller that transmits an instruction to capture an image; and
a capturing control unit that captures an image by the image sensor, and records the captured image in the image storage unit in a case where the instruction to capture the image is received from the controller,
wherein the controller:
displays on the display unit a frame layout of a printable area of a medium that is split into a plurality of frames to arrange each image in each frame, wherein each image in each frame of the plurality of frames is to be combined to acquire a print image on one medium,
displays each image stored in the image storage unit in each frame and allows selection of each image to be arranged in each frame, based on an operation of the operation unit,
cuts out portions of each image corresponding to each frame and displays each cut out images in each frame, in a case where each image is displayed in each frame,
allows selection of each cut out image to be adjusted in each frame, and,
adjusts each selected and cut out image by zooming and/or moving each selected and cut out image within each frame based on an operation of the operation unit and combines each adjusted image to acquire the print image, and
receives an instruction to print the print image being displayed on the display unit based on an operation of the operation unit.

2. The digital camera with a printer comprising according to claim 1,
wherein an image to be displayed in the frame in which setting of the image to be arranged is completed and an image to be displayed in the other frame in which setting of the image to be arranged is being performed are displayed so as to be distinguished.

3. The digital camera with a printer according to claim 2,
wherein a difference in brightness and/or saturation is caused between the two images, the image to be displayed in the frame in which the setting of the image to be arranged is completed and the image to be displayed in the other frame in which setting of the image to be arranged is being performed.

4. The digital camera with a printer according to claim 2,
wherein a mark indicating that the setting is completed is displayed in the frame in which the setting of the image to be arranged is completed.

5. The digital camera with a printer according to claim 3,
wherein a mark indicating that the setting is completed is displayed in the frame in which the setting of the image to be arranged is completed.

6. The digital camera with a printer according to claim 1,
wherein the print instruction receptor receives the instruction to print the print image being displayed on the display unit based on an operation of the operation unit in a case where the setting of the images for all the frames is completed.

7. The digital camera with a printer according to claim 2,
wherein the print instruction receptor receives the instruction to print the print image being displayed on the display unit based on an operation of the operation unit in a case where the setting of the images for all the frames is completed.

8. The digital camera with a printer according to claim 3,
wherein the print instruction receptor receives the instruction to print the print image being displayed on the display unit based on an operation of the operation unit in a case where the setting of the images for all the frames is completed.

9. The digital camera with a printer according to claim 4,
wherein the print instruction receptor receives the instruction to print the print image being displayed on the display unit based on an operation of the operation unit in a case where the setting of the images for all the frames is completed.

10. The digital camera with a printer according to claim 1,
wherein the image selector unit allows the selection of the images to be arranged in the frames in a previously determined order.

11. The digital camera with a printer according to claim 1,
wherein the controller displays a plurality of frame layouts on the display unit, and allows selection of a frame layout to be used in printing by an operation of the operation unit.

12. The digital camera with a printer according to claim 1, further comprising:
a recording control unit that records a printed image in the image storage unit.

13. The digital camera with a printer according to claim 1,
wherein the operation unit includes:
direction keys;
a rotary dial; and
a confirmation button,
wherein the direction keys instruct to switch the images to be arranged and to move the images in the frames,
the rotary dial instructs to zoom the image, and the confirmation button confirms the images to be arranged in the frames.

14. The digital camera with a printer according to claim 13,
wherein the rotary dial further functions as the direction keys, and has a ring shape, and
the confirmation button is arranged in an inner circumference of the rotary dial.

15. The digital camera with a printer according to claim 13,
wherein the print instruction receptor displays a dialog for inquiring about printing on the display unit in a case where the setting of the images for all the frames is completed.

16. The digital camera with a printer according to claim 15,
wherein the print instruction receptor displays the dialog from an edge of a screen near the operation unit in a case where the setting of the images for all the frames is completed.

17. The digital camera with a printer according to claim 1, further comprising:
an operation guide display control unit that displays an operation guide on the display unit.

18. The printer according to claim 17,
wherein the operation guide display control unit displays the operation guide while avoiding the frame in which an image is being selected and the frame in which an image is being adjusted.

19. A printing method using a digital camera with a printer that includes an image sensor, a display unit, an operation unit, an image storage unit, a controller, and a capturing control unit, the method comprising:
transmitting an instruction to capture an image using the controller,
controlling on capturing the image using the image sensor and on recording the captured image in the image storage unit using the capturing control unit in a case where the instruction to capture the image is received from the controller,
displaying on the display unit a frame layout of a printable area of a medium that is split into a plurality of frames to arrange each image in each frame, wherein each image in each frame of the plurality of frames is to be combined to acquire a print image on one medium,
displaying each image stored in the image storage unit in each frame and selecting each image to be arranged in each frame based on an operation of the operation unit,
cutting out portions of each image corresponding to each frame and displaying each cut out image in each frame, in a case where each image is displayed in each frame,
selecting each cut out image to be adjusted in each frame,
adjusting each selected and cut out image by zooming and/or moving each selected and cut out image within each frame based on an operation of the operation unit and combining each adjusted image to acquire the print image,
receiving an instruction to print the print image being displayed on the display unit based on an operation of the operation unit, and
printing the print image being displayed on the display unit using the printer based on a print instruction.

* * * * *